(12) United States Patent
Olshefski et al.

(10) Patent No.: US 10,552,221 B2
(45) Date of Patent: Feb. 4, 2020

(54) SYSTEMS, APPARATUS AND METHODS FOR MANAGING RESOURCES IN COMPUTER SYSTEMS

(71) Applicant: TURBONOMIC, INC., Boston, MA (US)

(72) Inventors: David Olshefski, New York, NY (US); Endre Sara, Briarcliff Manor, NY (US); Pallavi Debnath, Stamford, CT (US)

(73) Assignee: TURBONOMIC, INC., Boston, MA (US)

( * ) Notice: Subject to any disclaimer, the term of this patent is extended or adjusted under 35 U.S.C. 154(b) by 67 days.

(21) Appl. No.: 15/838,080

(22) Filed: Dec. 11, 2017

(65) Prior Publication Data
US 2018/0173567 A1 Jun. 21, 2018

Related U.S. Application Data

(60) Provisional application No. 62/435,497, filed on Dec. 16, 2016.

(51) Int. Cl.
*G06F 9/50* (2006.01)
*G06F 12/1009* (2016.01)
*G06Q 20/06* (2012.01)
*G06Q 10/06* (2012.01)

(52) U.S. Cl.
CPC ........ *G06F 9/5011* (2013.01); *G06F 12/1009* (2013.01); *G06Q 10/06315* (2013.01); *G06Q 20/065* (2013.01); *G06F 2212/65* (2013.01)

(58) Field of Classification Search
CPC ............... G06F 9/5011; G06F 12/1009; G06F 2212/65; G06Q 20/065; G06Q 10/06315
See application file for complete search history.

(56) References Cited

U.S. PATENT DOCUMENTS

| 8,396,807 B1* | 3/2013 | Yemini | .................. G06Q 10/06 705/59 |
| 2015/0229565 A1* | 8/2015 | Ravipati | ............. H04L 45/7457 711/108 |

\* cited by examiner

*Primary Examiner* — Jacob D Dascomb
(74) *Attorney, Agent, or Firm* — Morgan, Lewis & Bockius LLP

(57) ABSTRACT

Systems, methods and apparatus, including computer program products, are disclosed for management of resources and services (e.g., storage, registers, memory, ternary content-addressable memory (TCAM) tables) to route packet sequences in a software-defined networking (SDN) environment. In one embodiment, this management occurs through the use of supply chain economics to manage utilization of TCAM resources.

20 Claims, 27 Drawing Sheets

| Source-ID 802 | Provider-ID 804 | Transaction-ID 806 | Service 808 | Payment 810 | Authentication 812 |

| Source-ID 852 | Provider-ID 854 | Transaction-ID 856 | Service Confirmation 858 | Authentication 860 |

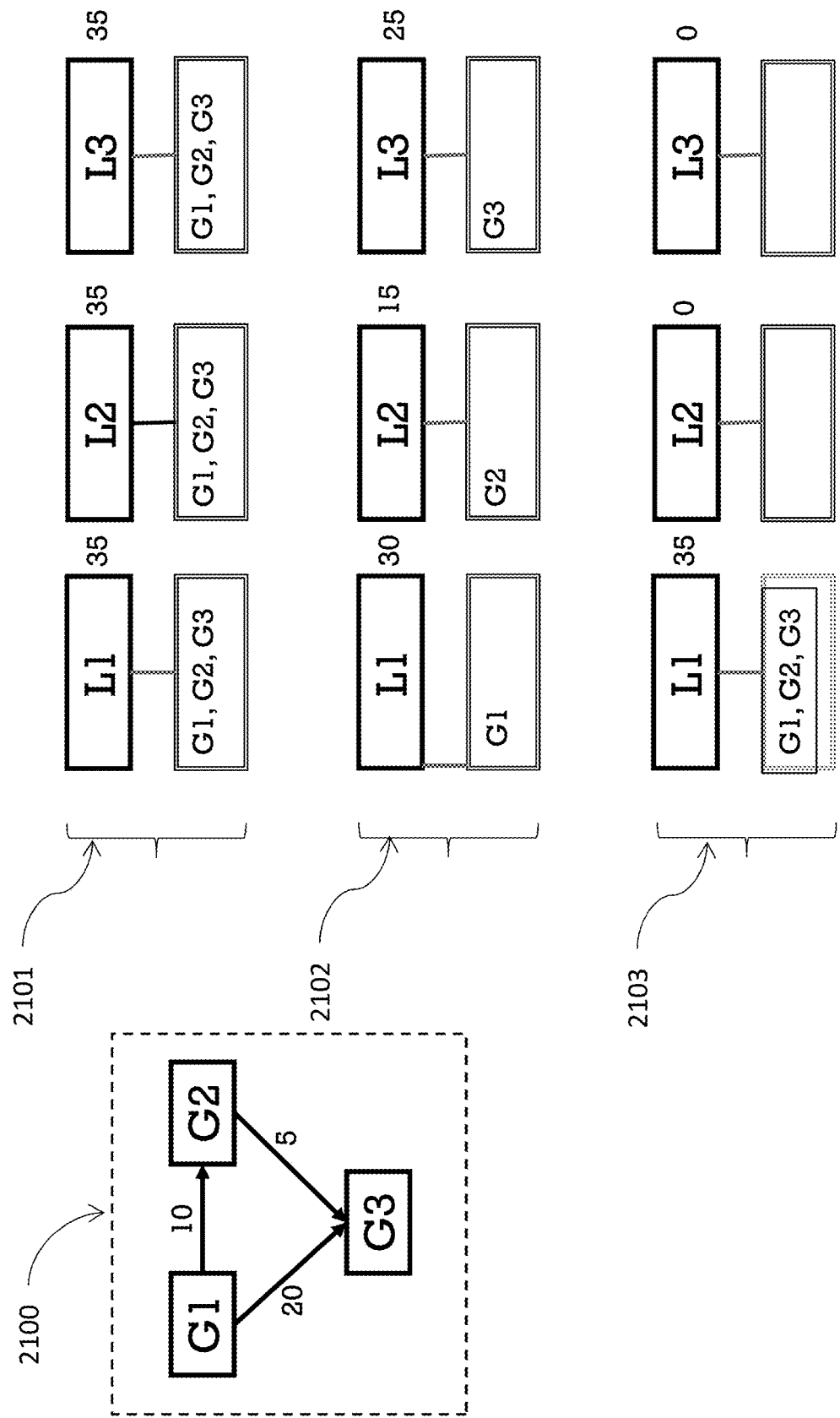

SYSTEMS, APPARATUS AND METHODS FOR MANAGING RESOURCES IN COMPUTER SYSTEMS

RELATED APPLICATIONS

This application claims the benefit of U.S. Provisional Patent Application No. 62/435,497 (filed Dec. 16, 2016), the disclosure of which is hereby incorporated by reference in their entirety and for all purposes.

In addition to the disclosure contained in the aforementioned application, the systems, apparatus, and methods contemplated and disclosed in this application can be used and applied based on, and in combination with, the disclosures contained in U.S. Non-Provisional application Ser. No. 12/492,890 (filed Jun. 26, 2009; now U.S. Pat. No. 8,914,511), Ser. No. 12/540,259 (filed Aug. 12, 2009, now U.S. Pat. No. 8,661,131), Ser. No. 12/540,273 (filed Aug. 12, 2009, now U.S. Pat. No. 8,762,531), Ser. No. 12/540,293 (filed Aug. 12, 2009, now U.S. Pat. No. 8,396,807), Ser. No. 12/540,298 (filed Aug. 12, 2009, now U.S. Pat. No. 8,433,801), Ser. No. 14/539,973 (filed Nov. 12, 2014), Ser. Nos. 14/810,284, 14/810,302 (now U.S. Pat. No. 9,830,566), Ser. No. 14/810,327 (now U.S. Pat. No. 9,830,192) and Ser. No. 14/810,357 (each filed Jul. 27, 2015), Ser. No. 15/152,459 (filed May 11, 2016, now U.S. Pat. No. 9,805,345), Ser. Nos. 15/351,319, 15/351,342 and 15/351,356 (each filed Nov. 14, 2016), Ser. No. 15/353,992 (filed Nov. 16, 2016), and Ser. No. 15/474,222 (filed Mar. 30, 2017), and U.S. Provisional Application Nos. 62/077,898, 62/077,852, and 62/077,860 (each filed Nov. 10, 2014), 62/159,883 (filed May 11, 2015), 62/255,859 (filed Nov. 16, 2015), 62/256,559 and 62/256,645 (each filed Nov. 17, 2015), and 62/316,340 (filed Mar. 31, 2016), the disclosures of each of which are hereby incorporated by reference in their entirety and for all purposes.

FIELD

This specification and the accompanying drawing relate generally to managing computer system performance, including systems, apparatus and methods for managing resources, movement of consumers (e.g., applications or other workloads), and performance in computer systems based on the price and/or performance of computer resources or computer resource bundles available from one or more providers in the computer system. More specifically, but not exclusively, systems, methods and apparatus, including computer program products, are disclosed for management of resources and services (e.g., storage, registers, memory, ternary content-addressable memory (TCAM) tables) to route packet sequences in a software-defined networking (SDN) environment.

This application, and the systems, apparatus and methods contemplated and disclosed in this application, are related to and can be used and applied based on, and in combination with, the disclosures contained in the aforementioned patents and patent applications, the disclosures of each of which are hereby incorporated by reference in their entirety and for all purposes. For example, they can be applied to recommend and eventually migrate workloads within and among one or more private (e.g. on-premises) datacenters, and/or one or more providers in a cloud environment. These systems, apparatus and methods can also be used and applied based on, and in combination with, the disclosures contained in Cisco's 2014 White Paper titled "The Cisco Application Policy Infrastructure Controller" (available at http://www.cisco.com/c/en/us/solutions/collateral/data-center-virtualization/unified-fabric/white-paper-c11-730021.pdf) and/or in the paper titled "Cisco Application Centric Infrastructure Fundamentals" (modified Sep. 29, 2016, available at http://www.cisco.com/c/en/us/td/docs/switches/datacenter/aci/apic/sw/1-x/aci-fundamentals/b_ACI-Fundamentals.pdf), the disclosures of each of which are hereby incorporated by reference in their entirety and for all purposes.

The systems, apparatus and methods disclosed in this specification and/or depicted in the accompanying drawings describe particular embodiments and are not intended to be exhaustive of the contemplated configurations and processes.

BACKGROUND

Traditional computer system architectures typically include one or more dedicated computer servers for each application being run, and are often designed to include an excessive allocation of resources in order to be able to handle peak demands. Such partitioning of computer systems through dedicated servers and excessive allocation of resources can be costly, inefficient and difficult to scale and manage.

Virtualization, which refers to the abstraction of computer resources from their hardware or software-based physical constructs, is one manner of dealing with the aforementioned problems. One approach to virtualization is based on one or more virtual machines (VMs), each of which is a software implementation of a computer that executes programs or applications as if it was a physical computer. A virtual machine operates like a physical computer and contains, for example, its own virtual (e.g., software-based) central processing unit (CPU), random access memory (RAM), hard disk storage, and network interface card (NIC). Each virtual machine in a virtualization system generally runs its own guest operating system (OS), and the virtual machines generally share the underlying physical machine resources of the system.

Another approach to virtualization is based on one or more containers, each of which is allocated exclusive access to compute resources, using a separate name space, which it may use to execute applications or programs, as if it was a separate operating system.

There are many potential benefits to operating in a virtualization system versus traditional architectures. For example, by permitting the sharing of hardware among applications workloads, virtualization can be used for improving resource utilization and reducing the need for excess resources to absorb peak traffic. Virtualization can also be used to improve the availability and robustness of applications, by shifting workloads among servers to handle fail-over situations. Similarly, virtualization provides flexible partitioning of applications, deployment, and operations. Notwithstanding the potential benefits, operating in a virtualization system presents several challenges and potential pitfalls, including significant operations management challenges.

For example, virtualization systems perform several input/output (I/O) intensive tasks—often concurrently. When multiple VMs or containers request to execute heavy-storage tasks at the same time (e.g., VM reboots, anti-virus database updates, OS updates, virus scans, and so on), storage controllers can face unrecoverable I/O congestion.

Conventional virtualization does not prioritize actions and account for resource impact of such actions. Managing resources in conventional virtualization systems includes evaluating alternative providers for a service or resource by comparing the attributes of the new service or resource and the current one. For example, when considering moving a VM, or a container, to a new storage device or array, conventional virtualization systems often consider the available storage amount and the data access latency of the new storage location, but ignore the time and resources it takes to move the VM, or container, to the new storage location. The impact of moving a VM can become significant when the amount of associated data to move is relatively large.

In addition, conventional virtualization systems render decisions based on the immediate impact of performing an action, rather than future impact (e.g., benefits) of an action. The virtualization systems may attempt to take into account a variety of parameters, such as how these parameters have evolved in the past, and how they are likely to evolve in the future. These systems, however, generally make decisions now (for the present time) and do not postpone decisions to the future. Moreover, in the past, predictions of future evolution have historically been rarely accurate.

Furthermore, conventional virtualization systems either do not allocate sufficient, or allocate too many, resources to an application that is initially deployed. In some systems, a default configuration is used. However, the default configuration may not be application-specific, may not consider the particular demand profile of the application, and/or cannot account for varying actual demand of the application. In other virtualization systems, modified configurations are based on best practices for an application type and/or artificial load tests in a simulated production environment. A single configuration generally cannot consider all possible application demands, and artificial load tests do not generally reflect with complete accuracy application demands in the production environment.

As an additional challenge, once an application is deployed, configurations are generally altered only in response to reported degradation in application performance. Performance metrics are collected and analyzed and the configuration can be manually changed to reflect a user's understanding of the correlation between the performance degradation and the existing configuration. Unfortunately, the resulting configuration is static and, again, best suited for a single level of demand. If application demand is less than the target of the resulting configuration, the system's resources will be overprovisioned and result in waste. Alternatively, if application demand exceeds the resulting configuration, the performance of the application is limited. In any case, altering configurations in conventional virtualization systems generally occur only after the application performance has degraded, whereas overprovisioning resources for a particular application is generally not subject to detection.

Additionally, current planning techniques for future application demands involve making assumptions about future changes in infrastructure capacity based on historical infrastructure utilization. For example, if the environment is currently utilized at a rate of 50% and the assumption is that application demand will increase by 20% in the next 12 months, then a conclusion is made that the environment will be utilized at a rate of 60% in 12 months. However, these assumptions are generally based on infrastructure changes—not application demand. Despite any relationship between application demand and infrastructure utilization, these assumptions are generally not based on actual data and can result in overprovisioning or in limiting resources for a particular application.

An alternative virtualization technique can be found in container systems. Container systems provide an operating-system level virtualization in which the kernel of an operating system can allow for multiple isolated user space instances. Stated another way, a container is based on server virtualization that uses a shared operating system. Rather than virtualizing hardware and creating whole virtual machines, each with their own operating systems, containers run atop the shared operating system kernel and file system that looks and feels like a complete, isolated instance of the operating system. Like shipping containers for cargo, these software containers can ship applications across different network-based systems (e.g., cloud computing based systems) and limit the impact of one container's activities on another container.

A container system may include software abstractions to virtualize computer resources (or compute resources) which are used by applications running in the container ("containerized" applications). The container system provides means to provision containers, allocate and control the resources available to a container, deploy and execute applications in the container, and facilitate full use of the container resources by such containerized applications, while isolating them from other applications, sharing the underlying resources. When a containerized application accesses a virtualized container resource (e.g., CPU, memory, storage I/O, Network I/O), the container system maps this access to a direct access of the underlying real resource.

Container systems, like virtual machine systems, provide means for abstracting computer resources (or compute resources), controlling and isolating the allocations of these resources to applications, distributing and migrating applications flexibly, among multiple servers, to support scalable, highly-available, robust and efficient datacenter (DC) and cloud systems. Additional information on containers can be found, for example, at Linux Containers (available at https://linuxcontainers.org), http://en.wikipedia.org/wiki/Docker_(software), and https://hadoop.apache.org/docs/r2.4.1/hadoop-yarn/hadoop-yarn-site/YARN.html, each of which is hereby incorporated by reference in its entirety and for all purposes.

Since containers are based on shared operating systems, unlike virtual machines, they do not require guest operating systems and thus avoid some of the overhead of virtual machines. For example, deploying and configuring a container may involve setting data structures to map container resources to server and OS resources. Therefore, deploying and configuring a container can often be accomplished in seconds; deploying a virtual machine and a guest OS and configuring both to run an application may require substantially more time. Studies have shown that container-virtualization can offer significant efficiencies and performance advantages over virtual-machines—e.g., see "An Updated Performance Comparison of Virtual Machines and Linux Containers," by W. Felter et al., IBM Research, Jul. 21, 2014, available at http://domino.research.ibm.com/library/cyberdig.nsf/papers/0929052195DD819C85257D2300681E7B/$File/rc25482.pdf, the disclosure of which is hereby incorporated by reference in its entirety and for all purposes.

A virtualization system may mix and match virtual machines and containers. For example, containers may run over virtual-machines. Additionally, a group of virtual machines may be containerized, much like any application, and executed by a container.

With lower overheads than VMs, the number of containers sharing a host is often an order of magnitude (e.g., 50-200) larger than the number of VMs (e.g., 5-20). Furthermore, containers perform a faster dynamic of change events (e.g., deploy, delete, increase/reduce resources, and so on). Accordingly, container system management presents challenging scalability and response time problems compared to VMs.

Furthermore, software-defined networking (SDN) is an approach to computer networking that allows network administrators to manage network services through abstraction of lower-level functionality (e.g. routing, firewall configuration, or load balancing). SDN architectures decouple network control (control plane that makes decisions about where network traffic is sent) and forwarding functions (the data plane that forwards traffic to a selected destination), enabling network control to become directly programmable and the underlying infrastructure to be abstracted from applications and network services. Conventional SDN architectures can be associated with an OpenFlow protocol, which is a communications protocol that gives access to the forwarding plane of a network switch or router. An OpenFlow protocol uses, for example, ternary content-addressable memory (TCAM) tables to route packet sequences. If flows arrive at a switch, a flow table lookup is performed in the TCAM table. Typically, a TCAM table is a set of registers. And as with any other computing resource, the TCAM table is a finite size (for example, about 32 KB) that limits the functional bandwidth of a system.

There exists a need for improved management of resources and services in an SDN environment, including, for example, improved control of network services provided to virtual hardware or virtual operating system containers in SDN environments.

SUMMARY

This specification describes new technologies relating to the management of resources and performance in virtualization systems, including container systems and multi-cloud systems. For example, these technologies introduce the use of supply chain economics and other techniques to offer a unified platform to integrate, optimize or improve, and automate resource and performance management in a container system. The economics-based methods can also extend to other virtualization systems for managing application performance. In some embodiments, the systems, apparatus and methods described herein are used to assist in the management of ternary content-addressable memory (TCAM) or similar tables (or set of registers or memory of any type) to route packet sequences in a software-defined networking (SDN) environment.

1. In general, one aspect of the subject matter described in this specification can be embodied in methods that include the actions of, for example, determining a TCAM resource to be purchased for a consumer entity operating as part of an endpoint group in the computer system using the consumer entity's available budget of virtual currency units, setting, by a TCAM manager, a purchase price to be offered to the consumer entity for usage of the TCAM resource, wherein the set purchase price is based at least in part on a determined resulting impact on the TCAM's utilization from assigning the TCAM resource to the consumer entity, confirming that the consumer entity's available budget of virtual currency units is sufficient to pay the determined purchase price for the TCAM resource; and purchasing, by the consumer entity, usage of the TCAM resource. According to various embodiments, the set purchase price is inversely proportional to the square of (1−(TCAM usage/TCAM capacity)). In other embodiments, the set purchase price is inversely proportional to the square of (1−U), wherein U is calculated as (DLU+DELTA−DISCOUNT)/DLC, and wherein DLU is the number of TCAM slots used in a destination leaf, DELTA is zero if the destination leaf is the same as the current leaf of the consumer entity or if one or more members belonging to the same endpoint group as the consumer entity are being hosted under the destination leaf, otherwise, DELTA is a determined number of additional slots required at the destination leaf if the consumer entity is hosted under it, DISCOUNT is a determined percentage of consumer entities belonging to the same endpoint group being hosted under the destination leaf, and DLC is a determined TCAM capacity of the destination leaf. According to other embodiments, the set purchase price is based at least in part on a determined association of the consumer entity with the endpoint group and/or at least in part on the type or identity of the consumer entity. In various embodiments, the computer system is a virtualization system and the consumer entity is a virtual machine, wherein the virtual machine is a software implementation of a computer that runs at least one guest operating system and executes one or more applications on the guest operating system. According to various embodiments, the consumer entity may be a resource provider, physical machine, or storage entity; the computer system may employ a software-defined networking architecture; the TCAM resource may include one or more memory tables or registers; and the endpoint group may include one or more additional consumer entities. Also, according to various embodiments, the TCAM resource may include one or more communication policies which define how the consumer entity is allowed to communicate with one or more additional consumer entities. The aforementioned features and other features discussed herein can be combined in various combinations. Other embodiments include corresponding systems, apparatus, and computer program products.

Additional details of one or more embodiments of the subject matter described in this specification are set forth in the accompanying drawings and the description below. Other features, aspects, and advantages of the subject matter will become apparent from the descriptions contained herein and the accompanying drawings.

BRIEF DESCRIPTION OF THE DRAWINGS

FIG. 8A is an example purchase order data structure for use in purchasing services from a provider element manager in a container system.

FIG. 8B is an example service confirmation data structure for use in confirming or rejecting the purchase of services from a provider element manager in a container system.

FIG. 21 illustrates another exemplary SDN environment in accordance with the principles of the present invention.

Figure 1:
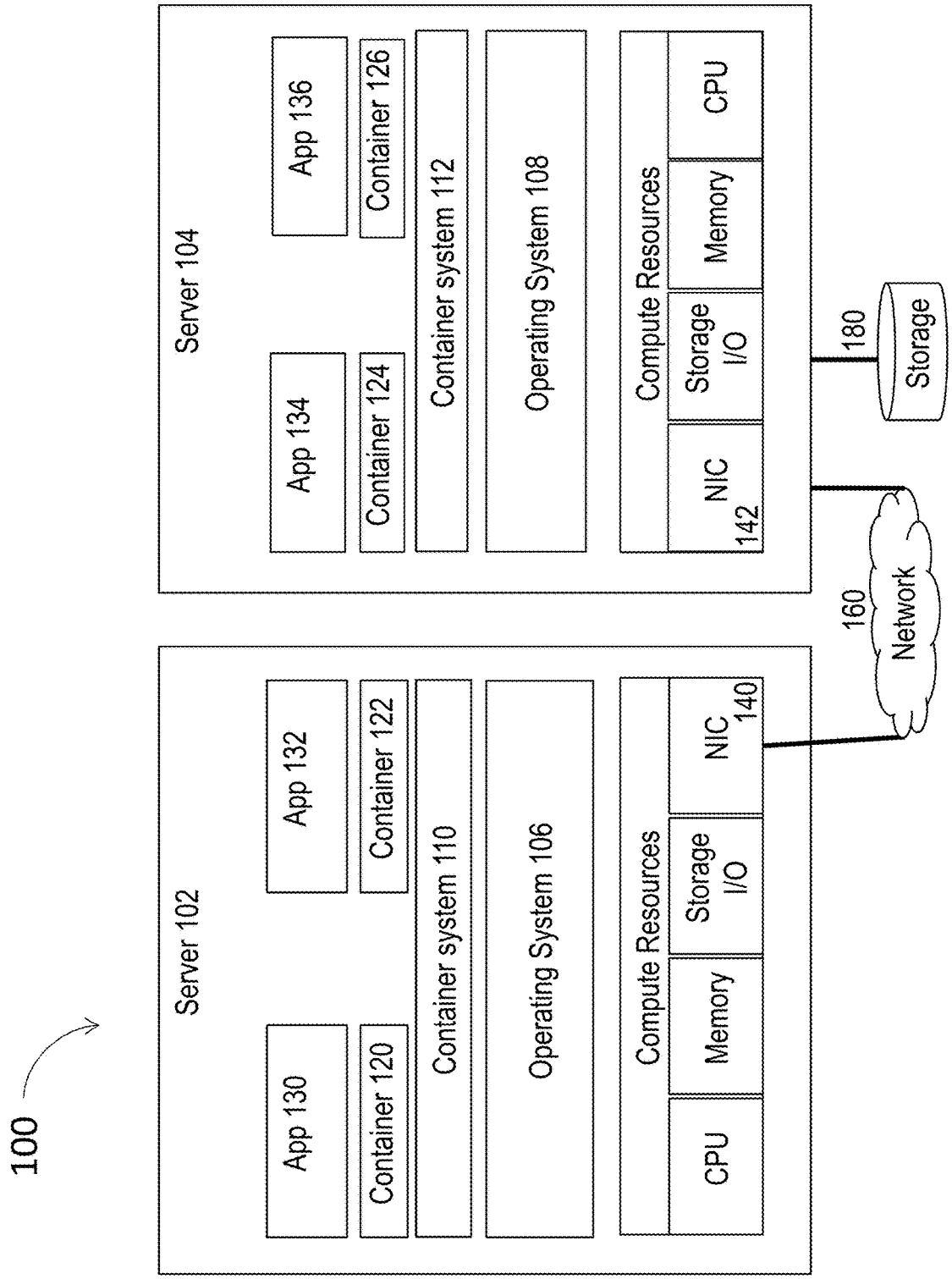
FIG. 1 is a block diagram of an example container environment in which resources are managed.

The aforementioned drawings are not to scale and elements of similar structures or functions are generally represented by like reference numerals for illustrative purposes throughout the drawings. Further, the drawings are only intended to facilitate the description of the preferred embodiments. The drawings do not illustrate every aspect of the described embodiments and do not limit the scope of the present disclosure or claims.

DETAILED DESCRIPTION

FIG. 1 is a block diagram of an example container system or environment 100 in which resources are managed. The example system 100 includes two servers 102 and 104 that run respective container systems 110 and 112. The container system 110, at the server 102, allocates computer resources (or compute resources) of the server 102—e.g., CPUs, memories, storage volume, storage, and/or network I/O pathways and bandwidth—to two containers 120 and 122. Similarly, the container system 112 at the server 104 allocates resources of the server 104 to containers 124 and 126. The containers 120, 122, 124 and 126 execute respective containerized applications 130, 132, 134, and 136.

As previously discussed, container systems admit flexible organizations. In the example system 100, the servers 102 and 104 may be physical machines with physical computer resources (or compute resources). Alternatively, the server 102 may be a virtual machine with virtualized resources while the server 104 is a physical server. The containers 120, 122, 124 and 126 may be distinct containers, or replicated copies of a single container. In some embodiments, a group of containers may be clustered into a container-Point-of-Delivery (cPOD) system, to run related applications. For example, a multi-tier Web service may include a containerized Web server (shown as the application 130), a containerized application server (shown as the application 134), and a containerized database server (shown as the application 136). The Web server provided by the application 130 can maintain significant level of communications with the application server provided by the application 134. The I/O pathway between the applications 130, 134 traverses the application 130, the container 120, the container system 110, an operating system 106, a network interface card (NIC) 140, a data network 160, a NIC 142, an operating system 108, the container system 112, the container 124, and the application 134.

In this example, the portion of the aforementioned I/O pathway that includes the NIC 140, the data network 160, and the NIC 142 traverses network switches and links, and can thus result in significant I/O latency as well as bandwidth limitations. A container manager 236—considered below and shown, for example, in FIG. 2—can migrate (ship) the container 120, with the application 130, from the server 102 to the server 104. This migration replaces the I/O pathway from the application 130 to the application 134 with a pathway that includes the application 130, the container 120, the container system 112, the operating system 108, the container system 112, the container 124, and the application 134. Advantageously, this modified I/O pathway entirely can be handled by the server 104 through memory transfers. This in-memory I/O pathway can support very high memory transfers bandwidth and very low latency, thus improving performance of the container-Point-of-Delivery (cPOD) system.

Although a specific environment 100 including the two servers 102 and 104 is shown in FIG. 1 and described above, it will be understood that the environment 100 is illustrative only. For example, the environment 100 may include more than two servers, and each of the servers 102 and 104 may be associated with any number of containers as desired.

The principles described herein may be applied regardless of the particular application or applications being run in the container system.

Figure 2:
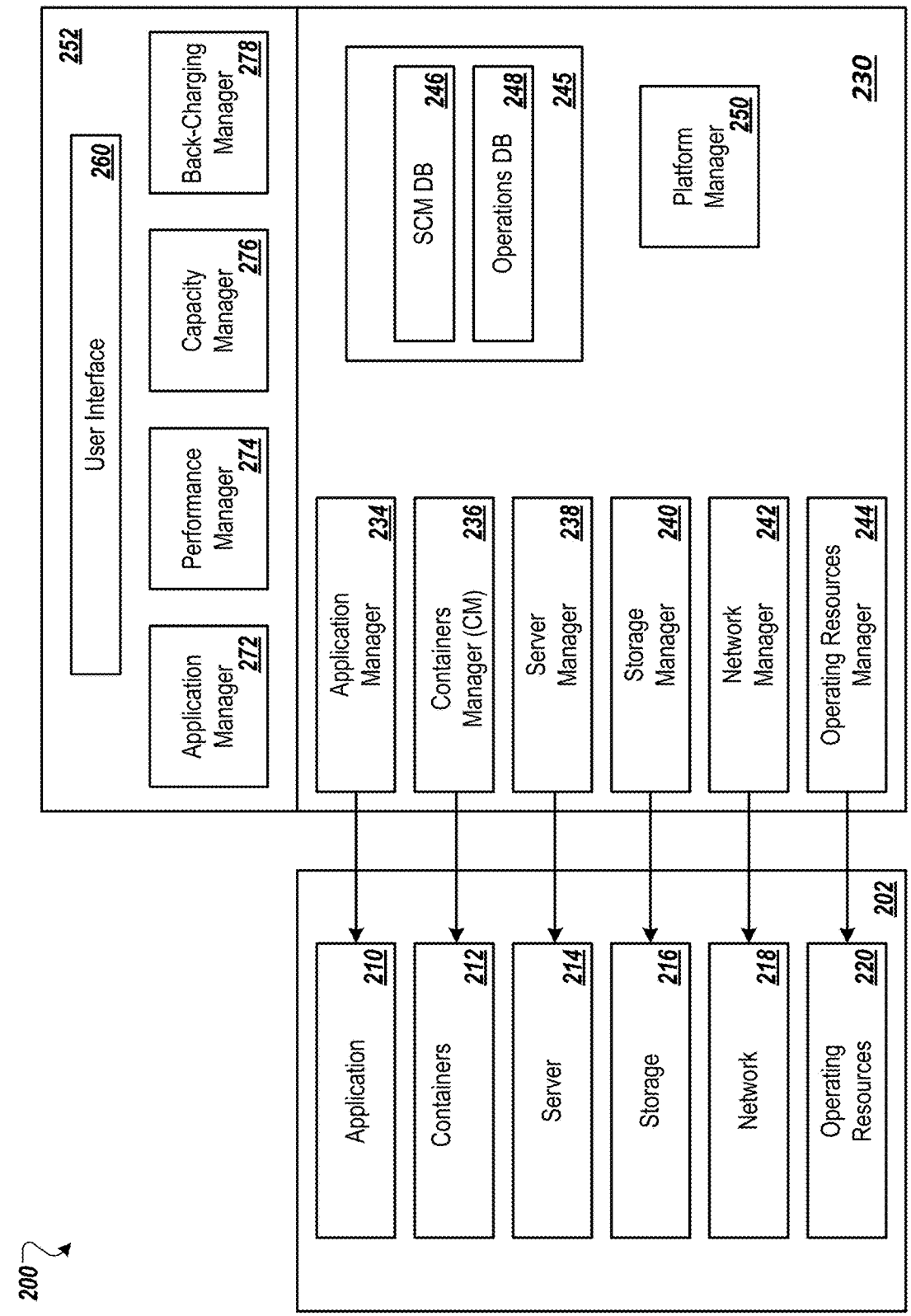
FIG. 2 is a block diagram of an example software system for managing resources in a container system.

FIG. 2 is a block diagram of an example software system 200 for managing resources in container systems, such as the container system 100. According to various embodiments, the software system 200 may be used to allocate server and I/O resources (such as CPU, memory, flash storage, hard drive storage and I/O bandwidth) to containers. The software system 200 also may be used, for example, to monitor, detect, and handle congestion conditions at a resource (e.g., I/O pathway, memory, and so on) and to move containers among available servers to optimize or improve application performance and resource utilization.

The software system 200 monitors, controls, and otherwise interacts with various managed container system elements (also referred to herein as service elements or computer elements) through respective instrumentation. As used herein, in the context of computers, the term "instrumentation" refers generally to any software and/or hardware that provides an ability to monitor, control, or otherwise interact with a computer element, such as to detect operations events, reconfigure parameters, diagnose errors, and write trace information. For example, when a computer application contains instrumentation code, the computer application may be managed using a management tool.

Several example container system elements are shown in FIG. 2 as part of an Information Technology (IT) Container Stack (ITCS) 202, including applications components 210, container systems 212, servers 214, storage systems 216, networks 218, and operating resources 220 (such as power supplies, cooling systems, and rack space). In some embodiments, the ITCS 202 may include, for example, a proper subset or a proper superset of these container system elements 210, 212, 214, 216, 218, and 220.

As shown, the software system 200 includes a platform layer 230, which provides an infrastructure to manage, for example, the I/O flows in a container system (such as the example container system environment 100 shown in FIG. 1). The platform layer 230 includes element managers 234, 236, 238, 240, 242, and 244. More particularly, the platform layer 230 includes an application manager 234, a container system manager 236, a server manager 238, a storage manager 240, a network manager 242, and an operations manager 244. These element managers 234, 236, 238, 240, 242, and 244 use management instrumentation of respective elements to monitor and control the respective elements of the ITCS 202.

For example, the server manager 238 may use built-in management instrumentation, such as Management Information Bases (MIBs) of the server it is managing, to monitor the server's CPU, memory, and I/O interfaces (such as a Host Bus Adapter (HBA) and NICs) and to control their operational parameters. The server manager 238 may access such management instrumentation using standardized protocols (such as Simple Network Management Protocol (SNMP)) or specialized mechanisms. In some embodiments, a proper superset or only a proper subset of these element managers 234, 236, 238, 240, 242, and 244 may be desired or needed in certain environments. For example, when the containers do not access storage, the use of a storage manager 240 may not be needed. Additionally, for example, an operating system element manager (not shown) may be included as part of platform layer 230.

As also shown, the platform layer 230 also includes one or more types of modeling databases 245. As discussed in more detail below, the databases 245 may include supply chain modeling (SCM) databases 246 and operations databases 248. It will be understood that these and/or other databases discussed herein can be implemented as in-memory repositories. The platform layer 230 also includes a platform manager 250, which, as explained in greater detail below, can be responsible for general provisioning, initializing, and management tasks.

The software system 200 shown in FIG. 2 also includes a functional management layer 252, which includes user interface (UI) software 260 for use by administrators or other users to monitor and control a container system (such as the example container system environment 100 shown in FIG. 1). For example, an administrator may use the UI software 260 to set proactive automation policies to optimize or improve performance and resource utilization, detect and resolve operational problems and performance bottlenecks, allocate priorities and usage charges to different applications, and plan capacity expansions.

The functional management layer 252 also includes a collection of functional managers 272, 274, 276, and 278, which are used to enable users to monitor, control, and automate the underlying automated management mechanisms of container systems according to the principles described herein. The software system 200 may alternatively include, for example, a proper subset or a proper superset of these functional managers.

As shown in FIG. 2, the functional management layer 252 includes an application manager 272, which, for example, enables users to select or configure respective parameters of a computer agent or process to partition application components among different containers, allocates virtual budgets to applications based on the business value of their services, as described in greater detail below, and specifies the resources required by the applications. The application manager 272 uses the parameters to create respective records in the operations databases 248. The platform manager 250 uses the operations records to initialize respective application managers 234, which use the operations records to deploy the applications 210, according to the principles described below. Additional functions of monitoring and controlling applications may be incorporated into the application manager 272.

The functional management layer 252 also includes a performance manager 274, which allows users to monitor and control the delivery of Service Level Agreements (SLAs) to applications. For example, a user of the software system 200 can specify target SLA parameters—such as latency or transaction rate—of one or more particular applications. The SLA parameters are used by the software system 200 to adjust the performance of the applications using the principles described below. A user can also monitor the SLA parameters value, as well as the respective virtual payments made by an application, thereby correlating the application's budget with its SLA performance. Additional functions of monitoring and controlling the performance of applications, as well as the other elements of the ITCS 202, may be incorporated into the performance manager 274.

A capacity manager 276 monitors relationships between the supply and demand of resources in the ITCS 202. For example, the capacity manager 276 may monitor the relationships over a predetermined time period, which can range from short term (such as a few minutes or one hour) to long term (such as one day, week, month or year). In some embodiments, the capacity manager 276 maintains full accounting of revenues and costs and provides monitoring of these accounts and notifications upon certain accounting events. The capacity manager 276, by itself or with the assistance of an incorporated or separate Return-on-Investment (ROI) manager (not shown), enables a user to monitor the ROI of the elements in the ITCS 202. The ROI is defined as revenue divided by cost, where revenue is the income from virtual payment collected by a selected element and cost is the virtual payments by the element for the resources that the element uses.

For example, a large ROI may indicate to the capacity manager 276 that there is excess demand over supply of the element capacity, and a sustained high ROI may thus indicate insufficient capacity. The capacity manager 276 compares a monitored ROI with specific and potentially predetermined ROI targets, which may be configured by an administrator or other user, to recommend capacity increases of particular elements to meet demand. According to the supply chain economic principles described below, the ROI of an element in the ITCS 202 may be considered as a central metric of economic value.

The ROI may be calculated at any appropriate time and for any appropriate duration over which revenue and cost are considered. Thus, the principles described herein provide an accounting framework to quantify and measure the value generated by components of the ITCS 202. For example, at the bottom of the ITCS 202, there are raw resources that generate real (non-virtual) costs, such as monetary costs that are paid to an electric company. At the top of the ITCS 202, there are applications that play roles in generating real (non-virtual) revenues, such as monetary sales revenue received from customers. It is possible to treat one or more of the system elements 210, 212, 214, 216, 218, and 220 as virtual Profit and Loss (P&L) entities, generating revenues through payments by its consumers, and paying the costs of services it consumes. The use of virtual currency pricing and payments, as described herein, to distribute a share of these revenues to cover costs increases the efficiency and overall ROI of the entire system. It will be understood that reference to costs, prices and the like herein refers to any suitable denomination or unit of currency, including virtual currency, physical currency, or electronic currency, whether or not tied to any government-issued or "real world" monetary unit or system A back-charging manager 278 monitors and accounts for the virtual cash flows between elements in the ITCS 202 and enables users to flexibly compute financial metrics of interest. For example, users can monitor metrics describing the allocation of application budgets to acquire supply chain resources, the allocation of a resource among the workloads of different applications, the ROI efficiency of different resources, and application budgets required to deliver particular SLAs. These metrics and other parameters may be used to support policies on budgeting applications, adjusting the budgets to represent changing prices, capacity, and demand of resources along the supply chain, and converting virtual currency used within the software system 200 to real currency (such as United States dollars, or euros) that is generated by the business units who own the applications and that may be used to pay for IT resources.

Figure 3:
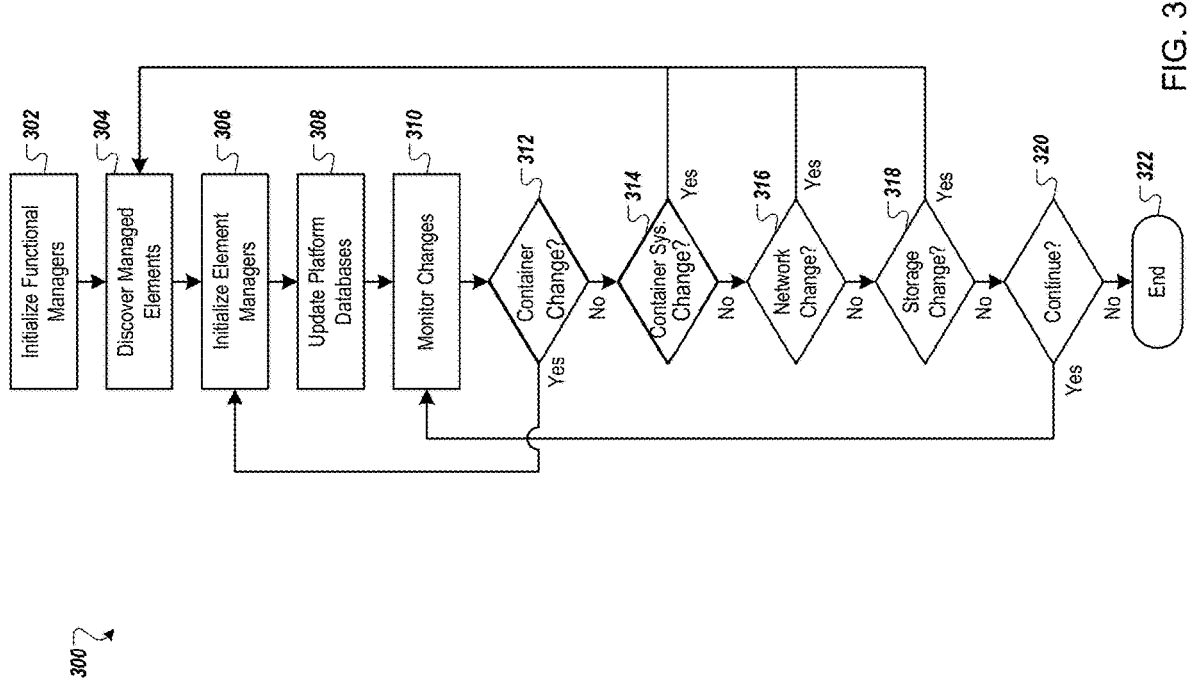
FIG. 3 is a flow diagram of an example process for using a platform manager in a container system.

The platform manager 250 can manage a container system using any suitable means described herein, including using a process 300 as shown in FIG. 3. Turning to FIG. 3, a flow diagram of the example process 300 for using the platform manager 250 in a container system (such as the container system 100) is shown. According to various embodiments which implement process 300, the platform manager 250 initializes, or launches, the functional managers 272, 274, 276 and 278 of the functional management layer 252 for a specific container environment (step 302). The platform manager 250 discovers the managed container system elements of the ITCS 202 in the container environment (step 304). This discovery is handled, for example, through standard processes to get configuration data from the container system, OS, server, network, and storage systems.

The platform manager 250 also initializes, or launches, an element manager (such as one or more element managers 234, 236, 238, 240, 242, and 244, described above) for each group of respective elements of a given class of elements that have been discovered (step 306). For example, the platform manager 250 may detect a Dell® server and a SUN® server, and the corresponding groups of respective elements may both be assigned respective element managers. The platform manager 250 configures the element managers to monitor and control the respective elements via respective management instrumentation.

The platform manager 250 populates and initializes the platform modeling databases 245—for example, the supply chain modeling databases 246 and the operational databases 248 (step 308)—and starts monitoring certain potential changes of the managed environment (step 310). For example, the container system 100 may be monitored to determine if there have been any container changes, such as any added, deleted, or migrated container (decision block 312). If a container change has been detected, the platform manager 250 again initializes the element managers as described above.

If no container changes have been detected, the presence of container systems is evaluated to determine if there have been any container system changes, such as any added or deleted container system (decision block 314). If a container system change has been detected, the platform manager 250 again discovers the managed container system elements of the ITCS 202 in the container environment as described above. Otherwise, the platform manager 250 evaluates whether there have been any major network changes (decision block 316), in which case the platform manager 250 similarly re-discovers the managed container system elements of the ITCS 202 in the container environment as described above. For example, the platform manager 250 may discover loss or gain of network I/O pathways, congestion or under-utilization of an I/O pathway, low or excessive latency of an I/O pathway, or packet losses along an I/O pathway. Otherwise, the platform manager 250 evaluates whether there have been any major storage changes (decision block 318). For example, the platform manager 250 may discover storage I/O congestion, or alternate I/O pathways that would provide better (i.e., lower) access latency. If major storage changes have been detected, the platform manager 250 again discovers the managed container system elements of the ITCS 202 in the container environment as described above.

If no container, container system, network, or storage changes have been detected, the platform manager 250 determines whether to continue monitoring of the same (decision block 320). If the platform manager 250 decides to continue monitoring, the platform manager 250 again starts the monitoring of potential changes of the managed environment. Otherwise, the process 300 ends (end block 322).

The order of steps in the example process 300 described above is for illustration purposes only, and can be done in different orders. For example, the platform manager 250 may evaluate whether there has been any major storage changes (decision block 318) before determining whether there has been any major network changes (decision block 316). Moreover, additional steps may be included, for example, to protect the software system 200 against its own failures. Such additional steps may include, for example, inserting between steps 308 and 310 described above the steps (not shown) of creating a mirror and backup copies of the platform image (including the databases 246 and 248), running a second instance of the software system 200 in standby mode and monitoring the primary instance of the software system 200, and switching to the standby instance of the software system 200 upon detecting the failure of the first instance of the software system 200. Additionally, it will be understood that alternative architectures are contemplated and within the scope of the principles discussed herein. For example, there may exist abstraction at the core, wherein VMs, containers, hosts, and/or other entities are discovered, monitored and controlled using "plug ins" that map the APIs of these environments into the abstraction.

Figure 4:
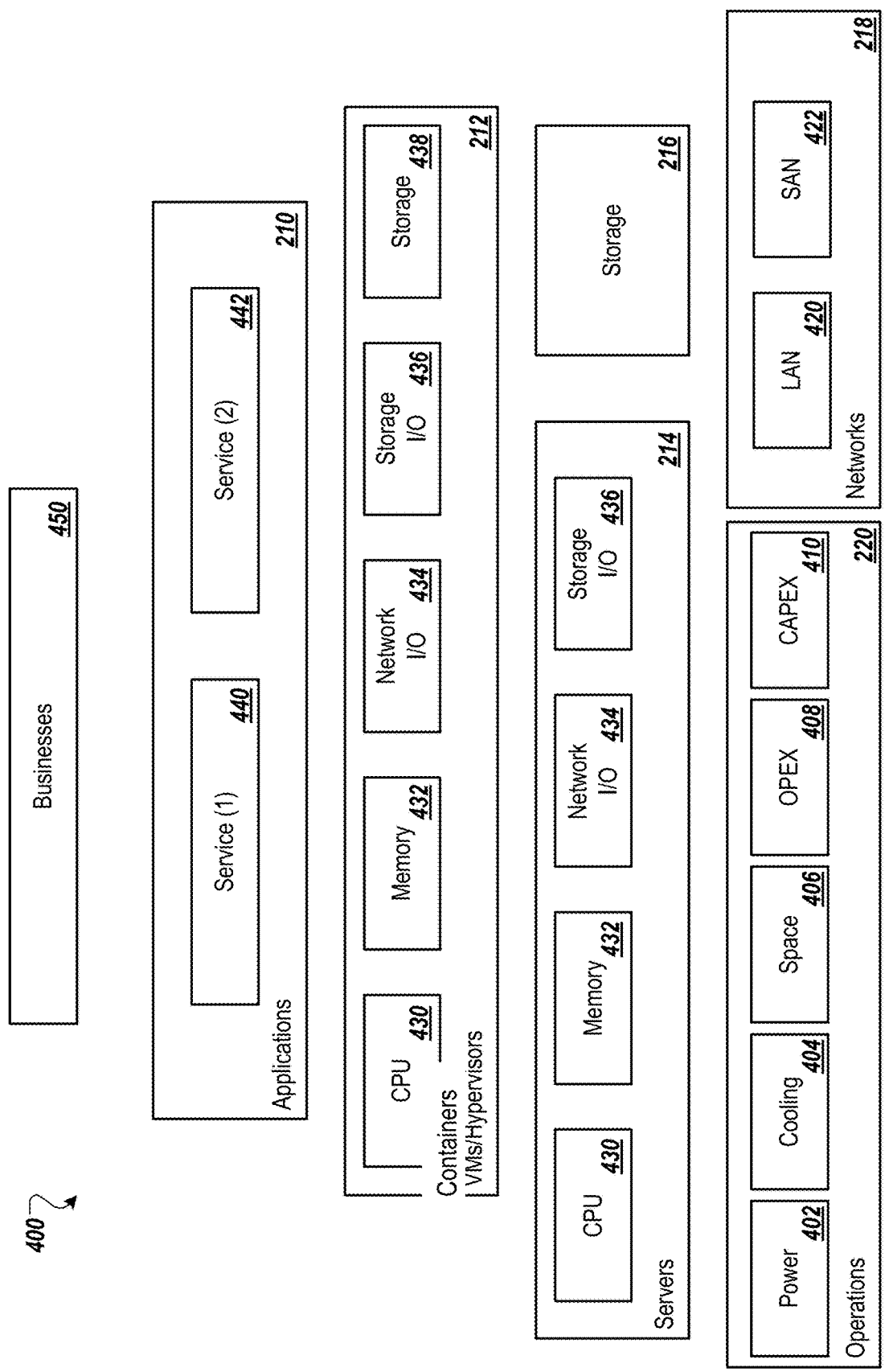
FIG. 4 is an example model for service provision and consumption in a supply chain container system.

According to various embodiments, the software system 200 described above can operate using a supply chain software model of the ITCS 202 that it manages. In other words, each container system element 210, 212, 214, 216, 218, and 220 of the ITCS 202 is modeled as a provider and a consumer of services. For example, FIG. 4 is an example model 400 for service provision and consumption in a supply chain container environment. According to various embodiments as shown in FIG. 4, which includes references to the container system elements of the ITCS 202 shown in FIG. 2, the server 214 may consume services of the operating resources 220, including, for example, power 402, cooling 404, physical space 406, a share of capital expenditure (CAPEX) costs 408, and a share of operating expenditure (OPEX) costs 410. The server 214 further may consume the resources of the networks 218, including, for example, a local area network (LAN) 420 and a storage area network (SAN) 422.

However, the server 214 may provide the container systems 212 with various physical resource services, including, for example, CPU bandwidth 430, memory 432, network I/O bandwidth 434, and storage I/O bandwidth 436. The container systems 212 may also consume storage resources 438 from the storage element 216, and, in turn, may offer services (such as services 440 and 442) to the application 210. The application 210, on the other hand, may offer services to respective business activities of one or more business units 450.

According to various embodiments, the allocation of resources and the processing of workloads through the supply chain, as described above, may be performed through the use of virtual currency. In these cases, supply chain elements use virtual currency to pay for the services they consume and to price the services they offer. For example, a selected application 210 may receive a budget from its business users reflecting the business value of the services that it offers. The application 210 may shop for a container system 212 that offers the lowest priced processing services that the application 210 requires, and may use its virtual budget to pay for these services. The container system 212, in turn, may use its income of virtual currency to pay for the services offered by the server 214, the network 218, and the storage system 216. Each of the container systems elements 210, 212, 214, 216, 218, and 220 of the ITCS 202 may price their services in virtual currency to reflect their costs, and additionally, or alternatively, to balance supply and demand.

According to various embodiments, resource pricing may also be based one or both of capacity or performance characteristics. For example, the server 214 may offer multiple types of processors or CPUs, each with respective clock rates and other characteristics, at different prices. Similarly, for example, storage I/O resources in the storage system 216 and network I/O resources in the network 218 may be priced according to their bandwidth and latency characteristics. This manner of pricing can take into account that, as noted above, I/O pathways internal to a server (i.e., interconnections of containers co-located with a single server, e.g., the containers 120 and 122 as shown in FIG. 1) typically offer higher bandwidth and lower latency than I/O pathways between containers located at different and distinct servers (e.g., the containers 120 and 124 as shown in FIG. 1). Thus, for example, one or more of the components and resources associated with internal I/O pathways (or the aggregate of such components and resources) may be priced lower than components and resources (alone or in the aggregate) for pathways traversing switches and/or involving multiple servers. Alternatively, for example, components and resources associated with such internal I/O pathways may be priced higher to account for an expected increase in performance and thus value to the acquiring entity.

The supply chain model of the ITCS 202 is primarily maintained by the supply chain model databases 246 shown in FIG. 2. According to various embodiments, the supply chain model databases 246 may include one or more financial databases to debit and credit the respective accounts of customers and providers to reflect the transfer of virtual payments, as discussed in greater detail below. It will be understood, however, that non-monetary transactions may be entered into between a consumer and a provider.

The supply chain model databases 246 may be object-relationship databases, such that elements of the supply chain are modeled as objects corresponding to services to be offered. As used herein, the term "objects" refers to data structures including data fields and methods. Examples of service objects include simple and composite service objects.

According to various embodiments, simple service objects—or objects relating to the provision of a single type of service—may include the following types of attributes:
<service-identifier, units, used, available, duration, price ( )>.

The "service-identifier" attribute may itself include the following types of attributes as descriptors of the service that may be used for a particular class of services: <name, type, description, element manager>. For example, a CPU service provided by a Dell® server with an Intel iQ9550® processor managed by an element manager ServerEM015 may be assigned the following identifier: <Dell4, CPU, iQ9550, ServerEM015>.

The "units" attribute may measure the quantity of service, such as 5 Mhz (CPU), 2 GB (memory) or 10 Mbps (net I/O).

The "used" attribute may refer to the amount of the service or resource capacity that is already committed.

The "available" attribute may refer to the amount that remains to meet new demands.

The "duration" attribute may indicated the period of time over which service is to be rendered.

The "price(demand)" attribute may refer to a method whose input is the demand by a service consumer, for a number of service units it requires, which computes the price in virtual currency units, as set by the service provider. For example, the simple service object <<Dell4, CPU, iQ9550, ServerEM015>, 0.1 Ghz, 0.8 Ghz, 2 Ghz, 1 hr, price(x)>, where price(x)=$1/(2-0.1x)^2$, may be used to describe a CPU service named Dell4, providing an Intel processor of type Q9550 for one hour in units of 0.1 Ghz. In this case, a request for 0.5 Ghz (5 units) of this CPU service will be priced at price(5)=1/2.25=$0.44 per one hour of use.

According to various embodiments, the pricing functions used by simple service objects can be flexibly adapted by element managers to reflect different pricing goals and mechanisms. For example, a server may be shared by 10-100 containers, which preferably utilize no more than 50% of its capacity to avoid congestion. In this case, the percentage of average demand to capacity of a given server resource preferably falls between 0.5%-5%.

Consider a commodity service, defined as one where this ratio is very small. With supply far exceeding demand, prices will drop to reflect costs. Thus, a commodity service may be priced at fixed cost-based price. For example, suppose the percentage of average demand to capacity for CPU usage by a container is 0.2%. In such a scenario, the shifting of a container among servers would have negligible impact on the quality of CPU services seen by the containers. CPUs can therefore be priced at a fixed level to merely reflect the costs of providing CPUs. In general, a commodity service may be priced at a fixed level, independently of demand. However, when the ratio of average demand to capacity is sufficiently large, arriving demands may easily deplete the supply absent pricing control, thus requiring higher prices to balance the supply and demand.

A sample pricing function that provides such pricing control is:

$$\text{price}[x] = \text{cost}/(1-(U+x)/C)^4$$

where
C=capacity of the resource;
U=amount of resource used; and
x=new demand.

Such a pricing function is proportional to costs, penalizing high utilization. When the utilization $u=(U+x)/C$ approaches its limit of one, prices increase rapidly, preventing all but the highest budget applications from accessing the resource. For example, suppose containers require, on average, 2% of the CPU capacity of servers, but 20% of their storage I/O capacity. In this scenario, a container wanting to deploy with a server supporting three containers will see the following CPU and storage I/O prices:

$$\text{price}_{CPU}[0.02C] = \text{cost}_{CPU}/(1-0.08C/C)^4 = \text{cost}_{CPU}/0.92^4 = 1.4 * \text{cost}_{CPU}$$

$$\text{price}_{I/O}[0.2C] = \text{cost}_{I/O}/(1-0.8C/C)^4 = \text{cost}_{I/O}/0.2^4 = 625 * \text{cost}_{I/O}.$$

Thus, in the above-described scenario, CPU is priced at a relatively small multiplier of the cost base of CPU, while the storage I/O is priced at a relatively large multiplier of the cost base of I/O. Although specific pricing considerations and mechanisms have been described, a large variety of pricing functions may be used according to other embodiments to best reflect specific use considerations.

Composite service objects, which are objects that include more than one service object and which relate to the provision of multiple types of services, may take the following form according to various embodiments:

<service-identifier, service-1, service-2 . . . ,service-n>, where service-k is either a simple or composite service object and is referred to as a component of the composite service. In some embodiments, the "duration" attributes of all components of a composite service are identical, and their common value is called the duration of the composite service. For example, a hardware server may be described by the following composite service object:

<<server-1, Server, L541>, CPU4, Memory-2, NIC-3, NIC-4, HBA-2> where Memory-2, NIC-3, NIC-4 and HBA-2 indicate respective simple service objects associated with respective memory services, LAN-interface services provided by two NICs, and SAN I/O services provided by HBA-2. The HBA-2 may itself be described by a simple service object as follows:

<<HBA-2, FC-HBA, Emulex, LP11000-M4>, 0.1 Gbps, 1.1 Gbps, 2.9 Gbps, 1 hr, price(x)>.

This service object indicates that the duration of the composite service is one hour, as the durations of all components of a composite service are identical.

In some embodiments, the price of a composite service is defined as the sum of the prices of all its components. For example, the price of a server object is the sum of the prices of the units of CPU, memory, network I/O and storage I/O required by a consumer. Alternatively, for example, the price is defined as the scalar product of quantities and prices for the components (e.g., quantities times prices, added up).

The supply chain model databases 246 are maintained by element managers (such as element managers 234, 236, 238, 240, 242, and 244 shown in FIG. 2), which handle the service objects corresponding to the respective elements that they manage. As explained above with respect to the sample process 300 shown in FIG. 3, according to various embodiments, an element manager is initialized by the platform manager 250, and subsequently the element manager proceeds to populate the supply chain model databases 246 with respective service objects it is responsible for. Once the supply chain model databases 246 have been updated, the element manager continues to update the dynamic attributes of its respective service objects (such as the "used" and "available" attributes). For example, a server manager 238 that is responsible for managing HBA resources will initialize the supply chain model databases 246 with corresponding simple service objects relating to the HBA. The server manager 238 will then monitor and update the "used" and "available" attributes of this simple service object by periodically accessing the HBA instrumentation.

As mentioned above, the supply chain economy matches consumers and providers of resources or services by using pricing and budgeting. According to various embodiments, demand for services is matched to supply through a shopping model. A consumer element manager (such as one of element managers 234, 236, 238, 240, 242, and 244 shown in FIG. 2), desiring services from a provider element manager, queries the supply chain model databases 246 in search of the best priced provider or providers of the desired services. The query specifies requirements and the service or services the element manager is requesting. For example, a query may take the following form:

Query: Server, CPU.units=50 Mhz, Memory.units=4 GB, StorageIO.units=200 Mbps, NetworkIO.units=100 Mbps.

Such a query may retrieve records of composite service objects of the servers 214 offering the respective CPU, memory, storage I/O and network I/O capacity at the lowest price. Once the consumer element manager acquires these records of lowest-priced service objects, it can proceed to extract the identities of the element managers posting these service offerings. The consumer element manager may then pursue direct interactions and contract with one or more respective provider element managers to acquire and pay for the desired services. There exists the possibility that multiple consumers may query the supply chain model databases 246 simultaneously for similar services, and thus potentially interfere with each other's shopping processes. Such interference may be avoided, for example, by providing standard locking mechanisms to maintain atomicity of the query and purchase transactions.

Moreover, various embodiments may use an auction, or bidding model, rather than a shopping model, to match demand and supply. For example, consumer element managers may post respective bids for services in a bidding database, which a provider element manager may then query for the highest bid price offered for its services and contract to serve it. The shopping model is generally preferred to bidding in situations where consumers' demands arrive asynchronously and unpredictably. In such cases, an arriving consumer can find the low-cost provider by searching the supply chain model databases 246. In contrast, a bidding process requires providers to poll, whether constantly or at intervals, the bidding database to detect arrivals of new bids, while bidding consumers may be required to wait until enough providers have polled the bidding database and accepted the bids, and thus contract with providers based at least in part on chance. There are various situations where bidding may offer benefits over shopping, and those situations may be handled using the principles described herein.

Figure 5:
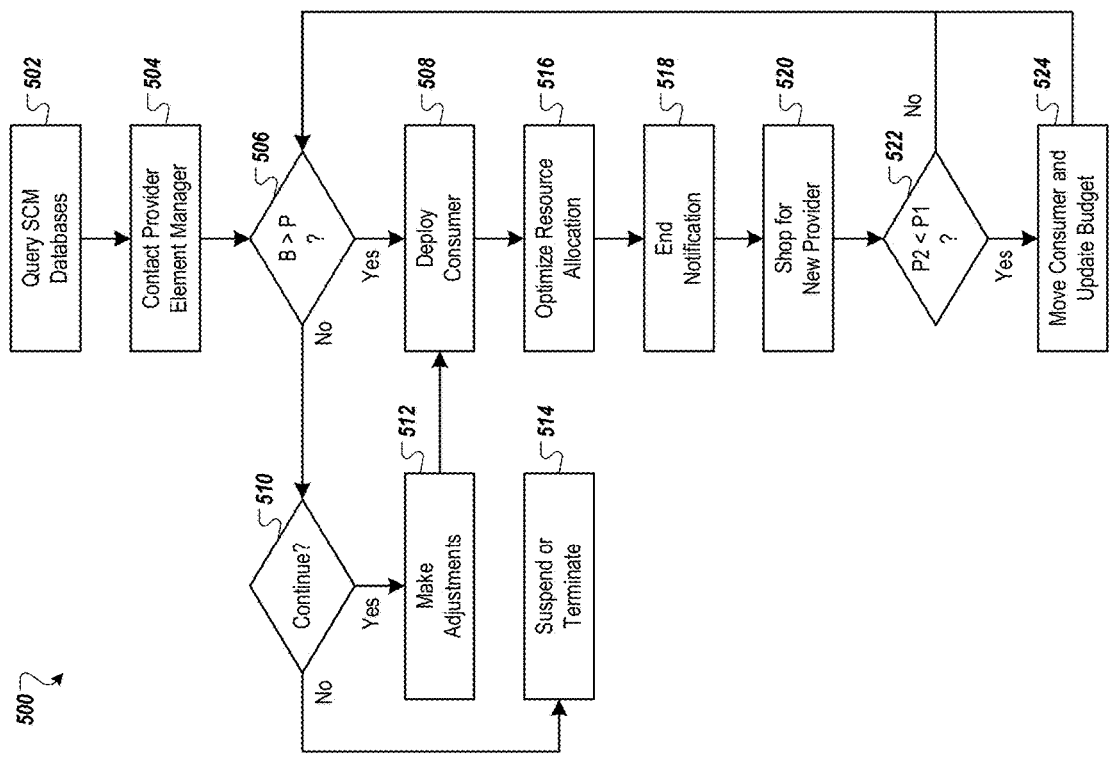
FIG. 5 is a flow diagram of an example process for deploying a new consumer element with a provider element in a container system.

FIG. 5 is a flow diagram of an example process 500 for deploying a new consumer element (such as a container) with a provider element (such as a server) in a container system that is used according to various embodiments for balancing the demand and supply of services. According to various embodiments, the dynamic load balancing approach illustrated by example process 500 provides an effective solution to several of the resource management problems described above. For example, process 500 may be used to improve the balancing of demands by containers and the supply of server resources; it may also be used to balance the resource bundle allocated to a container, e.g., to match the amount of CPU, memory and storage I/O bandwidth allocated to the container, in order to improve the use of its virtual budget to best service its resource demands.

As shown in FIG. 5, once the relevant consumer element managers and provider element managers are running, having been initiated by the platform manager 250, a consumer element manager shops for lowest cost provider for a bundle of services by querying the supply chain model databases 246 as described above (step 502), and contacts the provider element manager to buy services (step 504). In the case of a container consumer, for example, the bundle of services to be purchased may include CPU, memory, and storage I/O.

The provider element manager determines whether the consumer budget is sufficient to pay the price for the requested provider services (decision block 506). If it is determined that there is sufficient budget, the provider element manager deploys the consumer at the provider, which proceeds to process its workload (step 508). For example, CPU and memory resources that have been purchased may be allocated to a container by the underlying scheduler of the container system, which may include the use of a traditional operating systems scheduling algorithm. The server element manager configures the scheduler parameters to accomplish fairly accurate allocation of the CPU and memory. Memory may be allocated by specifying an amount of memory to be provided. The container system can allocate physical memory, based on these specifications, or support virtual memory mechanisms that permit over 100% utilization of physical memory. Additionally, the CPU may be allocated by configuring reservations and shares parameters of the scheduler. For example, reservations may be used to allocate a reserved CPU slice, using a time-shared round-robin scheduler, while shares allocate the remaining CPU bandwidth through a Weighted Fair Queuing scheduler. CPU reservations and shares may be viewed as separate services, and may be individually priced according to supply and demand. For example, a low-priority application may be unable to buy reservations, and may thus need to settle for shares, which may be priced lower. A high-priority, mission-critical application, on the other hand, may have sufficient budget to afford sufficient reservations to support its needs.

Otherwise, if it is determined that there is not sufficient budget, the consumer element manager initiates a credit check process to decide whether the consumer can increase its budget or sufficiently lower its service demands, and thus continue to run (decision block 510). For example, suppose the consumer is a container whose budget is short of paying the cost of a provider server. In that case, the container may use credit it has accumulated to pay for the service, obtain additional budget from the applications it serves, or reduce its demand for services and the corresponding price to the point where it can afford to pay. If one or more of these scenarios is possible, the consumer uses credit, increases its budget and/or lowers its service demands (step 512), and the provider element manager thus deploys the consumer at the provider as described above. Otherwise, if none of these options is available, the consumer is suspended and then will either terminate or re-launch when adequate budget becomes available to it (step 514), as described in greater detail below.

After the provider element manager deploys the consumer at the provider, the provider element manager or the consumer element manager monitors consumer resource usage and adjusts allocation of resources to optimize or improve the use of the consumer's budget (step 516). For example, the provider element manager may find that the consumer is using only 20% of one service it bought, while using 90% of another service it bought. In that case, the provider element manager may reduce the allocation of the first service and use the corresponding released budget to increase the allocation of the second resource.

Upon completion or termination of the consumer service period, the provider element manager notifies the consumer element manager (step 518), which may proceed to shop for a new provider offering lowest cost services to meet the consumer's needs (step 520). The consumer element manager determines whether the price of the new provider found is lower than the price of the old provider (where the consumer resides at the time), or according to some embodiments, whether it is lower by a threshold amount (decision block 522). Assuming it is, the consumer element manager moves the consumer to the new provider, in which case it may also adjust the budget to reflect the price of moving, if any (step 524). Namely, according to various embodiments, a price of moving may be factored into the decision making process for whether the consumer should be moved to the new provider, and such price may be subtracted or deducted from the available budget. Otherwise, if the consumer element manager decides to keep the consumer with the old provider, it does not adjust the budget to reflect the price of moving. In either case, the provider element manager (of the new or old provider) checks to see if the consumer budget is sufficient to pay for the provider as described above.

According to various embodiments, the process of shopping for a new provider 520 may depend on specific characteristics of the consumer, the resource, and/or the provider. For example, the containers 120 and 124 shown in FIG. 1 may need to exchange high-bandwidth latency-sensitive communications through a congested switch in the network 160. Further to the discussion above, internal I/O pathways (including at either the server 102 or the server 104) may offer higher bandwidth and lower latency, and thus result in improved performance. Therefore, according to various embodiments, such internal I/O pathways may be priced lower than I/O pathways involving, for example, multiple servers 102 and 104 and network 160.

As an example, in the step 520 described above and shown in FIG. 5, the consumer element manager may determine that it would be more economical or efficient to move a consumer element from the server 102 to the server 104 based on reduced I/O pathway pricing. For example, the consumer element manager may discover that the container 120 should be moved to the server 104 to obtain one or more resources and communicate with one or more other elements located at the server 104. This can be the case where, for example, it is determined at the step 522 that the overall price of providing container 120 with necessary resources is reduced at least in part because of a lower price of the I/O pathway should container 120 be moved to server 104. In that case, at step 524, the container 120 may be moved to server 104 so that the I/O pathway becomes more (or entirely) local to server 104, thus benefiting from higher expected bandwidth capacity and lower latency.

According to various embodiments, at step 524, the budget of the consumer element (e.g., container 120) may also be adjusted (e.g., increased or decreased) based at least in part in such change in pricing. As indicated above, in an alternative embodiment, the pricing of resources (e.g., associated with the I/O pathway) may be increased to account for performance improvement that would result from movement of a consumer element to another server and the resulting localization.

According to other embodiments, the process of shopping for a new provider 520 may depend on functional characteristics of the consumer or provider. For example, the server 102 may be used to support development of containerized applications. The server 104—the provider, for example—may be used for testing the containerized application 130—the consumer, in this example. The process 500 may be used to select a new provider (the server 104), from among a group of servers providing rests of containerized applications, to run tests (consumer) of the containerized application 130. Similarly, the server 104 may be a production system running containerized applications and the process 500 may be used to dispatch the containerized application 130, and its container 120, from the development server 102 to the production server 104.

The order of steps in the example process 500 described above is illustrative only, and can be done in different orders. Moreover, it is contemplated that modifications and extensions of the process 500 will be used according to various embodiments. For example, a consumer may need to contract with two or more providers to be deployed, as in the case of a container that needs to acquire a bundle of resources offered by a server as well as SAN switch bandwidth and storage space at a storage array. In such scenarios, deployment of the consumer can be supported by extending step 502 to shop for multiple providers and then repeating the remaining steps for each of these providers. Additionally, for example, as explained below with respect to FIG. 6, the example process 500 shown in FIG. 5 may be modified or extended to enable the adjustment of resource allocations to obtain desired service level agreements (SLAs).

According to various embodiments, the above-described supply chain economic principles may also be used to manage software licenses, such as temporary (time-limited) software licenses. For example, regardless of type (such as authorizations of software use per user, per CPU, per server, or per container), licenses may be modeled as resources to be purchased by an application manager 234, much like other resources that it may purchase from the container 212. License element managers (while not shown, may be included as part of the platform layer 230) may be used to set the prices of the licenses based on costs and demands. In this manner, license management may be greatly simplified and unified with the allocation of other types of resources. For example, an application that is unable to acquire a needed license may suspend its operations and release its resources, as explained below, thus increasing the overall efficiency of the system. Additionally, licenses may be more efficiently used, since in situations where the licenses are highly utilized, they will be allocated to high priority tasks, while lower priority tasks may be suspended until they can afford the licenses. As soon as a license is no longer needed, it may be released and available for other tasks. Additionally, an administrator may consider the ROI of licenses, as with other resources, to plan the expansion, or contraction, of licenses capacity. For example, if a license's ROI is above a certain threshold, it may be desirable to acquire more licenses to increase the supply to meet demand.

Figure 6:
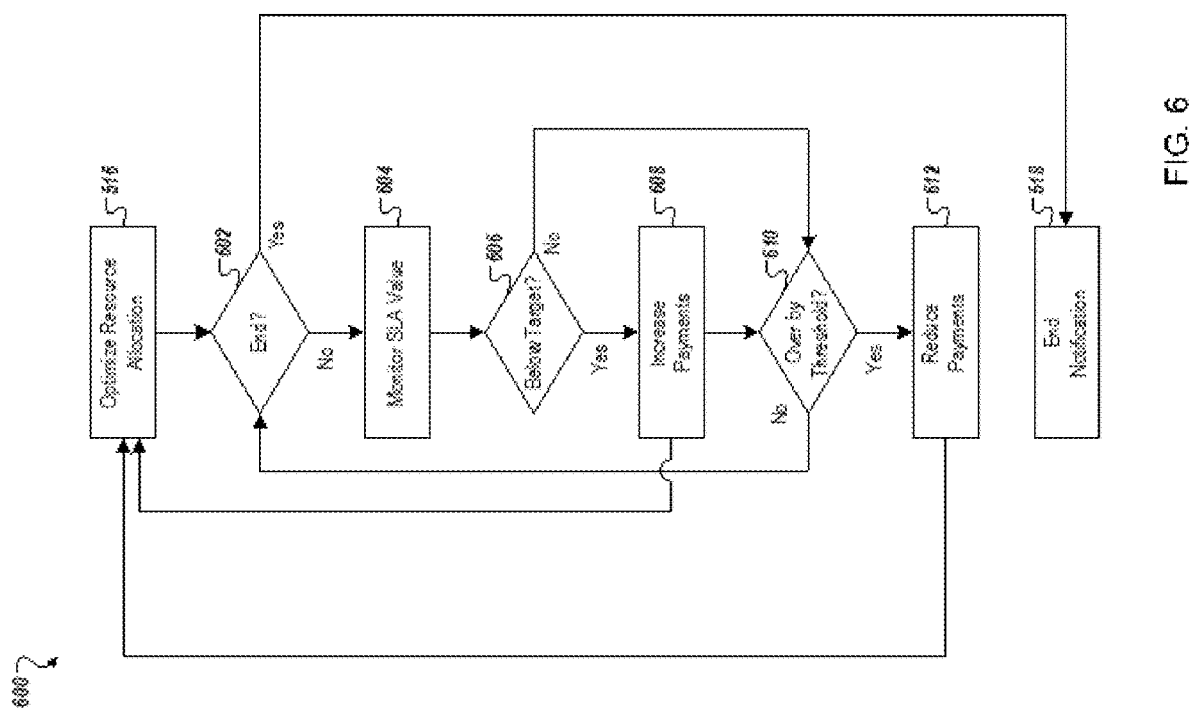
FIG. 6 is a flow diagram of an example process for delivering service level agreement targets through resource allocation in a container system.

FIG. 6 is a flow diagram of an example process 600 for delivering service level agreement targets through resource allocation in a container system, which includes many of the steps of process 500 shown in FIG. 5 and discussed above. Although not required, for the purpose of simplifying the following description, it is assumed that the target service level agreement relates to an application running on a container. However, the service level of other types of computer elements may be controlled in the following manner according to various embodiments.

Following the initial monitoring of resource utilization and optimizing of the container's budget (step 516), it is determined whether the consumer service period has terminated (decision block 602), in which case the provider element manager notifies the container element manager (step 518) as described above. Otherwise, the container element manager monitors and obtains the value of the SLA parameter of interest, such as the average transaction rate of an application, the average transaction delay of an application, the average communications latency of the application, or the number of transactions performed within a predetermined prior time period by an application (step 604). For example, an application element manager may monitor the value of the SLA parameter, through respective instrumentation, and inform the container element manager of the SLA parameter. The application may define its SLA goal as 100 transactions per second, in which case the SLA parameter of interest is transaction-rate. In general, because SLA parameters can be assumed to increase monotonically with the amount of resources allocated to an application, the management of SLAs may be accomplished as described herein by finding a budget and a respective resource allocation that will accomplish the target SLA value.

The container element manager determines whether the SLA parameter of interest is below a desired target (decision block 606), in which case, for example, the application's payments to the container (e.g., of virtual currency units) are increased such that the container's budget is increased, and it is able to purchase more resources to increase the SLA parameter of the application (step 608). After such an increase, the container's budget use is again monitored and optimized or improved as described above.

If the container manager determines that the SLA parameter is at or above the desired target, it is determined whether the SLA parameter exceeds the desired target by more than an acceptable threshold (decision block 610), in which case the payments are reduced, thus reducing the container's budget and the resources it buys, saving on applications costs, and keeping the SLA performance within a desired tolerance range (step 612). After such a reduction, the container's budget use is again monitored and optimized or improved as described above. If the SLA parameter is within the acceptable range, however, a reduction is not applied, and the process is repeated until it is determined that the consumer service period has been completed or terminated.

According to various embodiments, the process 600 for delivering service level agreement targets through resource allocation in a container system may be modified, adapted, and/or simplified for certain resources and SLA metrics. For example, in the case of allocation of I/O pathways to reduce or minimize latency, the process 600 may be modified as follows. The SLA parameter may be selected as the latency-hop-count, e.g., the number of physical switches traversed by an I/O pathway. For example, I/O pathways between elements located, or resident, at the same server (e.g., the containers 120 and 122 in FIG. 1) generally do not traverse any physical switch, and thus may be described as having a latency-hop-count of 0. Such I/O pathways may also be referred to as having Class-0 Latency SLA. On the other hand, I/O pathways between elements located or resident at different servers (e.g., the containers 120 and 124 in FIG. 1) and attached to a common switch (e.g., a common switch of the network 160) may be described as having a latency-hop-count of 1, and may be referred to as having Class-1 Latency SLA. According to various embodiments, an I/O pathway may involve two or more physical switches, and may be described as having a latency-hop-count of 2 (or more) and referred to, for example, as having Class-2 Latency SLA.

According to various embodiments, the latency-hop-count associated SLA value may be described with respect to the ordinal preference {Class-0, Class-1, Class-2, . . . Class-n}, where Class-0 is preferred to Class-1, Class-1 is preferred to Class-2, and so on to the extent additional Classes are defined. With respect to the process 600, a comparison can be made between a Target Latency Class and an Actual Latency Class (e.g., Target=Class-0, Actual=Class-1) at step 606. If the Actual Latency Class does not meet the Target Latency Class, payments to the consumer (e.g., the container) may be increased at step 608, and, following return to step 516, an I/O pathway can be acquired that can deliver the Target SLA Value (e.g., Class-0). For example, the process 600 described with respect to FIG. 6 can be modified in a manner consistent with the above description so as to simplify the monitoring and control of SLA values to classification of the I/O pathway into latency class.

It will be understood that the SLA-delivery process 600 described above may be flexibly adapted to achieve various goals, such as improving its handling of stochastic fluctuations of an SLA parameter. For example, the steps of increasing (step 608) and decreasing (step 612) payments by the application to the container may use standard mechanisms of Stochastic Approximation theory, including the Robbins-Monro or Kiefer-Wolfowitz algorithms, to regulate the changes in payments to assure convergence. Such a design may be implemented, for example, to achieve more desirable results in connection with non-monotonic SLA parameters. For example, an embodiment using a Robbins-Monro procedure may replace steps 606-612 with the following iteration:

$$R(n+1) \leftarrow R(n) + a(n)[\text{SLATarget} - \text{SLAParameter}(R(n))]$$

where n is a counter of the iterations, R(n) is a vector describing the resource bundle allocated after n iterations, SLATarget is the desired value of the SLAParameter, and SLAParameter(R(n)) is the observed value of the SLAParameter after n iterations. The vector a(n) represents the increase/decrease of resources through the n-th step of the iteration; typically a(n)=a/n, where a is a fixed bundle.

Although the SLA-delivery process 600 described above uses an economic model and virtual currency units to control SLA levels, other manners of controlling SLA levels may be used according to various embodiments. For example, the allocation of resources to a container, or to an application, may be independent of any economic budget or transfer of virtual currency units, and may instead be based on other measures of an application's or container's importance.

The process 500 described above may also be modified or extended according to various other embodiments. For example, since current container systems are not readily adaptable to handling the management of storage I/O through HBA or storage systems schedulers, as an alternative to an arbitrary first-come-first-serve process, the process 500 described above may be modified or extended as shown in FIG. 7 to facilitate the handling of storage I/O.

Figure 7:
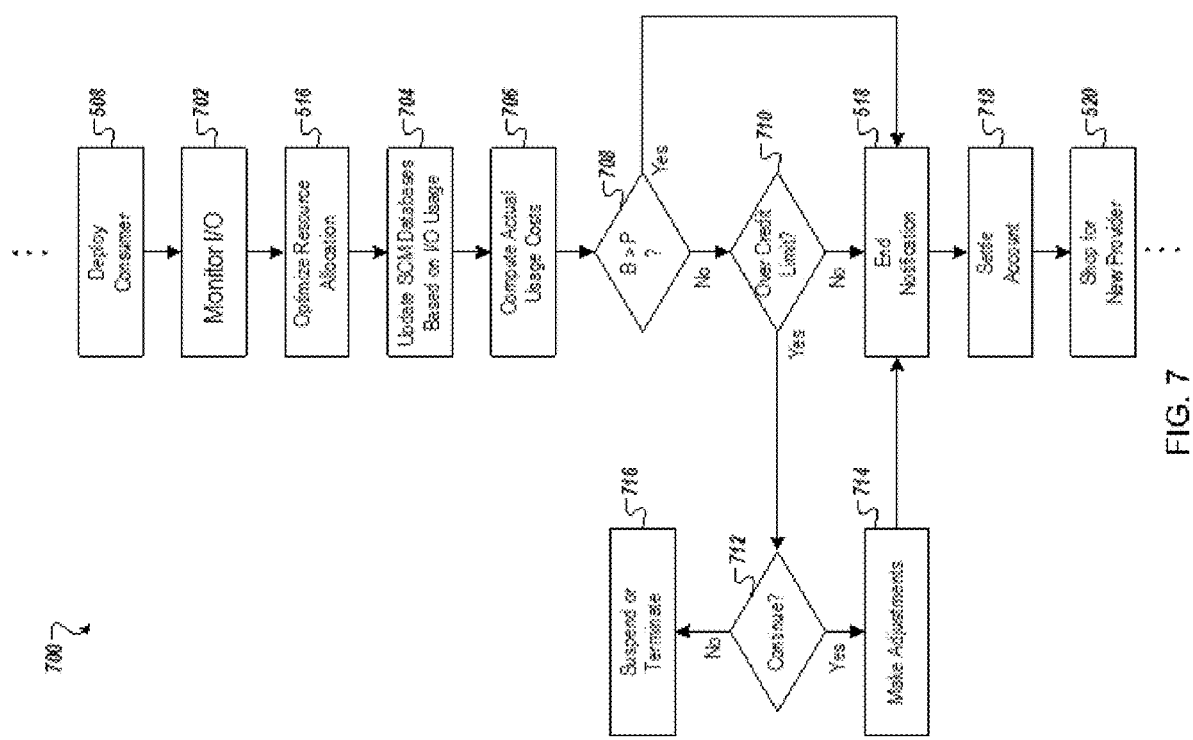
FIG. 7 is a flow diagram of an example process for economic-based I/O scheduling in a container system.

FIG. 7 is a flow diagram of an example process 700 for economic-based I/O scheduling in a container system, which includes many of the steps of the process 500 shown in FIG. 5 and discussed above. Although not required, for the purpose of simplifying the following description, it is assumed that the consumer is a container, the provider is a server, and the resource is storage I/O. It will be understood that, according to alternative embodiments, the resource being managed may be other types of I/O, such as network I/O.

Following the deployment of the container at a server (step 508), the server element manager monitors storage or network I/O usage by one or more containers, such as by collecting data from one or more of the container system, the HBAs (step 702), or the NIC. According to various embodiments, the server element manager may be configured to prevent congestion along storage I/O pathways, as might occur in cases of usage levels approaching the capacity limits. For example, the server element manager may prevent congestion by using pricing functions as described below that increase prices dramatically when utilization approaches 50% of the capacity.

The server element manager optimizes or improves the resources allocated to containers, as described above (step 516), such that containers acquire a share of the storage I/O resources that is commensurate with and optimally reflects their budget. The server element manager then periodically estimates both the average storage I/O capacity used and the average available I/O capacity, and updates the respective attributes of the storage I/O objects in the above-described supply chain model databases 246 with this usage data (step 704). It is noted that the usage data reported to the supply chain model databases 246 will impact price computations, with excessive utilization of storage I/O capacity resulting in respective price increases, and higher prices in turn deflecting demand by new or existing containers to servers with lower utilization (and prices) of storage I/O. For example, price competition over using storage I/O resources may result in migration of low budget containers from overloaded servers to other servers where storage I/O resources are more highly available, and are thus priced lower. Higher priority containers, on the other hand, may use their higher budgets or credit to obtain a preferential share of storage I/O resources.

The server element manager also computes the actual (versus projected) costs expended by each container, and applies these prices to handle its current commitments to containers (step 706). For example, higher usage of storage I/O results in higher prices and immediate costs assigned to containers, such that containers of lower priority and high storage use requirements may quickly exhaust their budget or credit and be suspended or terminated, as described below. In this manner, the low priority containers relinquish storage I/O capacity to containers having a higher priority and, thus, a higher budget.

Based on the computed costs, the server element manager evaluates whether the container's budget is sufficient to pay the cost (decision block 708). If it is, the service period of the container continues until it ends, and the server element manager notifies the container element manager of the completion of the service period (step 518).

Otherwise, if the container's budget is not sufficient, the server element manager evaluates whether the container's credit (costs minus budget) exceeds an acceptable credit threshold (decision block 710). According to various embodiments, high priority containers may have higher budgets and credits and can thus afford to overpay the server element manager to guarantee that they do not run out of storage I/O resources. If it is determined that the container's credit exceeds the threshold, the container element manager initiates a credit check process to decide whether the container can increase its budget or sufficiently lower its service demands, and thus continue to run (decision block 712). If possible, the container makes any necessary adjustments (such as a budget increase in the case of high priority containers, or reduced service demands) and continues to run (step 714), until the service period has ended and the server element manager has notified the container manager of the termination of the service period as described above. Otherwise, the server element manager suspends or terminates the container execution and notifies the container element manager, which becomes responsible for addressing the suspension or termination (step 716).

Upon termination of the service period and notification to the container element manager, the server element manager reports usage data to the container element manager and settles any credit, overpayments or underpayments with the container element manager (step 718). The container element manager may then proceed to shop for a new server offering lowest cost services to meet the container's needs (step 520), as explained above.

The economic-based scheduling process 700 described above may be used effectively to de-correlate peaks of competing, bursty I/O flows. For example, consider the scenario of four containers sharing a common server and a 4 Mbps Fiber Channel HBA, where the containers generate average storage I/O flows of 250 Mbps, 250 Mbps, 200 Mbps and 300 Mbps, respectively. The aggregate demand average of 1 Gbps consumes only 25% of the HBA capacity. A resource scheduler may limit its consideration to only the average demand which, in this case, would be manageable by the HBA and SAN. However, consider an alternate scenario where the I/O traffic streams are bursty, with a peak/average ratio of five for each container. If the four I/O streams associated with the containers are uncorrelated, their peaks will be likely dispersed and the peak of the aggregate stream will generally be less than 2 Gbps, which can be handled by the HBA and SAN with negligible or relatively few queuing delays. However, if the I/O streams are correlated, their peaks may be compounded to generate, for example, up to 5 Gbps peaks, utilizing 125% of the capacity and generating sustainable congestion, delays, and losses. The scheduling process 700 described above reduces the likelihood of compounded peaks, since they result in peak prices and a corresponding depletion of budgets and credits of low budget containers, leading to suspension, termination, or migration of such containers to servers with lower storage I/O prices until they find servers where their peaks are sufficiently de-correlated from other containers.

Thus, the allocation of containers to common servers according to the scheduling process 700 may result in substantially de-correlated peaks and substantially reduce the peak/average ratio seen by servers. For example, consider the example of four containers above. If their peaks are uncorrelated, the peaks of the aggregate stream will generally require at most 1.5 Gbps (the peak of the largest component stream), while their average traffic is 1 Gbps. The burstiness ratio (peak/average) of the aggregate stream 1.5/1=1.5 therefore represents only 30% of the burstiness of the individual streams (1.5 divided by 5). The economic-based scheduling process 700 described above substantially reduces interference not only between traffic averages, but it also reduces the interference between correlated traffic peaks. This results in smoother, less bursty, aggregate workloads, which may permit more efficient processing.

It will be understood that, according to various embodiments, the process 700 described above to manage storage I/O flows may applied to other forms of I/O, such as network I/O. For example, the above description should be understood to include alternative processes whereby references to "storage" are replaced by references to "network." It will similarly be understood that storage I/O flows typically utilize network-I/O flows, such as Ethernet (e.g., Fibre Channel over Ethernet (FCoE)), Transmission Control Protocol/Internet Protocol (TCP/IP) (e.g., Network File System (NFS)), and SAN (e.g., Fibre Channel (FC), Internet Small Computer System Interface (iSCSI)), to transfer information such as storage access commands. The scheduling process 700 is therefore independent of the specific underlying network, and of the specific access commands carried by the described flows. Accordingly, the process 700 may be applied to schedule network I/O flows and thereby provide similar or identical benefits to those associated with storage I/O flows, such as smoothing the peaks of bursty traffic and/or supporting priority services.

The order of steps described above with respect to scheduling process 700 is illustrative only, and can be done in different orders. Moreover, the aforementioned beneficial effects are true not only for I/O streams, but for workloads sharing other resources as well.

The contracting of services between a consumer and a provider, as described in the example processes above, may include the use of a standard request-response protocol (such as SOAP) to submit a purchase order to the provider and transfer a respective payment. In response, the provider may deploy the service requested by the consumer and respond with a service confirmation.

FIG. 8A is an example purchase order data structure 800 issued by a consumer element manager for use in purchasing services from a provider element manager. The first two fields of the data structure 800, source-ID field 802 and provider-ID field 804, respectively identify the source consumer and destination provider. The third field, transaction-ID field 806, identifies the particular purchase order. The fourth field of the data structure 800, service field 808, identifies the service and provides parameters to quantify the purchase. The fifth field of the data structure 800, payment field 810, provides payment data including payment amount and authentication data to establish the validity of the payment. Finally, the sixth field of the data structure 800, authentication field 812, provides data to authenticate the validity of the purchase order transaction.

FIG. 8B is an example service confirmation data structure 850 issued by the provider element manager for use in confirming or rejecting the purchase of services by the consumer element manager. The first three fields of the data structure 850, source-ID field 852, provider-ID field 854 and transaction-ID field 856, correspond to the first three fields of the data structure 800 described above. The fourth field of the data structure 850, service confirmation field 858, includes data to confirm the service and enable the source to access it. Alternatively, assuming the provider has rejected the transaction, the service confirmation field 858 would include data with the reason or reasons for rejection, such as insufficient resources or a price change. Finally, the fifth field of the data structure 850, authentication field 860, provides data to authenticate the validity of the service confirmation.

As described below, various embodiments may also be used to address the problems of container sprawling and energy consumption in container systems using supply chain economics. Regarding sprawling, as explained in greater detail below, these embodiments may be used to suspend or terminate containers that are no longer needed or productive. These embodiments may also be used to terminate containers, or to disallow their re-activation if in a standby state, that are determined to be inconsistent with the current versions of their container system and applications. Regarding energy consumption, these embodiments may be used to consolidate and shift containers into fewer servers, for example, while still providing desired SLA performance, and switching other unused or non-productive servers OFF or into standby mode to reduce energy use. The supply chain software model and processes described above provide mechanisms and metrics to quantify how productive or non-productive a service element is.

Figure 9:
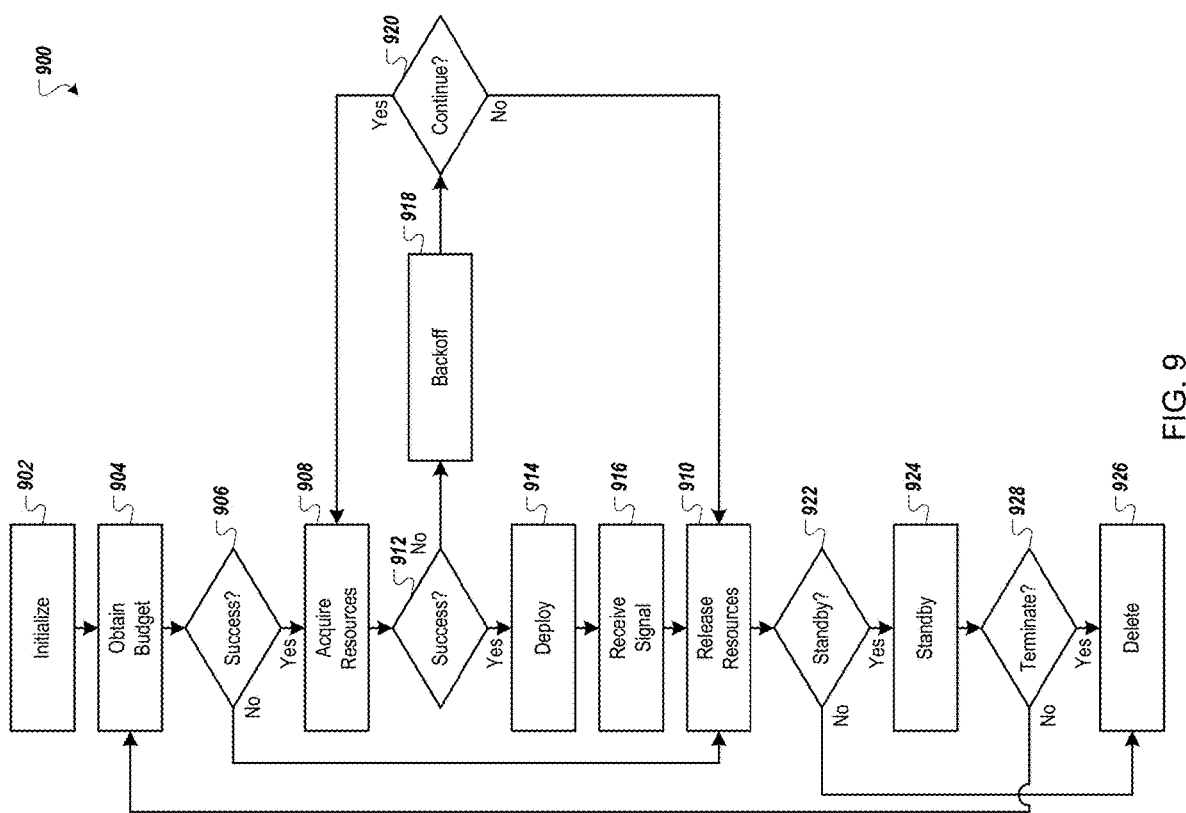
FIG. 9 is an example process for managing the states of system elements in a container system.

The following description details an example process 900, shown in FIG. 9, for managing the states of container system elements, which as explained further below, may be used to address sprawling and energy consumption issues. For simplicity, the following description assumes that the system element is a container, although the general principles that follow may be readily adapted for any type of system element.

A container is first initialized, for example, through the use of an initialize signal generated by a management station (step 902) or an automated action of a container manager. Similarly, for example, an application element may interpret events generated by a launch as an initialize signal.

After being initialized, the container attempts to obtain an initial budget to acquire resources for its operations (step 904). It is next determined whether the container was successful in obtaining an initial budget (decision block 906), in which case the container tries to acquire the resources needed to launch a respective service component (step 908). Otherwise, it begins the termination procedure by releasing any resources allocated to it (step 910).

If the container is successful at acquiring resources (decision block 912), it is provisioned, deployed, and remains in an active state (step 914) until it receives a signal to switch the service element OFF to an idle or standby state (step 916). After the terminate signal has been received, the container begins the termination procedure by releasing resources allocated to it, as described above.

On the other hand, if the container is not successful at acquiring resources, the container will wait an amount of time for sufficient resources to become available before attempting to acquire resources again (step 918). For example, during this waiting period, the container may use an exponential "backoff" mechanism, whereby the container repeats its attempts to acquire resources, but doubles the waiting period between repetitions with every failure. If it is determined that the container should continue to try to acquire resources (decision block 920), it will do so as described above in step 908. Otherwise, for example, if failures persist beyond some timeout period, the container abandons attempts to launch and begins to terminate.

Once resources have been released, it is determined whether the container should remain in a standby state (decision block 922), in which case the execution of the container stops, but it remains in a suspended or standby state and retains sufficient state data, for example, by using storage services to retain state data in image form, and for which the container may be required to pay (step 924). Otherwise, the container terminates execution and may be deleted (step 926).

According to various embodiments, the applications being executed by the container are first terminated, and then the container is terminated. Such a graceful termination may be pursued through a recursive termination of the supply chain elements supported by the container. For example, a container element manager may issue a terminate signal to a corresponding operating system manager, which propagates the signal to an application manager, which in turn signals termination to is application. The application may then begin the termination steps as described above with respect to the process 900, after which a termination complete signal to the application manager, and is forwarded to the operating system manager, which in turn sends a terminate signal and receives a termination complete signal back from the operating system. Finally, the operating system's termination complete signal may be forwarded to the container manage, which can signal the container to terminate. It will be understood that terminating (or even suspending) a container operations may result in damages if conducted improperly or at an inappropriate time. Thus, according to various embodiments, a notification procedure may be invoked to notify administrators of pending terminations or suspensions, such that termination or suspension may only be completed once administrator permission has been received.

For a container in standby state, it is determined whether termination should follow (such as by receipt of a terminate signal) (decision block 928), in which case the container terminates execution as described above. Otherwise, for example, if it is determined that the container should re-activate, the container seeks to obtain a budget to acquire resources for its operations as described above, for example, upon receiving an initialize signal. It will be understood that the specific actions described above in connection with process 900 may be modified for non-container system elements, and that the order of steps in process 900 are also illustrative only.

According to various embodiments, a process such as process 900 described above may be used to control container sprawling by suspending or terminating non-productive system elements, such as containers. For example, consider the ROI of a container, which measures the relationship between the payments it collects from applications and the prices it pays for underlying server and I/O resources. If the container's ROI is greater than one, the container is earning more than it expends, and the container may be classified as being productive in creating applications value that exceeds the costs of the infrastructures it uses. However, if the container's ROI is less than one, this means that the container produces less value than the cost of resources it consumes, and the container may thus be classified as non-productive. In this manner, ROI is one example of a metric of productivity that may be used in determining whether a system element should be suspended or terminated, or whether it should remain active.

A process such as process 900 described above may be used to assure, for example, that applications' budgets are sufficient to keep one or more containers' ROI greater than one, and to notify applications' administrators (element managers) as needed when budgets are low. It the ROI of one or more containers remains less than one for more than a threshold period, for example, it may indicate that an application's budget is too low to sustain productive operation, and that the corresponding, non-productive container should be suspended or terminated. For example, a container may receive a terminate signal to switch it OFF to an idle or standby state (per step 916 of process 900 described above) as soon as the container's productivity level or score (for example, measured by its ROI) has been determined to be less than one for a predetermined time period. Additionally, for example, the length of time that the container's ROI has been less than one may be a factor in deciding whether the container should be terminated, or only suspended for the time being.

Similarly to dealing with the sprawling issue, the process 900 described above and similar processes may also be used for energy management. For example, such processes may be used to suspend or terminate (switch OFF) servers that are classified as being non-productive, as in the case where a server's ROI is less than one for a sufficiently long period of time. In this case, the server element manager, much like the case of the container manager described above, can monitor the ROI and detect termination or suspension conditions. The server manager may then pursue a termination process, similar to the recursive termination process described above, where all containers on the server are first terminated, or moved to another server, before the server manager suspends the server into Standby state (so as to consume less energy and cooling resources, for example) or switches the server OFF.

According to various embodiments, process 900 and similar processes may also be used to assure consistency of a suspended container with changes in applications. For example, the container manager may prevent such inconsistencies by sending a terminate signal, as described above, to all containers whenever their respective operating system or applications software has changed, thus causing the applicable containers to transition from standby to terminate state, at which point it may be deleted.

Figure 10:
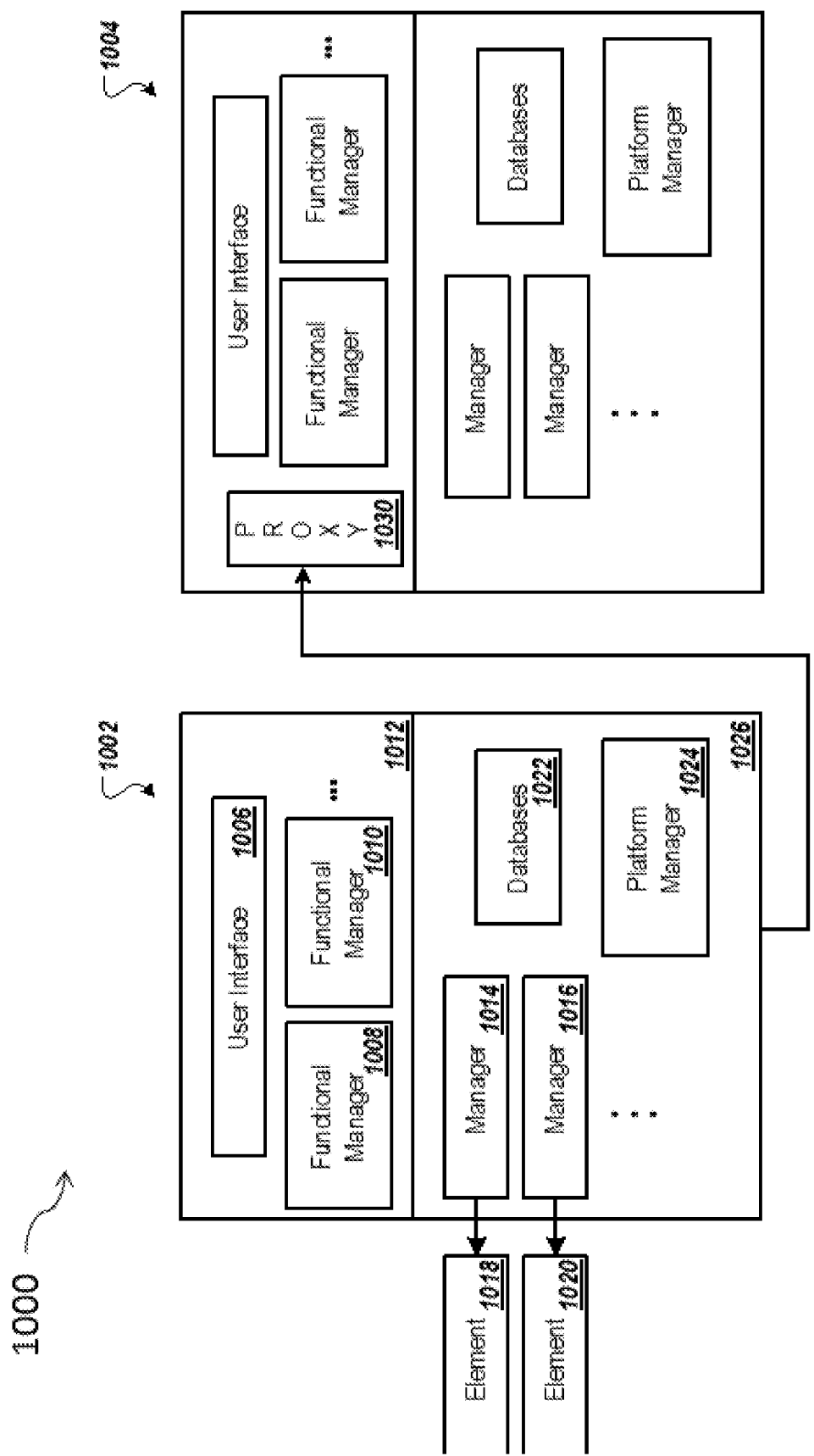
FIG. 10 is a block diagram of an example multi-domain software system environment for managing virtualized resources.

Although the above descriptions consider a single-domain container environment, it will be understood that the principles described herein may also be applied to multi-domain environments, e.g., a multi-cloud environment. For example, FIG. 10 is a block diagram of an example multi-domain software system environment 1000 for managing virtualized resources in "multi-cloud" systems. According to various embodiments, as shown in FIG. 10, container environment 1000 includes two example software systems 1002 and 1004, each of which is similar to the more detailed example software system 200 shown in FIG. 2, and which operate in a first and second domain, respectively.

As shown, the software system 1002 operating in the first domain includes a user interface subsystem 1006 and one or more functional managers 1008 and 1010. Together, these elements make up a functional management layer 1012 of software system 1002, and provide specific management applications as described above in connection with FIG. 2.

Software system 1002 also includes one or more element managers 1014 and 1016, which monitor and control one or more respective container stack elements 1018 and 1020. The software system 1002 also includes one or more databases 1022 (such as the supply chain databases 246 and operations databases 248 described with reference to FIG. 2), as well as a platform manager 1024. These elements are included in a platform layer 1026 of the software system 1002 to provide the infrastructures for monitoring the container stack elements 1018 and 1020, modeling these container stack elements as part of a supply chain economy, and controlling the operations of the container stack elements, as described above.

The software system 1004 operates in the second domain, includes similar elements as the software system 1002, and also includes a proxy manager 1030. According to various embodiments, the domain software system 1004 exports one or more resources or services to the domain software system 1002 by using the proxy manager 1030. The proxy manager 1030 exports instrumentation to monitor and control these provided resources to one or more of the element managers 1014 and 1016, such as container element managers, of the first domain software system 1002. The first domain software system 1002 may view the second domain software system 1004 as a service element integral with its supply chain model.

According to various embodiments, the second domain software system 1004 is in complete control of the resources (or services) and capabilities exported to the first domain software system 1002. For example, the software system 1004 may be an external cloud provider exporting raw server services to the software system 1002. In this case, the software system 1002 can access these services, using its local element managers 1014 and 1016, to allocate, for example, CPU, memory, and storage resources at the second domain software system 1004 and then monitor and control their use and operations.

Moreover, according to various embodiments, software systems 1002 and 1004 are separately owned and/or managed. For example, software system 1002 may be owned and operated by a small business that experiences steady computing needs except for two hours in each day, during which time its computing needs are consistently elevated. In this case, rather than purchasing permanent computing resources to handle the two hours of elevated needs per day, for example, software system 1002 may lease or purchase additional computing resources from software system 1004 (e.g., owned by Amazon.com, Inc.) on an as-needed basis and transfer excess workloads to software system 1004 ("bursting"). For example, computing resources from software system 1004 may be leased or purchased to facilitate the execution of a multi-tier web service by a cluster of containers (or applications). In that example, the software system 1002 may lease or sell resources from software system 1004 to execute this cluster of containers (or applications) and then migrate the container cluster (or application cluster). For example, the migration may take place from a private cloud of a small business to the public cloud of another business (e.g., of Amazon, Inc.). It is noted that, according to various embodiments, even if needed computing resources are available from within software system 1002, such resources may be purchased from software system 1004 based on relative price offerings.

The asymmetric relationship between software systems 1002 and 1004 shown in FIG. 10 and described above may be extended to provide full symmetry. In that case, the first domain software system 1002 would incorporate its own proxy manager (not shown) to export services to the second domain software system 1004, which would integrate it within its supply chain through one or more of its respective element managers.

The supply-chain principles discussed herein may be used to scale containers up/down, by adding or removing resources to existing container components, or to scale containers out, by adding more container components or suspending containers. The decisions to scale up/down and out are based on a supply chain 1100 outlined in FIG. 11, and the revenues and expenses of each of the entities involved in that drawing. The supply chain 1100 may also be used to determine the sizing and placement of containers, when a selected container is deployed, and to determine future sizing and placement requirements based on anticipated changes in container load.

As indicated above, the systems, apparatus and methods described herein can be applied, for example, to recommend and eventually migrate workloads among multiple providers in a cloud environment. This includes migration from on-premises data centers or other private cloud providers to public data centers or cloud providers (also known as public cloud service providers or platform, or CSPs), and back. This also includes migration among different public data centers or cloud providers. For example, an application or other workload may be migrated between and among private and/or public cloud providers based on the price of resources being charged by each. According to various embodiments, resources are considered a commodity, and the pricing or cost available from multiple providers is considered as the primary or sole factor in deciding whether to migrate.

For example, the systems, apparatus and methods may incorporate a commodity referred to as "Cost" which is sold in a private and/or public virtualization or cloud marketplace. According to various embodiments, with respect to providers in the cloud: the used value of the Cost is the monetary (e.g., dollar) cost it costs to run the current load on it; the capacity of the Cost is the monetary (e.g., dollar) budget specified by a user for running the load in the public cloud; and/or other commodities have extremely large, unlimited or infinite capacity, making the Cost the dominant commodity in the price. According to various embodiments, with respect to providers in a private data center: the used value of the Cost is the monetary (e.g., dollar) value of running in-house; the capacity of the Cost is extreme large, unlimited or infinite, making the rest of the commodities dominant; and/or in a non-hybrid environment, the system can operate as it behaves today in the absence of available providers in the cloud. According to various embodiments, with respect to providers in both private data centers and the public cloud: the Cost can include the cost of moving (both internal and cross-cloud); the pricing function (e.g., 1 divided by the square of (1-utilization)) can be set such that the closer an entity is to the budget allocated for running on the cloud, the more expensive it is to move to that cloud.

Although sales and transactions according to the principles discussed herein are contemplated in various embodiments to be tied to real currency (e.g., U.S. dollars), it will be understood that any suitable denomination or unit of currency, including virtual currency, physical currency, or electronic currency, whether or not tied to any government-issued or "real world" monetary unit or system, may be used. It is also contemplated that one form of currency may be later converted to another form of currency (e.g., U.S. Dollars to Canadian Dollars, or U.S. Dollars to virtual currency units, or virtual currency units to U.S. Dollars, to name a few examples).

According to various other embodiments, price or cost is one of multiple potential considerations, any one or more of which can be relied upon or weighed. For example, the additional considerations in choosing one or more cloud providers include actual or anticipated environmental impact, the existence of preferred vendors, utilization (including real-time utilization), contractual clauses or restrictions, quality of service (QoS) metrics or guarantees, compliance requirements, regulatory requirements, pricing discounts, security considerations, and/or performance or other metrics. One or more of these considerations may be additional or secondary to price or cost, or may supplant price or cost as the primary and/or sole consideration(s). Based on one or more of the foregoing, the principles discussed herein allow the creation of "price performance" metrics that can be used to review and choose among cloud providers.

According to various embodiments, real-time migration, placement and/or configuration of an application or other resource consumer is accomplished through decision-making that is automatic or semi-automatic of manual intervention. For example, an entity in the cloud market can initially purchase resources from a public cloud based on the real-time price (or spot-price) offered by competing cloud providers. Such initial purchase may be followed by a medium or long-term contract for one or more resources, including those initially purchased and assigned.

It will be understood that the principles discussed herein apply not only to initial placement of applications or workloads with one or more providers, but also a recurring, periodic or continuous monitoring of available providers. For example, once a certain demand has been accounted for through deployment or migration to a cloud provider, the principles discussed herein can be employed to continuously explore and/or shop for alternative providers that may provide one or more benefits over the initially selected provider. This may include bringing an application or workload back to an on-premises or private provider.

In addition to (or in lieu of) movement between cloud providers, the principles discussed herein can also be applied to recommend or determine when an application or workload should be resized or cloned, whether on the same or different cloud, for example, to optimize performance or operating cost. The principles can not only be used to manage cost and/or performance, but to reduce the risk of unintended or unanticipated charges.

According to various embodiments, these principles of migration management are controlled through a single visual or computing interface. This interface may include budgeting controls, performance controls, compliance controls, and the like. It may also provide a summary or visualization of available cloud providers and metrics associated with one or more such providers.

Moreover, the principles discussed herein can be used to manage trade-offs between quality of service (QoS), performance and cost. When performance is the focus, for example, the systems, apparatus and methods can be used to move an application or workload to the best or highest-quality cloud provider, or balance performance with cost.

These principles can be used to facilitate initial cloud deployment, enabling efficient scale-out of workloads, as well as optimal distribution considering data locality and its impact on performance. They also have the benefit of encouraging pricing and performance competition among providers, including public cloud providers of resources. According to various embodiments, pricing is used in addition to (or in lieu of) performance metrics to differentiate among two or more CSPs. Thus, decisions can be based on a tradeoff between price offered by a CSP and its historical and/or anticipated performance metrics. For example, when deciding between deployment with competing first and second CSPs, the systems, apparatus and methods can be used to weigh the benefits and tradeoffs between selecting a first CSP having superior performance and commensurately higher price of a resource (e.g., CPU) versus a second CSP having inferior performance and a lower price for the resource.

Additional benefits are also achievable using the principles discussed herein. For example: the more utilized the private data center is, the more lucrative the public providers become; the spot-price fluctuations directly affect market decisions (e.g., the more expensive a spot-price is, the more expensive price the providers can opt to quote); if there is no congestion in a local data center, the costs associated with moving may inhibit or prevent demand from moving to the public cloud; once a datacenter becomes somewhat congested and the costs associated with moving is less than the difference in price, it would be cheaper to move to the public cloud; once the budget allocated for running on the cloud is close to being met (e.g., because there is plenty of demand running consistently on the public cloud providers), the prices of running on them would become higher causing demand to remain with private or on-premises data centers (and, for example, the market can recommend provisioning new hosts). Thus, for example, placement decisions may consider the overall congestion of the private data center or data centers, the current spot-price associated with one or more public cloud providers, and the cost of migration.

These and other benefits which will be apparent to persons of skill in the art can be used to improve perform and/or system efficiency, and also overcome potential challenges, as public clouds continue to grow in availability and demand, and as they continue to handle more workload in the market. Additional benefits include: cloud provider pricing is often complex and confusing; there may be a large number of choices an entity must make or take into account before creating instances or making migration decisions; performance may be unclear and not guaranteed; costs (e.g., bill) may come as a surprise. For example, the principles described above can be used to incorporate the real cost of running demand on a cloud service provider or platform (CSP) into the market; migration to public cloud can be based in part of whole on the dollar price of the provider; one or both On-Demand-Price of the CSP and personalized customer contract pricing can be taken into account in making decisions.

It will also be understood that principles associated with containerization, as discussed herein, for example, may be employed to migrate and move applications or workloads to the cloud.

Figure 11:
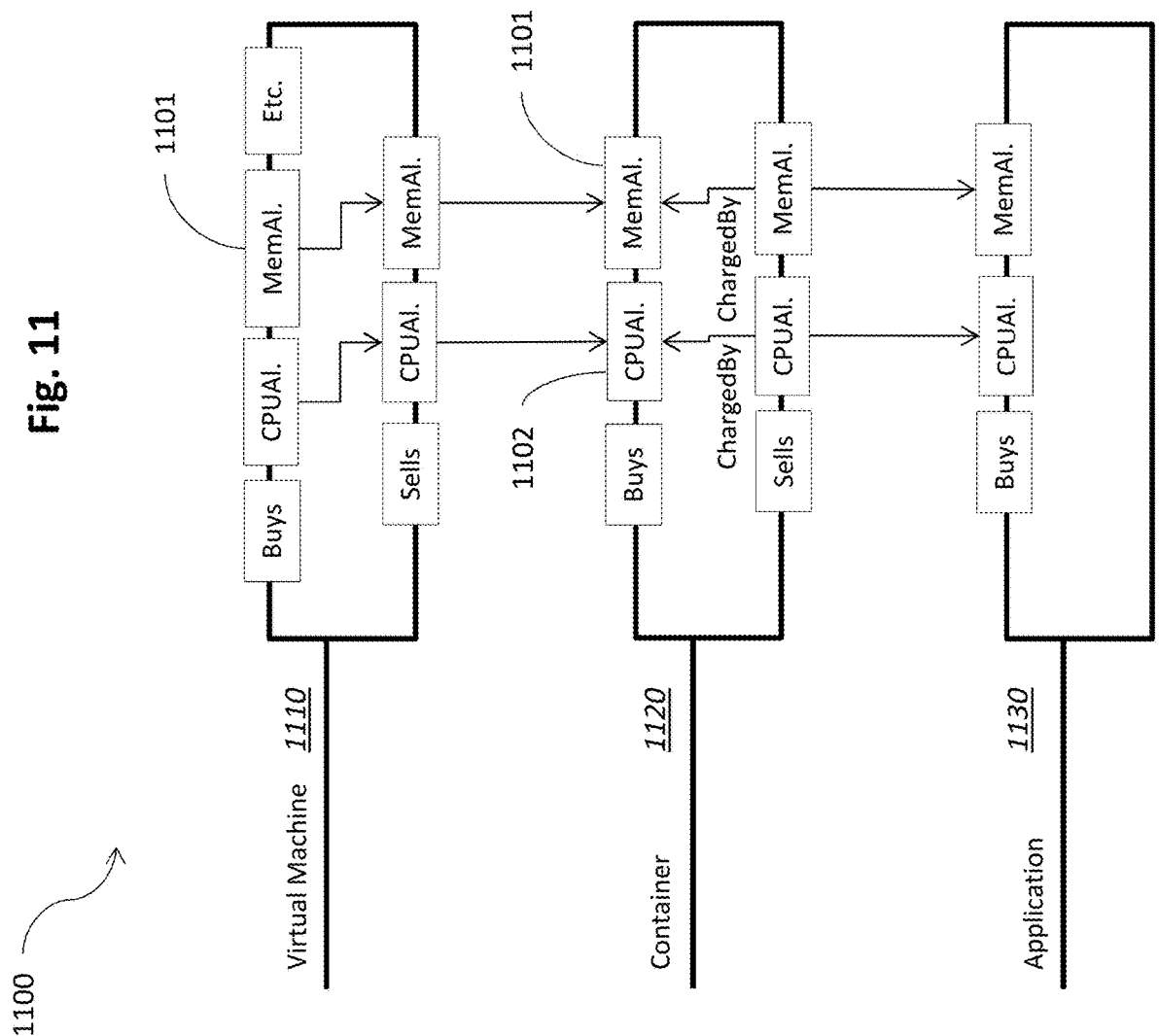
FIG. 11 is a block diagram of an example virtualization environment which illustrates supply chain relationships between service entities and resources.

Turning to FIG. 11, according to various embodiments, the supply chain 1100 may include two types of entities, namely, Service Entities (SEs), such as a Virtual Machine 1110 or a Container 1120, and Resources, such as CPU Allocation (CPUAllocation) 1102 and Memory Allocation (MemAllocation) 1101.

In some embodiments, the market may suggest an increase of (scaling up) the Memory Allocation 1101 of the Container 1120, or it may suggest the creation of another instance (scaling out) of the Container 1120. According to various embodiments, decisions to scale up/down will apply to Resources only, while decisions to scale out will apply to SEs only.

For example, in FIG. 11, the MemAllocation 1101 of the Container 1120 may reduce as a result of congestion for resources at the Virtual Machine level. Increased utilization of MemAllocation 1101 of the Virtual Machine 1110 will lead to increased MemAllocation price. In turn, the increased MemAllocation price increases expenses of MemAllocation for the Container 1120, leading to a decision to reduce the size of MemAllocation of the Container 1120.

Figure 12:
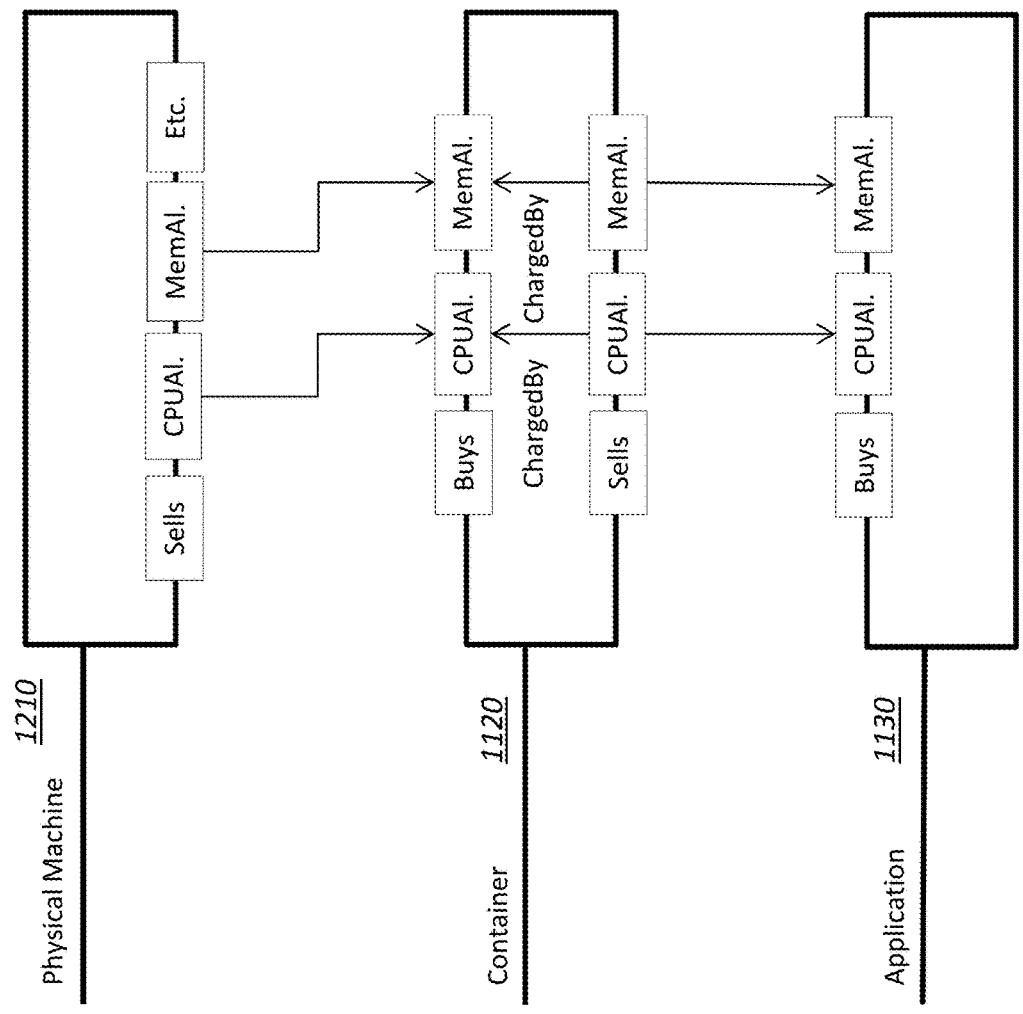
FIG. 12 is a block diagram of another example virtualization environment which illustrates supply chain relationships between service entities and resources in a container system.

With reference now to a supply chain 1200 shown in FIG. 12, the Container 1120 consumes directly from a Physical Machine 1210. The MemAllocation size may also reduce as a result of congestion for resources at the Physical Machine level. Increased utilization of Physical Machine MemAllocation will lead to increased MemAllocation price, which in turn increases expenses for MemAllocation on the Container 1120, leading to a decision to reduce the size of MemAllocation of the Container 1120.

Container MemAllocation size may increase as a result of over provisioned resources at the Virtual Machine level. Decreased utilization of Virtual Machine CPUAllocation due to a high capacity will lead to decreased CPUAllocation price, which in turn decreases expenses for CPUAllocation on the Container 1120. If the Container 1120 has high revenues for CPUAllocation this would lead to a decision to increase the capacity of CPUAllocation on the Container 1120.

Decisions for both resources and SEs are based on revenues and expenses of these resources. Similarly, expenses and revenues can be set to a predetermined value as desired. For example, the price of MemAllocation can be set to a minimum value to force higher expenses if attempting to maintain the size of the MemAllocation of the Container at or below some value. This advantageously avoids unnecessary resizing only for the purpose of having additional MemAllocation. Accordingly to other embodiments, the price of MemAllocation can be set to a maximum value.

Figure 13:
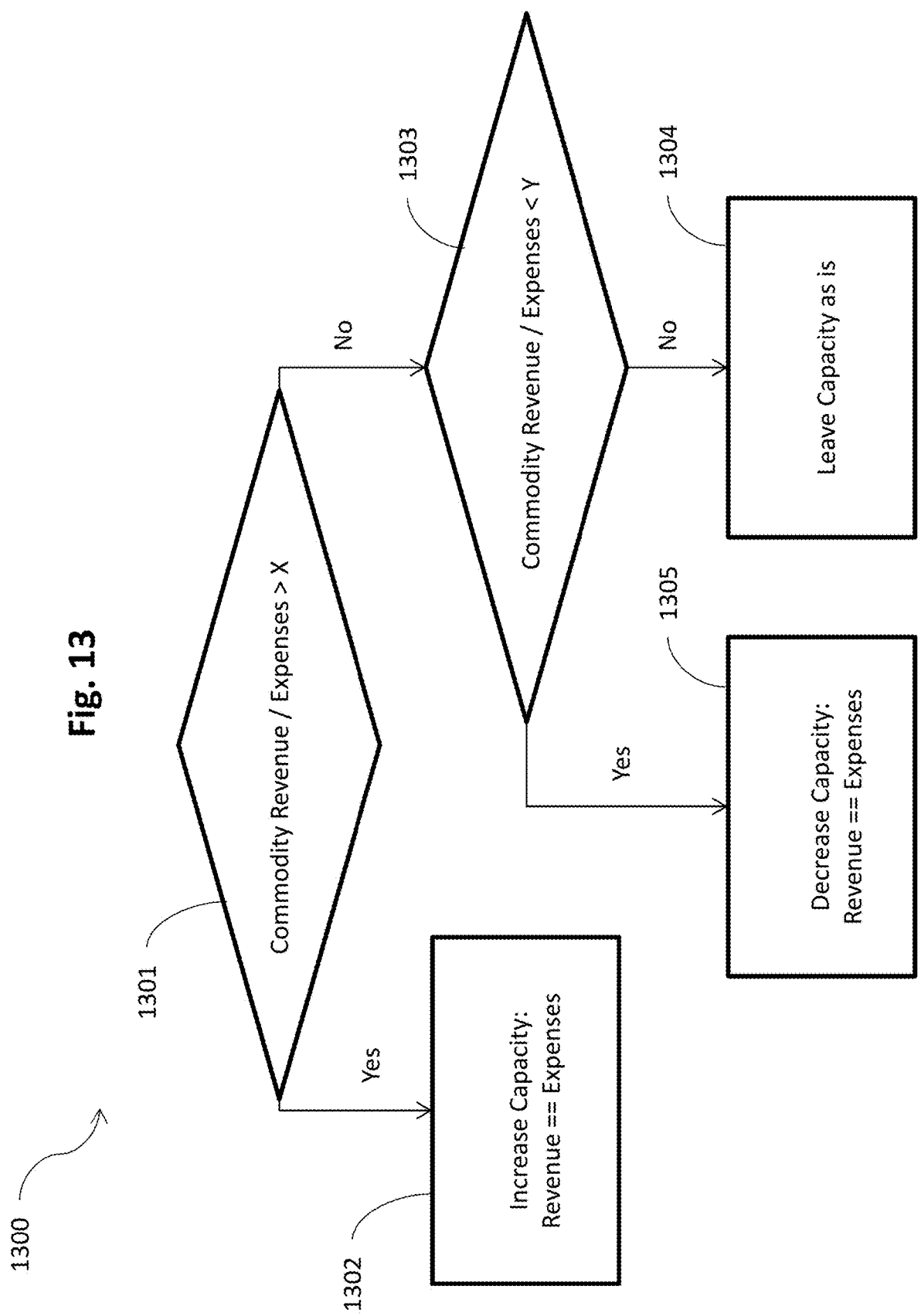
FIG. 13 is a flow chart illustrating a process for resource scaling in the virtualization environment of FIG. 11.

FIG. 13 shows an example process 1300, which illustrates how a decision is made to scale a resource allocation up or down. Turning to FIG. 13, the process 1300 first determines if the revenue/expense of a commodity is greater than a predetermined value X (decision block 1301). If so, then the capacity of the resource is scaled up until the revenues are equal to the expenses (step 1302). If the revenue/expense of the resource is less than a predetermined value Y (decision block 1303), then the resource allocation is scaled down until the revenues are equal to the expenses (step 1305). Otherwise, if the revenues/expense of the resource is within the range defined by the values X and Y (decision blocks 1301 and 1303), then the resource allocation is not scaled (step 1304).

Advantageously, the values of X and Y provide a mechanism to tune the responsiveness of the system to increases or decreases in demand. The value of revenues/expenses captures the profitability of the resource allocation (or the SE). If the ratio is >1, the resource is profitable. If it is <1, it is losing money. In process 1300, X is typically (but not necessarily) >=1 and Y is typically (but not necessarily) <1. Stated in another way, an increase in capacity typically is suggested when the resource is profitable, and a decrease when it is operating at a loss.

As an additional advantage, decisions capture the entire state of the system, and can optimize the system as a whole. Increased utilization of a resource will lead to increased price for the resource, which in turn increases expenses for the resource. In some embodiments, the ideal price for scaling the resources provides 70% utilization.

In some embodiments, revenues and expenses can refer to the accumulated revenues and expenses over a period of time. Different periods of time can be used to adjust the decision-making behavior (e.g., aggressive versus conservative behavior). Short time frames lead to aggressive decisions, where the system responds very quickly to changes in the supply and demand anywhere along the supply chain. This can be used, for example, to respond quickly to congestion for resources and guarantee the quality of service offered to the entities in the system. Long time frames dampen the effects of short-term changes in the supply and demand, and reflect accurately the longer-term trends of the demand and supply.

Figure 14:
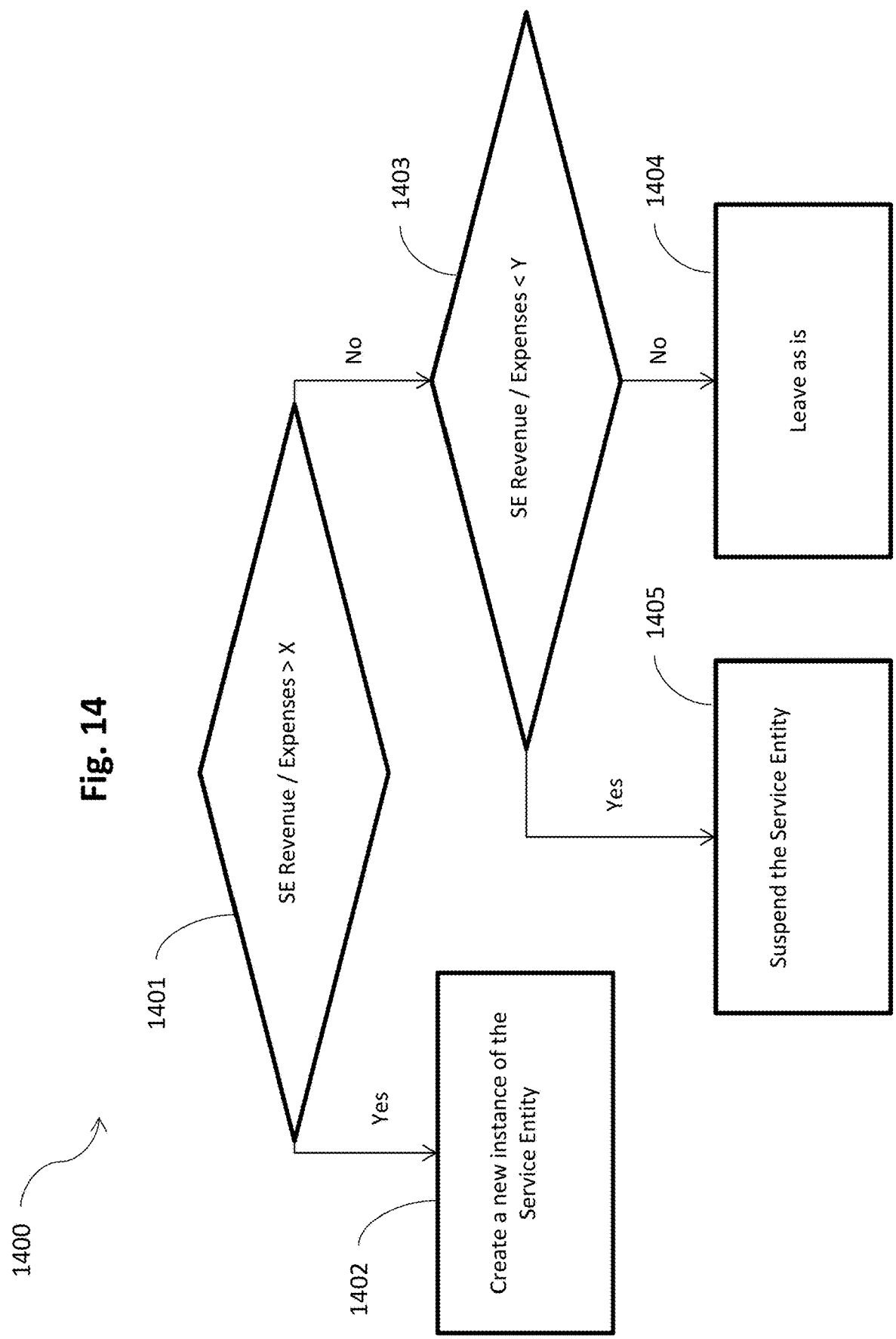
FIG. 14 is a flow chart illustrating a process for service entity scaling in the virtualization environment of FIG. 11.

A similar decision tree to the one shown in FIG. 13 is depicted in FIG. 14, which illustrates an exemplary process 1400 for scaling SEs. Instead of resizing resources as shown in FIG. 13, the process 1400 concerns creating a new instance of a SE, or suspending the operation of an existing SE, depending on the expenses and revenues of the SE. Turning to FIG. 14, the process 1400 first determines whether the revenue/expense of a SE is greater than a predetermined value X (decision block 1401). If so, then a new instance of the SE is created (step 1402). If the revenue/expense of the SE is less than a predetermined value Y (decision block 1403), then the operation of the SE is suspended (step 1405). Otherwise, if the revenues/expense of the SE is within the range defined by the values X and Y (decision blocks 1401 and 1403), then the SE is unchanged (step 1404).

As discussed above, in addition to managing container resources, the supply-chain principles discussed herein also may be used to manage application performance in other virtualization systems. For example, an application server requires a certain amount of memory and CPU resources. A database will also require a certain amount of storage. In order for the application to perform adequately, the application must be allocated a sufficient amount of resource. In order for the infrastructure to be utilized efficiently, the application should only consume what it requires at any given point in time.

Accordingly, with respect to application performance, the supply-chain principles discussed in FIGS. 13 and 14 can be used to scale up/down, by adding or removing resources allocated to the application, or to scale out, by adding more application components, or suspend application components. Some examples of application resources include, without limitation, java heap, thread pools, and connection pools in an application server or data space and log space in a relational database. These decisions are based on a supply chain 1500 outlined in FIG. 15, and the revenues and expenses of each of the entities involved in that Figure.

Figure 15:
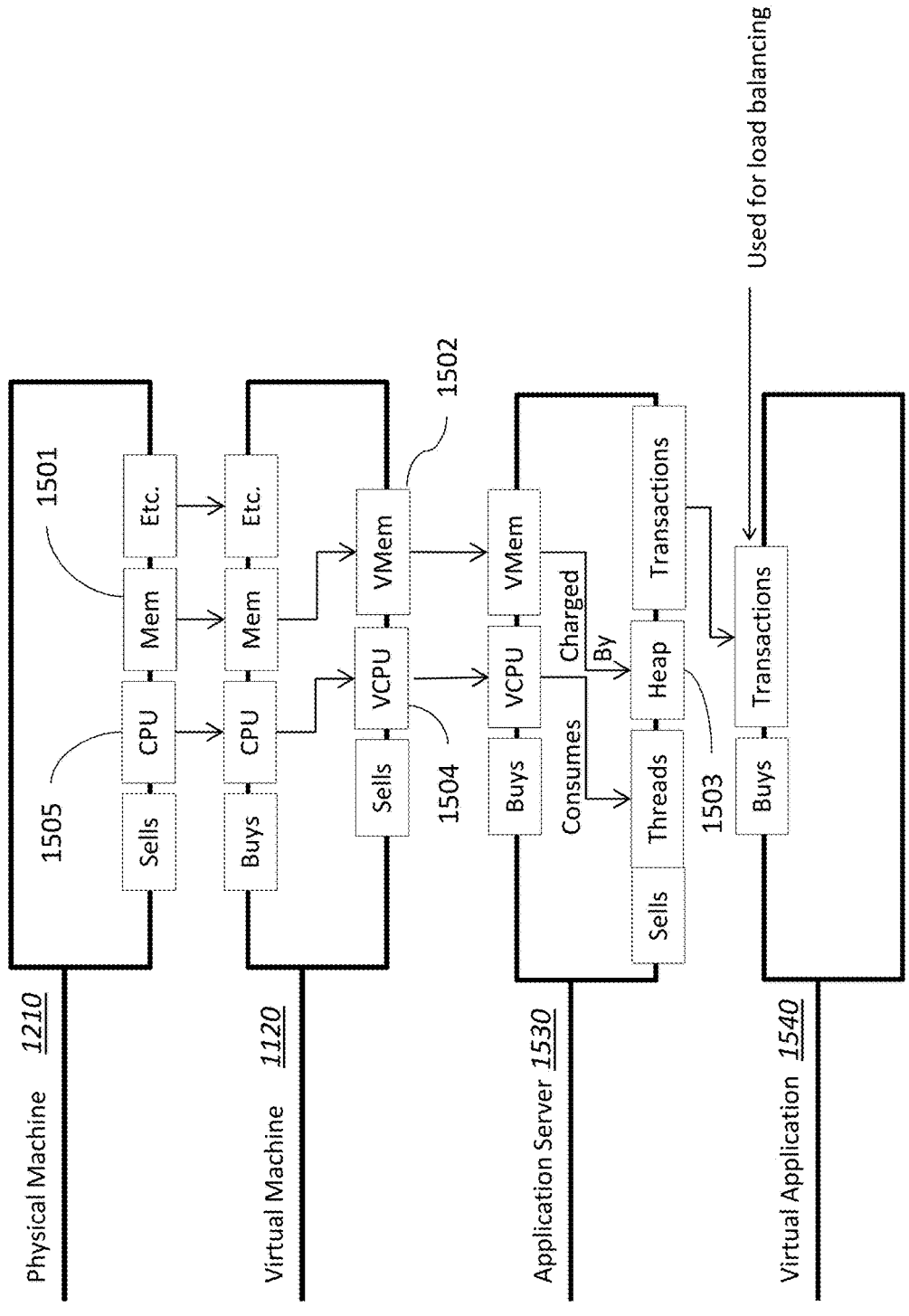
FIG. 15 is a block diagram of yet another example virtualization environment which illustrates the supply chain relationships between service entities and resources in a virtualization environment and can cooperate with the processes described in FIGS. 13-14.

Turning to FIG. 15, the supply chain 1500 includes the two types of entities discussed with reference to FIG. 11. Specifically, the supply chain 1500 illustrates the SEs, such as the Physical Machine 1210, the Virtual Machine 1120, or an Application Server 1530, and the Resources, such as Memory (Mem) 1501, Virtual Memory (VMem) 1502, and Heap 1503.

As discussed above, the resources and SEs have expenses and revenues. For example, the revenues of a virtual central processing unit (VCPU) 1504 sold by the Virtual Machine 1120 are generated from the Application Server 1530 buying this resource. Expenses of the VCPU 1504 come from paying to acquire a necessary resource, such as CPU 1505, from the underlying Physical Machine 1210 hosting the Virtual Machine 1120.

Similarly, a SE has revenues which can be the sum of the revenues of the resources it sells, while its expenses can be the sum of the expenses of the resources it buys. As another example, the revenues of the Virtual Machine 1120 can be the sum of the revenues of the VCPU 1504 and the VMem 1502 that it sells to the Application Server 1530 in FIG. 15, while its expenses are the sum of the expenses to acquire the CPU 1505 and Mem 1501 from the Physical Machine 1210.

Revenues and expenses can depend on the prices of resources, which in turn can be a function of supply, e.g., attributes of the resource such as its capacity, as well as the demand—how much of the capacity is currently utilized by resources or SEs consuming this resource. In one embodiment, price is a function of the utilization (U) of the resource, and depends on it through the formula: $1/(1-U)^2$ For example, an application server requires java heap in order to process transactions. This java heap is allocated from the underlying virtual machine's virtual memory allocation. In the event that the demand for java heap is very high (e.g., generating revenue for the application server), and the price of virtual memory from the virtual server (e.g., determined by the combination of supply and demand) is sufficiently low, then the application server will be able to buy more virtual memory from the virtual server and allocate additional java heap. In the event that the demand for java heap is low and the price of virtual memory is high then the application server will decrease its allocation of java heap and return virtual memory to the virtual machine to be used by other applications.

In some embodiments, the buyer can be assigned a budget for purchasing the resources.

Decisions for both resources and SEs are based on the revenues and expenses of these resources. Similarly, expenses and revenues can be set to a predetermined value as desired. For example, the price of VMem can be set to a minimum value to force higher expenses if attempting to maintain the size of the Heap at or below some value. This advantageously avoids unnecessary resizing only for the purpose of having additional VMem. Accordingly to other embodiments, the price of VMem can be set to a maximum value.

In some embodiments, the market may suggest to increase (scale up) the Heap size of an Application Server, or it may suggest to create another instance (scale out) of the Application Server. These decisions can be based on the process 1300 for resizing resources and process 1400 for scaling SEs as discussed above.

As discussed above, revenues and expenses can refer to the accumulated revenues and expenses over a period of time and different periods of time can be used to adjust the decision-making behavior (e.g., aggressive versus conservative behavior). For example, longer periods of time can be used to anticipate future needs for extra application servers based on steadily increasing revenues that reflect an increase in demand. Conversely, a longer term decrease in revenues indicates that the steady state operation of a system may not require a particular SE.

The use of supply chain economic principles and other principles explained above serve several purposes and provide several potential benefits, both expressly numerated and otherwise. For example, these principles can be used to provide a common software framework and abstractions to unify and automate the management of container systems. More specifically, they can be used to optimize or improve the allocation of IT resources (such as I/O resources or software licenses) to best process applications workloads according to their business value. The principles of supply chain economics can also be used to balance workloads to minimize disruptive operating conditions, such as I/O congestion, and to reduce resource waste by terminating or switching-off underutilized resources. These principles can also be used to empower business units to monitor and control the delivery of SLAs to their applications, as well as the ROI of individual elements and the overall container system. In addition, for example, these principles can be used to handle the management of virtual resources in a multi-cloud (or multi-domain) system.

Figure 16:
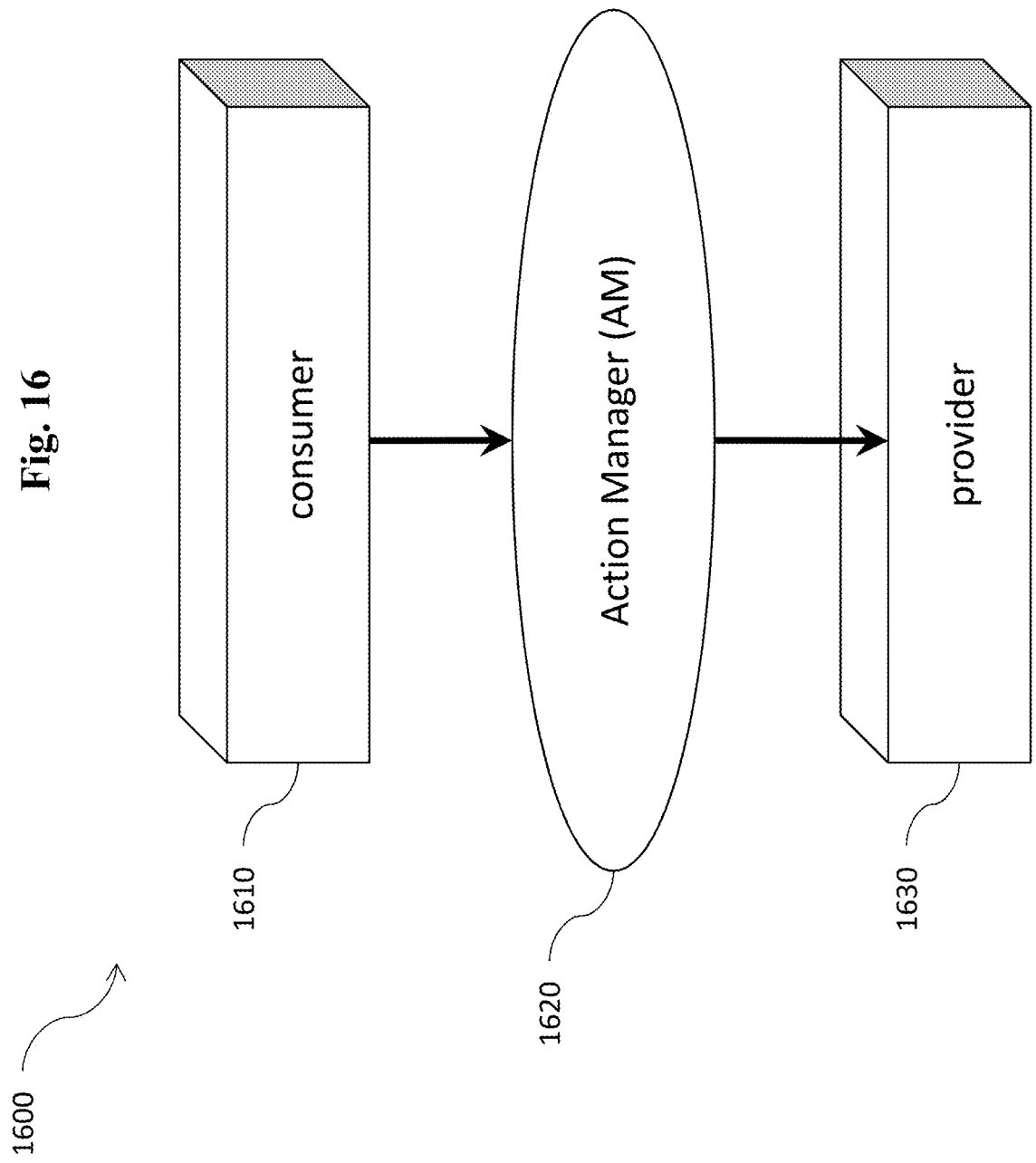
FIG. 16 is a block diagram of an example virtualization environment in which resources are managed by an action manager.

Additionally and/or alternatively, the management of resources in container systems and conventional virtualization systems can include not only supply-chain based methods, but also access regulation to the resources. FIG. 16 illustrates an exemplary system 1600 for regulating access of consumers 1610 (e.g., electronic applications) to resources and services (e.g., storage). In one embodiment, this regulation occurs through the use of access permits (not shown) that the consumer 1610 acquires from an intermediate entity—an Action Manager (AM) 1620—prior to accessing the resource or service. As shown in FIG. 16, the AM 1620 regulates access to a provider 1630 of the resource or service. For example, regulating access includes controlling the number of concurrent accesses, and/or the rate at which consumers 1610 access the resource, as desired.

In some embodiments, there is one type of permit per provider 1630. According to various embodiments, the AM 1620 can sell multiple types of action permits, regulating access to a number of resources. Each permit can be associated with a predetermined price. Additionally and alternatively, this price can be dynamically adjusted taking into consideration the availability of permits possessed by the AM 1620.

Permits sold by the AM 1620 can create both revenues and expenses for the AM 1620. The revenues come from the price the consumer 1610 has to pay to the AM 1620 to buy the permit. The expenses come from the price the AM 1620 has to pay to the resource provider 1630 for the right to sell these permits. For example, the AM 1620 may need to pay for Input/output Operations Per Second (IOPS) offered by a storage controller in order to allow access to the consumer 1610.

In some embodiments, the price that the AM 1620 pays for the right to sell these permits is determined by the provider 1630 based on one or more of the following parameters: the capacity and the percentage the provider 1630 wishes to make available to the consumers 1610; the current load of the provider 1630; and the rate at which the provider 1630 wishes its resources to be accessed.

The AM 1620 dynamically can adjust the number of permits it possesses at any time, depending on its revenues and its expenses. For example, if the AM 1620 is profitable (e.g., the charges based on price it is selling the permits to the consumer 1610 is higher than the charges based on price it pays to the provider 1630 for the right to sell these permits), the AM 1620 can consider increasing the number of permits it sells. Alternatively, if the AM 1620 is losing money, the AM 1620 can consider decreasing the number of permits it is selling.

Advantageously, the AM 1620 can be used to avoid I/O congestion in storage controllers when several VMs request to execute heavy-storage applications (e.g., VM Reboots, Antivirus database updates, OS Updates, and so on) at the same time. In one embodiment, the AM 1620 limits the number of concurrent consumers that can access the provider 1630. It may limit access across types of applications or within each type of application. For example, permits can be priced and provided for all anti-virus, OS updates, etc. separately, or all of them may be constrained by the same permits. In this example, the provider 1630 is the storage controller, while the consumer 1610 is the application performing the heavy-storage task. For instance, the application can be performing an anti-virus update on the virtual machine.

Figure 17:
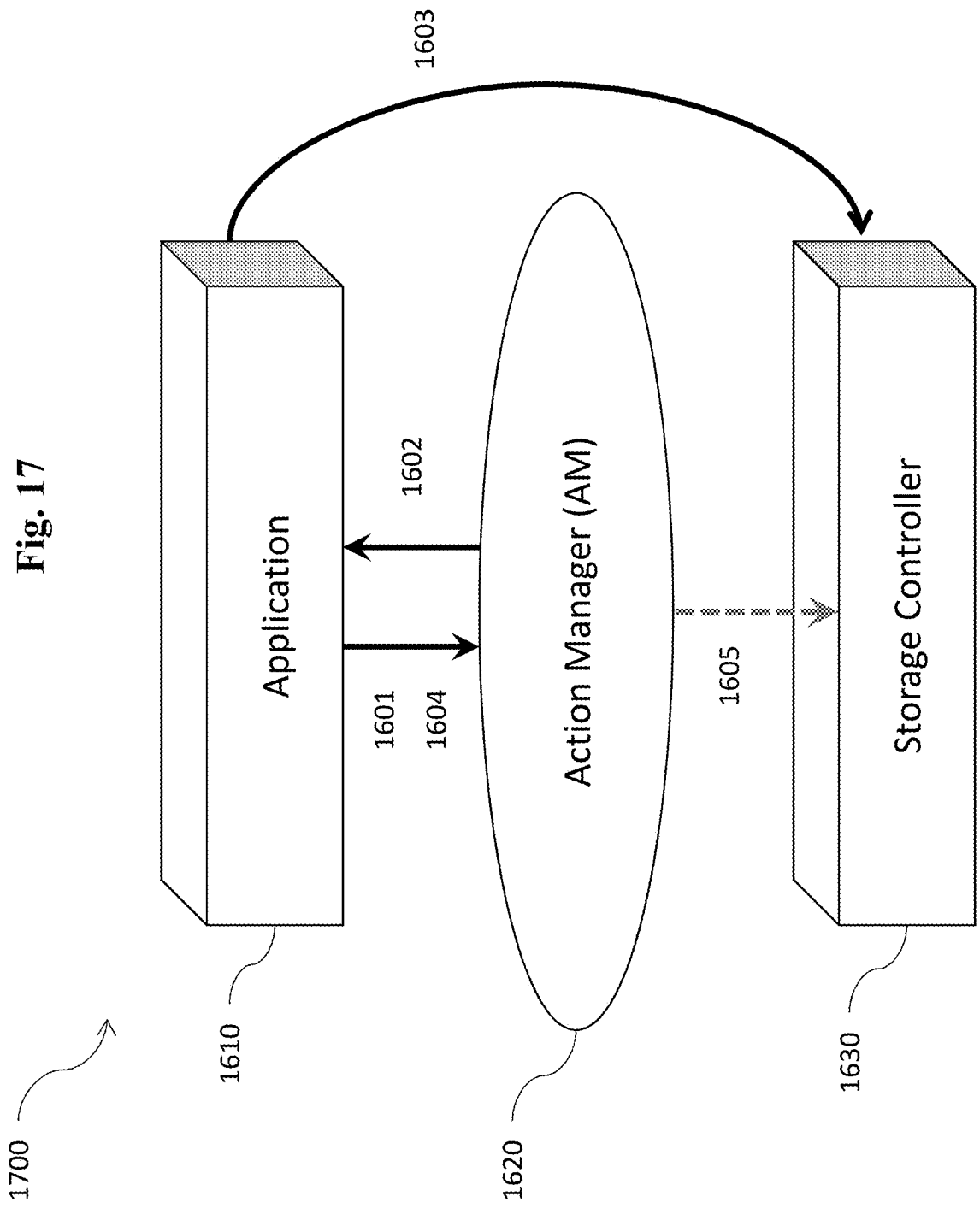
FIG. 17 is a block diagram illustrating the data flow for managing resources in the virtualization environment of FIG. 16.

Turning to FIG. 17, the consumer 1610 (e.g., an application) sends the AM 1620 a request 1601 to acquire the appropriate number of permits (e.g., 5) for the provider 1630 (e.g., a storage controller) of the storage associated with the VM. It will be understood that, although reference is made to a storage controller with respect to FIG. 17, according to various embodiments, other types of providers and resources are managed using similar principles and permits. After a request 1601 has been received, the AM 1620 subsequently determines 1602 if the request includes a sufficient budget, and if the AM 1620 has enough permits to satisfy the request 1601. If so, the AM 1620 replies to the consumer 1610 with the appropriate permits and charges. After buying the permits, the consumer 1610 accesses 1602 the storage through the provider 1630 and performs the update. After completing the update, the consumer 1610 releases 1604 the permits such that the AM 1620 can re-sell them. The AM pays 1605 the provider 1630 for the use of the permits it is selling. According to various embodiments, payment for the use of permits can occur before, after, or simultaneously with storage access.

In an alternative embodiment, the number of concurrent accesses to a resource may vary. For example, the AM 1620 adjusts the number of permits it is selling, to reflect the ability of the provider 1630 to satisfy concurrent requests by consumers 1610. For example, when the AM 1620 pays the provider 1630 for the use of the permit, the AM 1620 adjusts the number of the permits it sells based on how profitable it is. If demand for permits for a specific provider 1630 is high, the AM 1620 raises the prices for this permit, advantageously increasing revenues.

To become even more profitable, the AM 1620 can request the right to sell more permits from the provider 1630. If the provider 1630 agrees, the provider 1630 raises the price the AM 1620 has to pay for these rights. As the demand increases, the provider 1630 continues to increase the price it charges the AM 1620. At a threshold price, the AM 1620 can no longer make a profit, and the AM 1620 does not request any further increase in the number of rights it can sell. Similarly, the number of permits sold by the AM 1620 can decrease as a result of reduced demand by consumers 1610, or increased prices by the provider 1630.

In yet another embodiment, the AM 1620 controls rate of concurrent accesses to a particular resource. For example, the AM 1620 limits the rate at which the applications are accessing the storage controller to perform the heavy-storage tasks. In this case, once the application releases the permit, and until the predetermined period of time has elapsed, the AM 1620 cannot resell this permit. The storage controller can charge the AM 1620 a very small amount for the right to sell a first predetermined number of permits within a period of time, and then increase the price to infinity for permits beyond the first predetermined number in this period.

In yet another embodiment, the consumer request to access one or more permits is made directly to the resource or service provider.

In yet another embodiment, the AM 1620 controls the total number and/or the rate at which a group of consumers accesses a group of resources.

Another aspect discussed above formulates and evaluates the option to move the consumer to a new provider. "Formulating" includes the attributes taken into account when considering the option to move to the new provider. The cost of moving can be part of the comparison between two different alternatives (e.g., keeping a VM in an existing infrastructure or moving the VM to an external cloud provider). Cost can be expressed in actual currency or any unit suitable for the comparison. For example, moving time can be expressed in a real value that quantifies the cost of the VM downtime. In contrast, if there is a strict limit on acceptable downtime, the cost of moving the VM can be expressed in terms of time.

"Evaluating" includes making the decision (e.g., initiating an action based on the decision) and determining the right time to take the action. Compared to other economics-based decision-making systems, one embodiment described herein postpones the decision for the future, advantageously waiting for a sufficient amount of time until the decision-maker is convinced that the decision is the right one.

For example, a virtualization system is considering taking an action A with the cost of taking this action represented as C(A). If the action is taken, the savings over time is S(t). The decision to take the action at the time to when the savings would have exceeded the cost of the action is represented by the following Equation:

$$S(tA) >= C(A)$$

Figure 18:
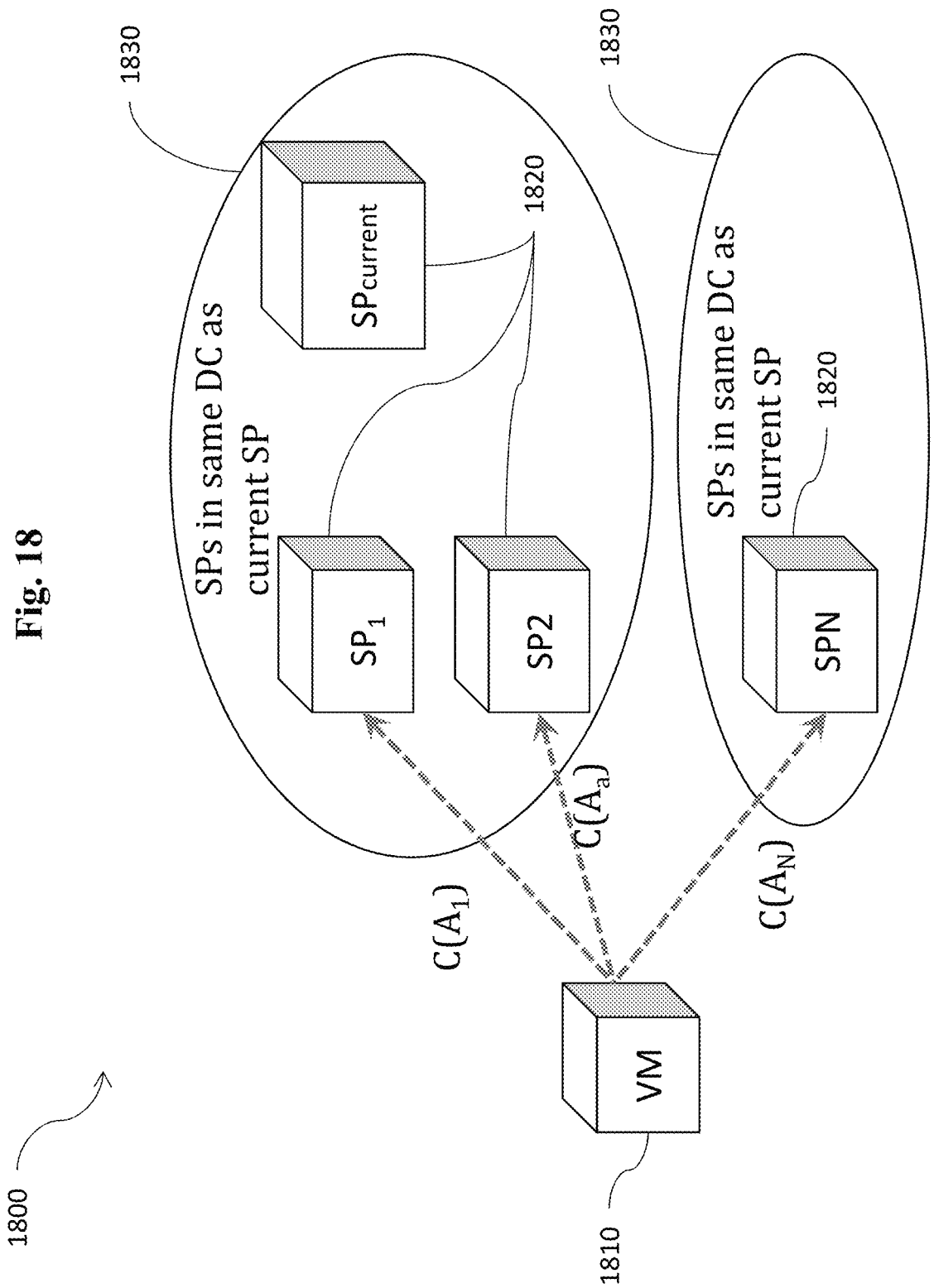
FIG. 18 illustrates an exemplary block diagram of a virtualization environment in which a virtual machine is determining whether to take an action.

In one embodiment, with reference to FIG. 18, a virtualization system 1800 controls moves of VMs 1810 between different storage (or resource) providers 1820 to avoid frequent moves of VMs 1810 between different storage providers 1820 in a datacenter (DC) 1830 or across different datacenters.

For example, the VM 1810 is evaluating a move to one or more service providers 1820, such as storage providers $SP_1$, $SP_2$, ... $SP_N$. Although storage providers 1820 are used herein as an example, it will be understood that the concepts disclosed herein can be applied to other types of service or resource providers.

In some embodiments, the cost C(Ai) of moving to provider i is set to a value that is proportional to the size of the data to be moved from the current SP to $SP_i$, multiplied by a factor $P_i$ that captures the 'proximity' of the current SP to $SP_i$. For example, if the current and the future SPs are in the same datacenter 1830, $P_i$ could be set to 1, whereas if they are in different datacenters 1830, it could be set to 10, to capture that it is more expensive to move across datacenters 1830 as opposed to moving within the same datacenter 1830.

The consumer periodically checks the prices at the current and each provider i, calculates the saving for this period and adds them to the savings from the previous periods. The price of the new provider for the current period may be higher than that of the current provider, and as a result the savings for this period will be negative and will decrease the total savings from previous rounds. The moment the savings up to now exceed the cost $C(A_i)$ the VM 1810 decides to move $SP_i$.

In an alternative embodiment, when the consumer considers moving to a new provider, the current provider gives the consumer some credit (e.g., equal to C(A)) to convince the consumer to stay. The consumer accepts the credit, and periodically checks the price of the new provider. If the price is cheaper, the consumer can use this credit to subsidize any loss of not having moved there. If it is more expensive, the consumer adds her gain to the credit. If the consumer runs out of credit, then the consumer can decide to move.

Advantageously, the system accounts for the fact that a decision that looks good now may not be good in the future. For example, a consumer that buys bandwidth from a network provider may see a cheaper price offered right now by a new provider. However, the new provider may change the price an hour later, and this new price may be higher than the price of the current provider an hour later.

Additionally, the system accounts for the actual behavior of other users. Assume a VM is interested in the latency of accessing data stored on a disk, and a decision is made to move its data from the current to a new disk that currently has lower latency. For large amounts of data, the move could take hours to complete. While the move takes place, other consumers who also see a slightly reduced latency move to the same new provider—effectively increasing the latency for everyone, and making it a bad decision.

Furthermore, the amount of time it takes to determine that the decision may be good is related to the cost of performing the action. Therefore, expensive decisions are carefully validated over longer periods than cheaper decisions, ensuring that undertaking the cost of the action will pay off in the future.

Advantageously, the systems and methods above minimize bad decisions and decisions that would frequently alternate between the current and the new provider.

Additionally and/or alternatively, the principles described herein can be applied to software-defined networking (SDN) architectures, such as those described herein and shown in the accompanying drawings.

It will be understood that the principles of the present invention are discussed herein with respect to the usage of ternary content-addressable memory (TCAM), which is a specialized type of high-speed memory that searches its entire contents in a single clock cycle. However, other types of suitable memory (and memory tables, or set of registers) may also be used without departing from the spirit and scope of the present invention. For convenience, reference is made herein to TCAM without excluding the possibility of using other forms of memory, memory tables, or registers. Additionally, the principles discussed herein can be applied with respect to any suitable form of workload, at any time, on any suitable infrastructure (e.g., cloud management platform).

When operating in an SDN environment, memory resources such as register tables or sets of registers, referred to herein for simplicity as TCAM resources, are generally limited. For example, in an SDN environment, e.g., using Cisco's Application Centric Infrastructure (ACI) or Juniper's OpenContrail, leafs and spines such as shown in the accompanying drawings are generally used to manage data flow, and polices are generally enforced on a leaf. As will be understood to persons of skill in the art, ACI as may be employed in accordance with the principles of the present invention generally consists of the Application Policy Infrastructure Controller (APIC) and a system of spine and leaf switches. TCAM policies can generally be obtained from the APIC, which can act as a centralized controller. ACI generally provides centralized control over spine/leaf fabric, operating between application and network (e.g. mapping applications to network application connectivity to define which applications communicate with each other). It will be understood that the principles discussed herein apply to ACI as well as to other methods for establishing software defined infrastructure (SDI). For example, the principles discussed herein can be used to facilitate TCAM table utilization in order to make network-aware VM placement or container placement decisions under top-of-rack APIC switches. According to various embodiments, these decisions are made in such a way that the TCAM table(s) remain balanced and/or within the constraints of the TCAM table utilization on the switches based on the network policies required by each VM or container.

Figure 19:
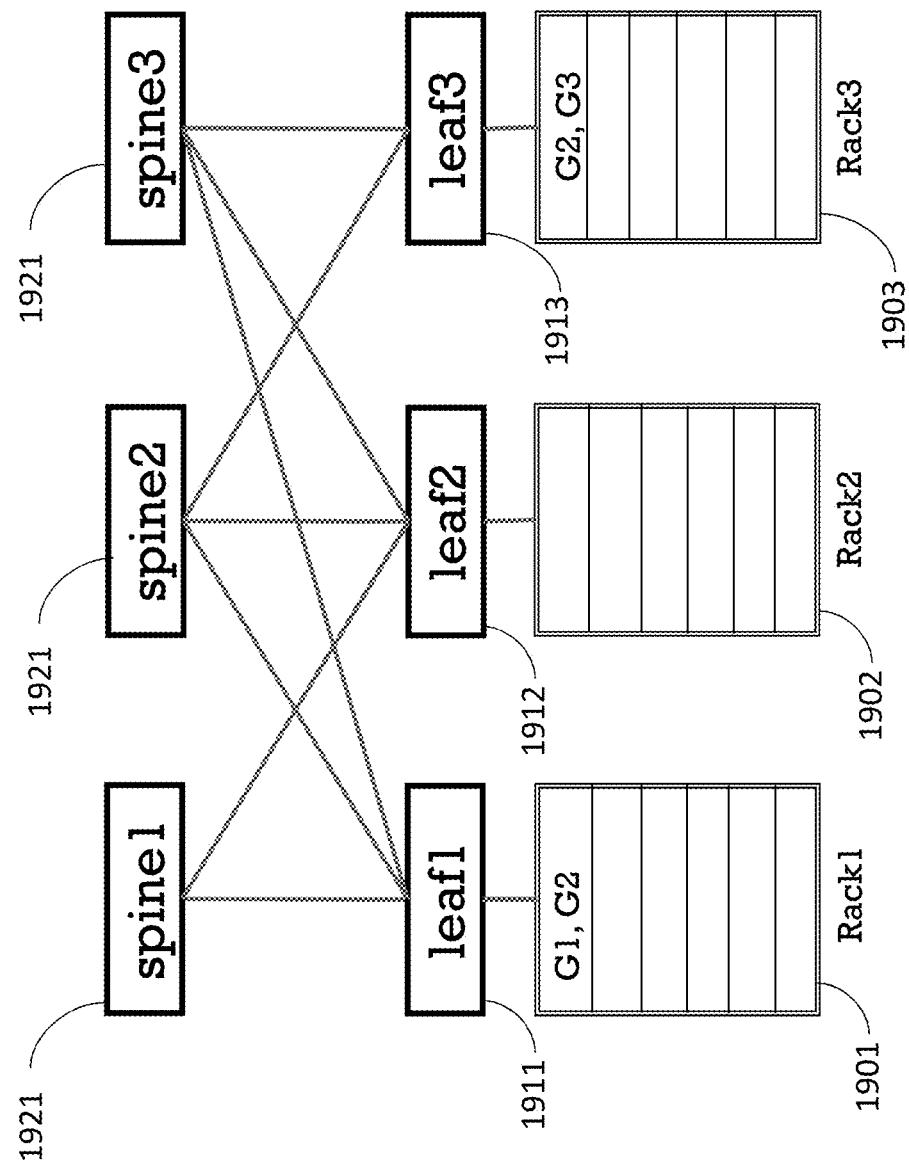
FIG. 19 illustrates an exemplary SDN environment in accordance with the principles of the present invention.

FIG. 19 shows an SDN environment 1900 which includes at least three groups or groupings (also referred to as collections) of VMs or applications, such as Endpoint Groups (EPGs)) e.g., G1, G2, and G3, each including one or more VMs and/or applications which reside on one or more of computer racks 1901, 1902, and 1903. Generally, a VM or application belongs to only one EPG or other collection (or grouping) of VMs or applications.

It will be understood that references herein to EPGs are merely exemplary and that other forms or types of collections (or groupings) are contemplated in accordance with the principles and embodiments described herein. Accordingly, the use of the term EPGs is merely for convenience and not intended to be limiting. Further, EPGs (or other collections or groupings) can be described or treated as having a single virtual machine or multiple virtual machines. Stated in another way, an EPG can represent a bundle of virtual machines, e.g., treated as a single virtual machine. An EPG advantageously can encapsulate similar virtual machines to avoid repetition with individualized policies for similarly situated virtual machines. However, communication within an EPG and/or inter-EPG communication may have to be routed through a leaf switch in the manner described herein. Accordingly, a policy TCAM can also define a set of rules or policies for inter-EPG communication. For instance, the TCAM can control whether a virtual machine in a first EPG can or cannot communicate with a virtual machine in a second EPG. In some embodiments, each rule (or policy) between EPGs are called "contracts." For example, each "contract" can require a TCAM entry for policy enforcement. Contracts between EPGs can also define one or more of: producer/consumer relationship; flow control between EPGS; subjects, filters, actions, and labels; and in/out filters. Policies can be either pushed to TCAMs in advance, or pulled on demand.

Although the principles of the present invention relating to SDN environments are discussed primarily with respect to VMs, it will be understood that these principles are not so limited. For example, the principles also apply to EPGs made up of applications, containers or other suitable components. Thus, EPGs can contain any combination of EPs, such as virtual machines (VMs), resource providers (RPs), physical machines (PMs), and storages (STs), which are grouped together either statically or dynamically. According to various embodiments, network policies or contracts are per EPG, where, for example, VMs or containers are managed based on their associated policies or contracts.

Racks 1901-1903 shown in FIG. 19 serve as supporting frameworks that hold hardware modules. For example, racks 1901-1903 may include servers, hard disk drives or other computing equipment. Although three racks 1901-1903 are shown, it will be understood that the principles discussed herein are not limited to such a configuration.

As also shown in FIG. 19, SDN environment 1900 includes, for example, three leaf switches 1911, 1912, 1913 interconnected to three spines 1921, 1922, 1923. Although each leaf if connected to each spine in environment 1900, this is not required and other, less complete interconnections may be used.

According to various embodiments involving an SDN environment, such as environment 1900 shown in FIG. 19, every time a packet (or data flow) enters the SDN environment, the packet enters through a leaf (e.g., one of leafs 1911-1913) and gets checked. The packet can be modified, encapsulated, changed, and so on. The packet or data flow can also be pushed off onto another spine and checked again when it enters another leaf. According to various embodiments, the utilization of the TCAM is directly proportional to the number of policies that can be placed into each leaf.

It is advantageous to have a policy TCAM, e.g., enforced at the leaf level, to allow for such data flow and control. For example, according to various embodiments, each leaf 1911-1913 of environment 1900 shown in FIG. 19 includes a policy TCAM (not shown), e.g., implemented or defined in one or more register tables or sets of registers that contains policy, the usage of which can be based on EPG-to-EPG policy counts. For example, SDN environment 1900 can employ a policy TCAM using a whitelist approach to define permitted data flow paths through a selected leaf, where data is dropped unless a communication is specifically permitted.

According to various embodiments, if a first VM from a first rack 1901 attempts to communicate with a second VM on a second rack 1902, the TCAM in leaf 1911 and leaf 1912 will provide rules governing such communications (e.g., how to encapsulate, setting and/or sending of packets, etc.). The policy TCAM thus can determine how the VMs are allowed to communicate. For example, the policy TCAM can define a predetermined port that is to be used for communication between two virtual machines or whether or not those two virtual machines can communicate at all.

Just like any other resource (e.g., memory, CPU, storage, and so on), TCAM can be considered a resource in the computer system. And because the TCAM is generally implemented by memory or registers and is often relatively small (compared to other resources), the TCAM is usually a bottleneck resource. Accordingly, once a policy TCAM of a selected leaf is full, it may be become impractical or impossible to place any more VMs under that leaf (e.g., into a rack of that lead) and/or communication between virtual machines can be limited (or eliminated). Stated in another way, when a TCAM is full, there is no policy for additional VMs under that TCAM, which can result in, for example, the dropping the packets. At the same time, there can still be available resources (e.g., servers) under the leaf that go unused because of the full TCAM. Conversely, empty TCAMs can find a data flow path for a leaf, but the resources under that leaf may not be the most practical placement for that data flow path. Persons of skill in the art will thus appreciate that a full TCAM may not allow connected compute resources to be utilized, or an empty TCAM may not be utilized because the underlying compute resources over utilized.

According to various embodiments, in an EPG environment, one or more of the following apply:

each leaf switch is a top-of-rack switch;

each leaf switch has a limited number of slots in its TCAM, e.g., 32K;

two TCAM slots are used (e.g., per access control list (ACL) filter, for each EPG to EPG rule, both at the ingress & egress leafs;

an EPG-to-EPG rule (or contract) is uni-directional;

all traffic is dropped unless an EPG to EPG rule permits the flow (white-list);

once a TCAM is full, no more EPG to EPG rules can be added;

once the TCAM is full, no new EPGs (VMs belonging to a new EPG) can be placed under that leaf (e.g. on physical servers connected to the leaf switch);

a VM belongs to one EPG, each EPG contains a set of VMs;

EPG to EPG rules form a directed weighted graph, each link is weighted with the rule count between the two EPGs;

when a leaf switch 'hosts' an EPG that means there exists a VM belonging to that EPG which is hosted by a server in that rack;

using the principles of the present invention disclosed herein, TCAM usage is balanced, optimized and/or minimized across leafs to avoid the inability to place VMs under a leaf because it has a full TCAM; and/or if one VM is below a leaf, that leaf will have TCAM slots associated with that VM's EPG, wherein TCAM space usage is the same if one or more (e.g. 10, 100, or 1000) VMs of the same EPG is below the leaf, such that TCAM space is not per VM.

TCAMs have a finite size, and are thus a limited resource, and can be managed like other resources, including through conventional management mechanisms or those described above (e.g. with respect to compute or storage resources).

Additionally and/or alternatively, in systems that implement a policy TCAM, a pricing function can be applied in the manners described herein. Accordingly, placement of policies in a TCAM environment can be driven by pricing and resulting placement of the associated workloads. For example, pricing functions can be used to facilitate one or more of: TCAM utilization (e.g., drawing VMs toward TCAMs of lower utilization, away from higher utilizations); cross-EPG pricing (e.g., reducing TCAM utilization due to cross EPG contracts, focusing on the number of TCAM slots added); or grouping EPs of the same EPG (e.g., pulling EPs of the same EPG together).

According to various embodiments, the use of economics-based analysis as discussed herein can be used to efficiently route the data flow packets by using an economic-based cost analysis for purchasing TCAM resources.

Figure 20A:
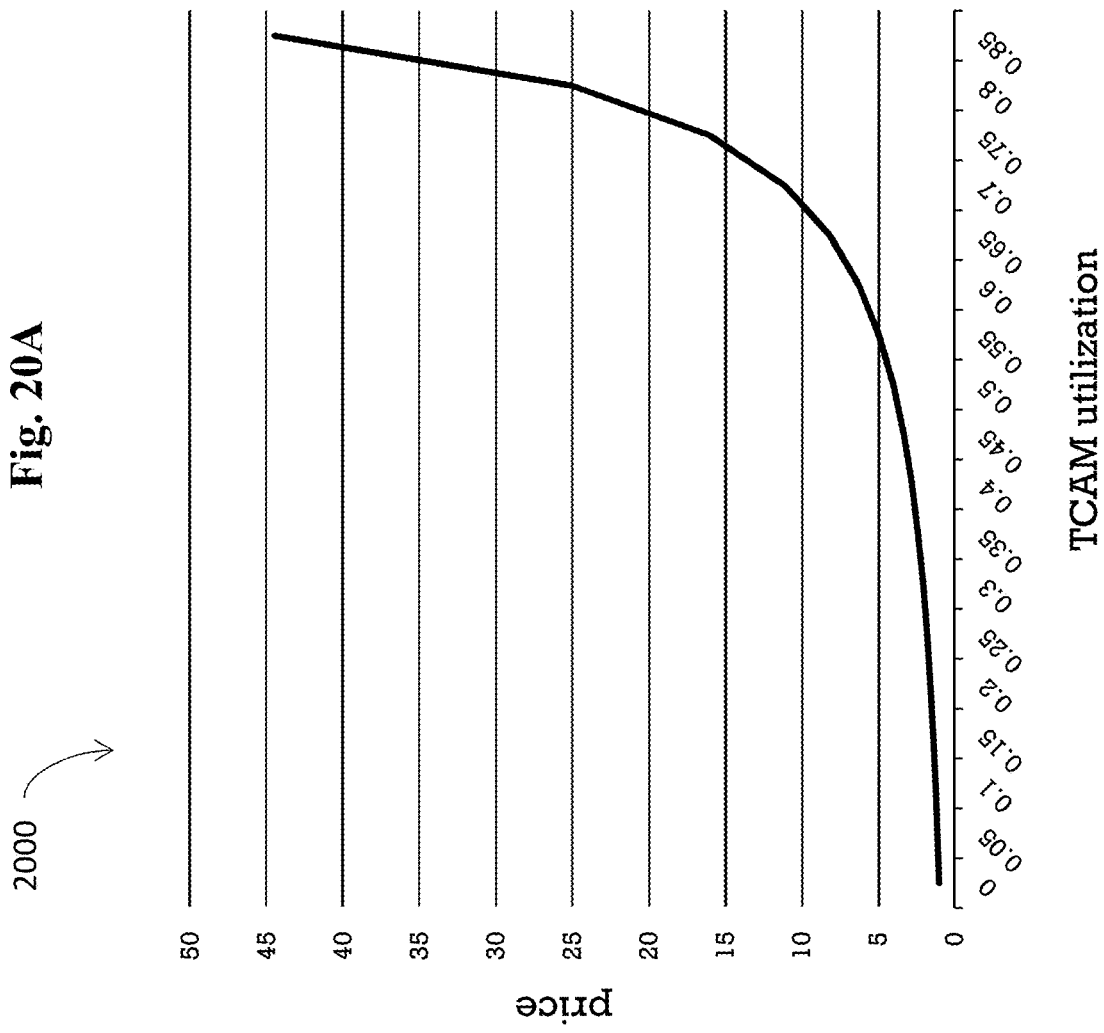
FIG. 20A illustrates an exemplary pricing function in accordance with the principles of the present invention.

According to various embodiments, a "Network Policy Commodity" (not shown) is used to represent the TCAM resource. Thus, for example, the policy TCAM can be treated as a new commodity similar to other computing resources (e.g., memory). Accordingly, a virtual machine (or EPG) can "shop" for commodities, including CPU, memory, and TCAM, to make decisions of hosting locations. In some embodiments, for CPU and memory, pricing can be based on utilization as previously discussed. For example, a first price for CPU and/or memory can be defined at 50% utilization, whereas another price can be defined at 75% utilization. Similarly, TCAM pricing also can be based on TCAM utilization. Additionally and/or alternatively, the TCAM pricing can consider whether an endpoint (or virtual machine) is situated on a similar EPG (e.g. taking into account that if other members of an EPG are already deployed on a leaf, and its contracts or policies are already deployed, the placement of this endpoint or VM does not require additional TCAM resources), the number of contracts involved between EPGs, the number of filters in a contract, and the effect (number or type of change) to a TCAM slot based on a potential migration of a virtual machine An exemplary pricing function 2000 for the new policy TCAM commodity is shown in FIG. 20A, in which the pricing is based primarily on utilization of the TCAM, plus optional secondary considerations. For example, while current TCAM resource utilization may be the primary driver of pricing, the price function can also take into account to a lesser degree the magnitude of change in available TCAM slots based on placement of a VM under a leaf, and can also take into account to an even lesser degree EPG membership (e.g., where a VM is part of an EPG already located under a leaf would, and placement of that VM would not impact TCAM policy, or impact it to a lesser degree than if it was not part of the EPG). Alternatively, utilization, magnitude of change, and EPG membership can be afforded similar treatment in determining price, or these criteria can be given different weight(s). Using these principles, the pricing function can favor placement where there is low TCAM utilization, to draw Endpoints (EPs) of the same EPG together, and/or to draw EPGs that communicate to the same leaf together. It will also be understood that the number of EPs in an EPG does not generally affect TCAM usage, and that EP to EP communications within the same EPG may traverse a leaf but not require TCAM usage. Additional considerations and pricing strategies are discussed further below.

According to various embodiments as described above, the new commodity reflecting the pricing (e.g., Cisco ACI pricing) is referred to as, for example, Network Policy Commodity or 'NetworkPolicy,' and is sold by the provider or physical machine (PM) and bought by the VM. For example, consider NetworkPolicy.getPrice(ServiceEntity vm), which is called from the sold community. In one usage-based pricing function, the VM is ignored (same Network Policy Commodity price returned for all VMs), and/or the price is based on the current utilization, at the provider. For example, both usage and capacity can be determined by discovery or monitoring, such that the price is based on the actual usage and capacity. As such, this can be used to obtain the current price for the commodity at the provider. As another example, for Cisco ACI or similar environments, the price is based on the specific VM hosted on the provider or physical machine (PM). As such, price can be different for different VMs, and a specific price is returned for a specific VM.

Consider NetworkPolicy.calculatePrice(float utilization, ServiceEntity vm), which is also called from the sold community. Again, in one usage-based pricing function, the VM is ignored (same price returned for all VMs), and/or the price is based on the given utilization, at the provider. For example, the capacity can be determined by discovery, and the utilization may include a marginal increase based on the demand of the VM (i.e., utilization=current utilization+amount the VM needs). As such, this methodology can be used to determine the "price after" a potential move to that provider. As another example, for Cisco ACI or similar environments, the price is based on the specific VM hosted on the provider or physical machine (PM). For example, it can be assumed the VM is potentially moving to this provider, but a check is made to see if the provider is the current host. Again, price can be different for different VMs, and a specific price is returned for a specific VM. According to various embodiments, the utilization is ignored (such that pricing is independent of utilization), but the change in TCAM utilization is determined. Demand can be a function of the VM alone. Alternatively, demand can be a function of two or more of the VM, provider and topology, using getPrice( ) (or another mechanism) for a price calculation. According to various embodiments, for example, is a VM move would result in the VM not finding an EPG at the destination, then the price can be increased for the TCAM because new slots in the register or memory will need to be used to adjust the policy. On the other hand, for example, if the destination has an EPG available, this can be taken into account in pricing.

In some embodiments, the pricing function for a commodity, which can be applied to TCAM pricing, is represented by:

$$\text{price} = \frac{1}{r^2} = \frac{1}{\left[1 - \frac{\text{used}}{\text{capacity}}\right]^2}$$

where:

"used" is the amount of the resource (register or memory) in use,

"capacity" is the total capacity (size) of the resource (register or memory), or a limited amount that should be allocated, r=1−[used/capacity], and utilization=use/capacity.

Figure 20B:
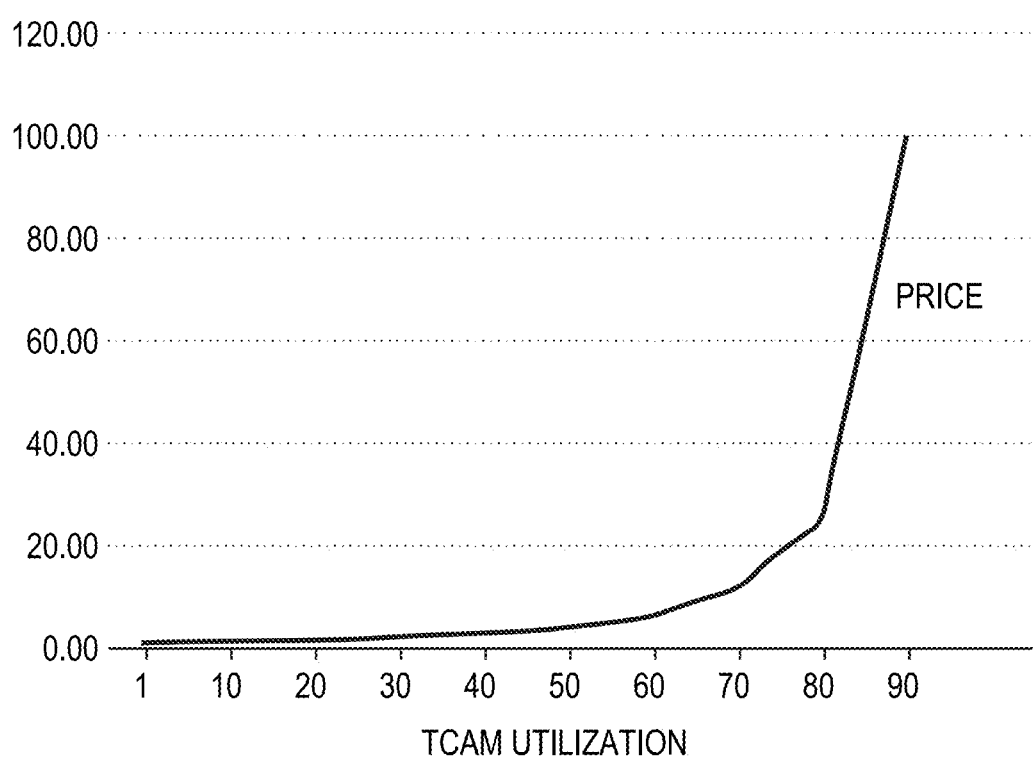
FIG. 20B illustrates a shape of a usage-based price curve in accordance with the principles of the present invention.

Thus, according to various embodiments, the shape of the usage-based price curve is depicted in FIG. 20B.

Additional pricing functions are contemplated. For example, in some embodiments, the pricing function for a commodity, which can be applied to TCAM pricing, is represented by:

$$\text{price} = \frac{1}{r^2} = \frac{1}{[1-U]^2} \text{ where}$$
$$U = \frac{DLU + DELTA - DISCOUNT}{DLC},$$

DLU is the number of TCAM slots used in the destination leaf,

DLC is the destination lead TCAM capacity (total number of slots in TCAM),

DELTA is zero if the destination leaf is the same as the current leaf; zero if one or more members belonging to the same EPG as the VM are being hosted under the destination leaf (leaf getCount(vm.EPG)>0); otherwise, it is the number of additional slots required at the destination leaf if the VM is hosted under it:

Σ$_{peer}$.epg.ruleCount(peer),∀peer where leaf.getCount(peer)=0 where peer refers to peer EPGs that EPG talks to, and

DISCOUNT is the (weighted) percentage of VMs belonging to the same EPG being hosted under the leaf:

$$\text{weight} * \frac{\text{left.getCount(vm.EPG)} + X}{|vm.EPG|},$$

X is zero on the current host, 1 otherwise.

According to various embodiments, one or more of the following apply:

leaf.getCount(epg) is the number of endpoints belonging to epg being hosted under leaf;

epg=vm.EPG is the endpoint group that the VM belongs to, i.e., VM∈epg;

epgX.ruleCount(epgY) is the number of TCAM slots required to enforce all the rules (that allow traffic) between epgX and epgY;

the shape of the ACI price curve is approximately the same as the default usage-based price curve (where, for example, the price is primarily determined by utilization; both DELTA and DISCOUNT cause an adjustment along the curve); and when a VM moves to another host under the same leaf, the TCAM usage does not change (where, for example, VMs will preferably tend to group together on the same host under the same leaf).

According to various embodiments, if a VM intends to move to another host under the same leaf (i.e., in the same rack), then the pricing function reduces to:

$$\text{price} = \frac{1}{r^2} = \frac{1}{\left[1 - \frac{DLU - DISCOUNT}{DLC}\right]^2}$$

This will generally draw VMs of the same EPG together, since DLU and DLC are the same values for all hosts under the same leaf, and DISCOUNT is larger for the hosts that are hosting the larger number of EPG members. If a host is not hosting any members of vm.EPG then the discount is zero. DELTA is zero since moving from host to host under the same leaf does not affect TCAM usage.

According to various embodiments, if a VM intends to move to another host under a different leaf, then the pricing function is:

$$\text{price} = \frac{1}{r^2} = \frac{1}{\left[1 - \frac{DLU + DELTA - DISCOUNT}{DLC}\right]^2}$$

This will generally draw VMs of the same EPG together under the same leaf, as well as onto the same host under that leaf. Since DELTA may be the same across several racks, the host with the larger grouping would tend to attract VMs and grow larger. Without the DISCOUNT, VMs within the same EPG could be distributed across racks without an incentive to group them together.

FIG. 21 shows an SDN environment 2100 including three groups of VMs G1-G3. As shown, 10 TCAM slots are used for communications between VMs in G1 and G2 (e.g., defining 10 ports over which VMs are permitted to communicate), 20 TCAM slots are used for communications between VMs in G1 and G3, and 5 TCAM slots are used for communications between VMs in G2 and G3. As will be understood, the placement of VM groups in racks under leafs will affect the usage of TCAM slots. For example, in configuration 2101 shown in FIG. 21, the VMs making up G1, G2 and G3 are spread across racks under three leafs. In that scenario, 35 TCAM slots are used up at each leaf. However, in configuration 2012, the distribution of VMs (and groups) results in only 30, 15, and 25 TCAM slots being used at the leafs, as shown. In configuration 2013, where all the VMs (and groups) are localized onto a single rack and leaf, 35 TCAM slots of that leaf are used up, but none of the TCAM slots at the other leafs shown in FIG. 21 are used up. It will be appreciated that the pricing principles disclosed herein can be used to control of placement of VMs (and groups) at leafs, so as to reduce (or minimize) the number of TCAM slots used at a particular leaf, the aggregate number of TCAM slots used across multiple leafs, and so on. For example, when a VM is shopping for resources on different racks, the TCAM price can be made cheaper to draw the VM to a desirable rack, while the TCAM price can be made more expensive to discourage the VM from moving to an undesirable rack.

Figure 22:
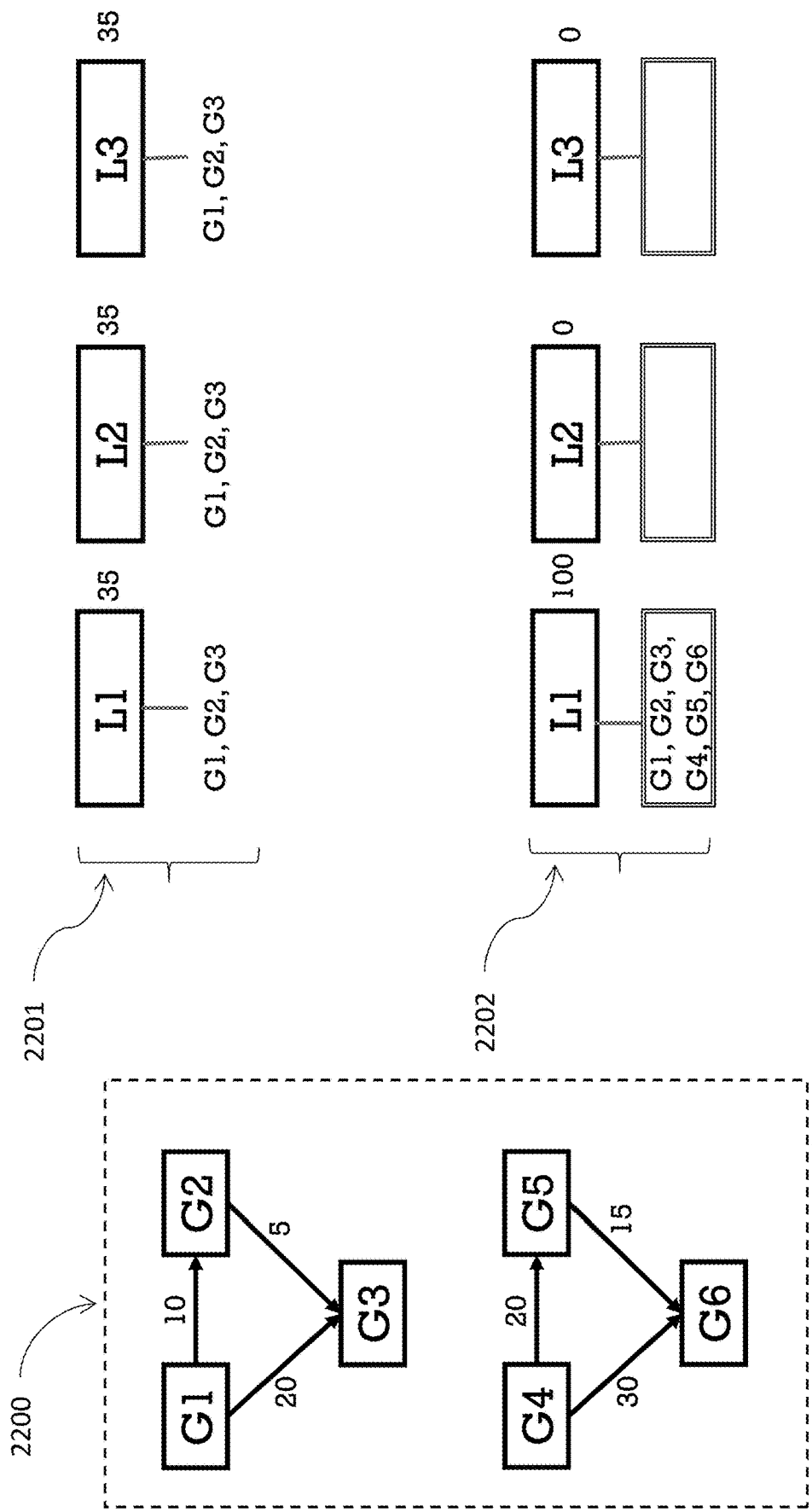
FIG. 22 illustrates another exemplary SDN environment in accordance with the principles of the present invention.

FIG. 22 shows another DSN environment 2200, which includes six groups of VMs G1-G6. As shown, similar to the environment 2100 described above, the placement of VMs (and groups) at racks will impact the number of TCAM slots used up at respective leafs. Once again, the pricing principles disclosed herein can be used to control of placement of VMs (and groups) at leafs, so as to reduce (or minimize) the number of TCAM slots used.

Figure 23:
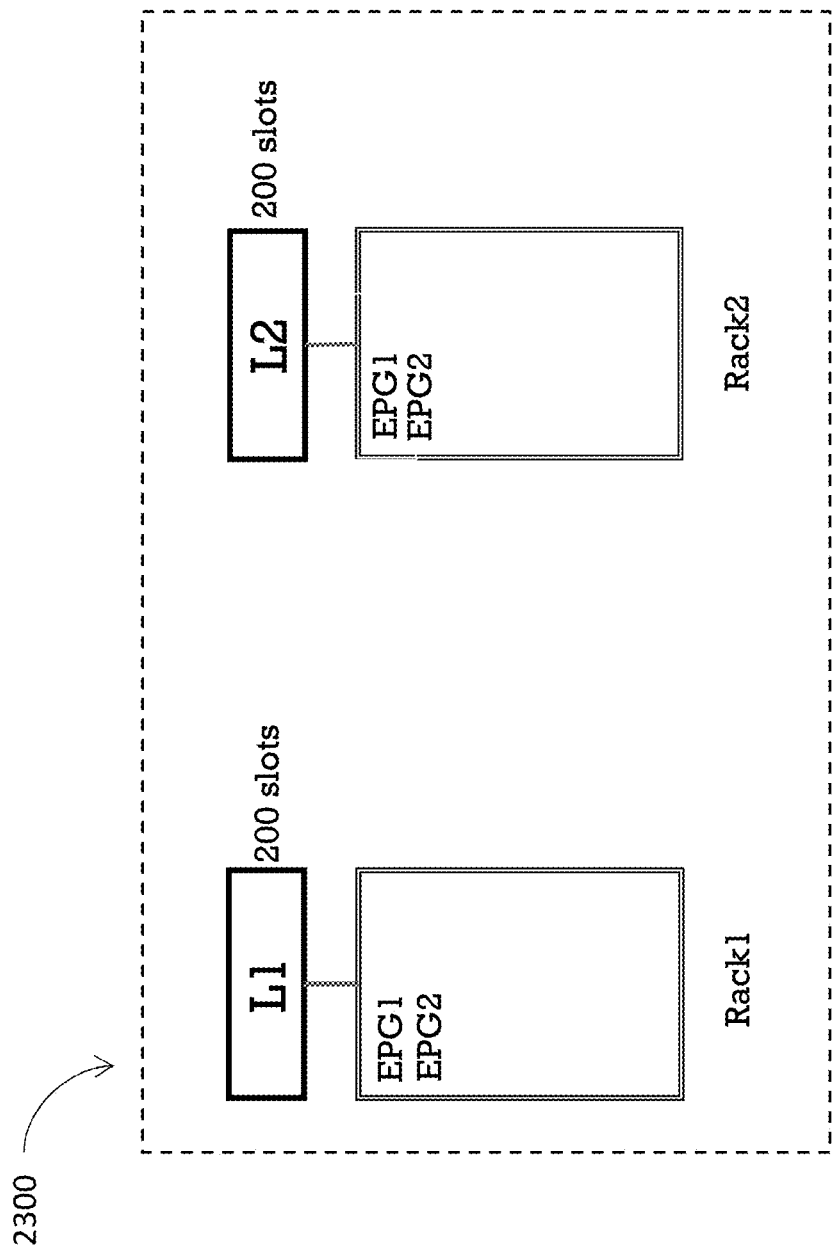
FIG. 23 illustrates another exemplary SDN environment in accordance with the principles of the present invention.

FIG. 23 illustrates additional details concerning the effect of VM placement on TCAM usage. As shown, DSN environment 2300 includes EPGs 1 and 2 on two respective racks, with each EPG requiring 100 TCAM slots and thus a total of 200 TCAM slots required at each leaf.

Figure 24:
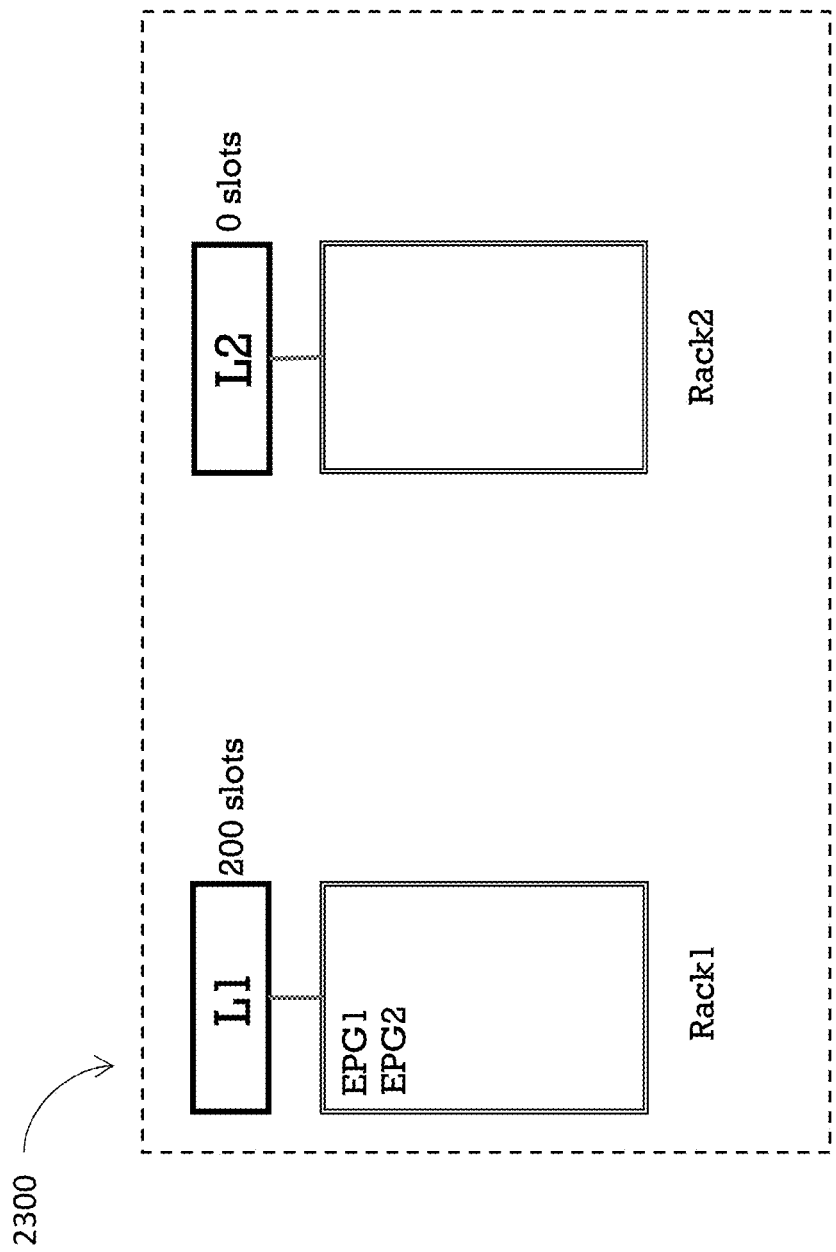
FIG. 24 illustrates another exemplary SDN environment in accordance with the principles of the present invention.

As shown in FIG. 24, inter-leaf EPG communication can be reduced (or eliminated) by moving VMs such that all VMs of EPGs 1 and 2 are on the same rack, under the same leaf. In such an environment 2300 as shown, TCAM usage at leaf 2 is reduced (or eliminated).

Figure 25:
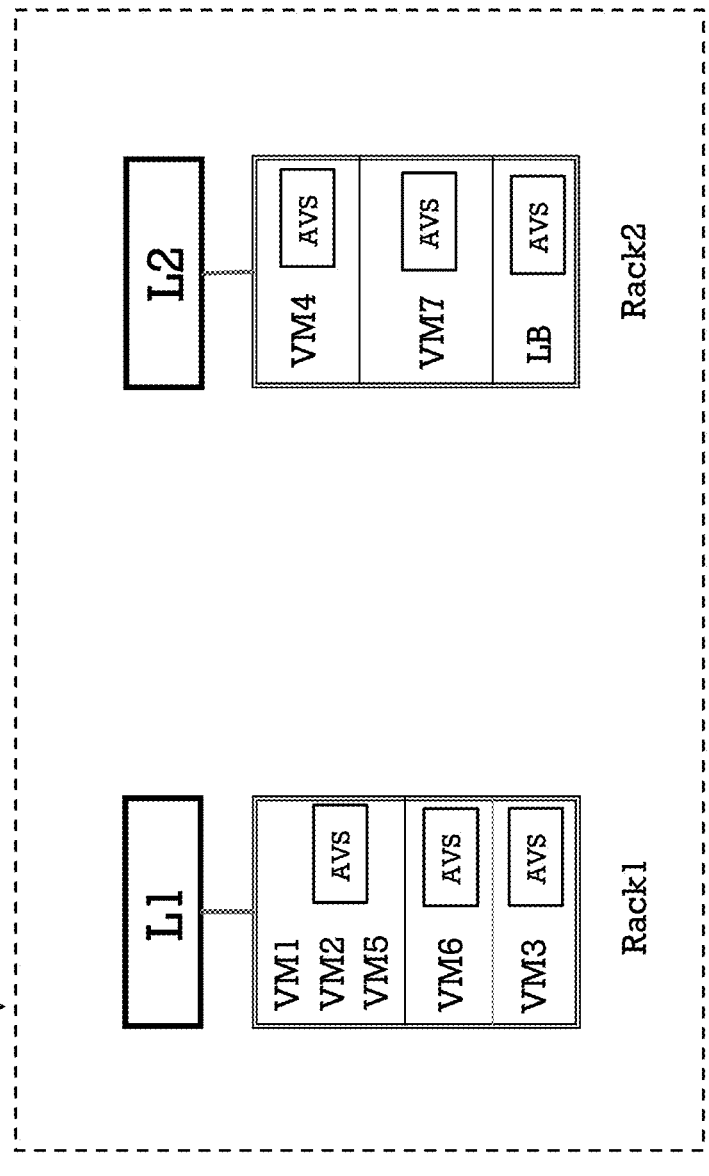
FIG. 25 illustrates another exemplary SDN environment in accordance with the principles of the present invention.

FIG. 25 shows another SDN environment 2500 illustrating different TCAM utilization scenarios, for example, based on moving members of an EPG around across leafs. As shown, each EPG can have an associated application virtual switch (AVS), which is a device (software) to communicate (to enable packet flows) between VMs and applications. As will be understood, TCAM utilization depends on the total number of filters in all the contracts between all the EPGs hosted below the leaf. EP count generally does not matter, except if an EP is the only member of an EPG on a host and it moves. Additionally, there are multiple potential cases: where EPGs are both on the same host, where they are on different hosts but the same leaf, and where they are on different leafs. We focus on the third case, such as a VM1 to VM7 communication in environment 2400, which provides the opportunity to manipulate configuration to lower the TCAM utilization using the principles of the present invention.

Figure 26:
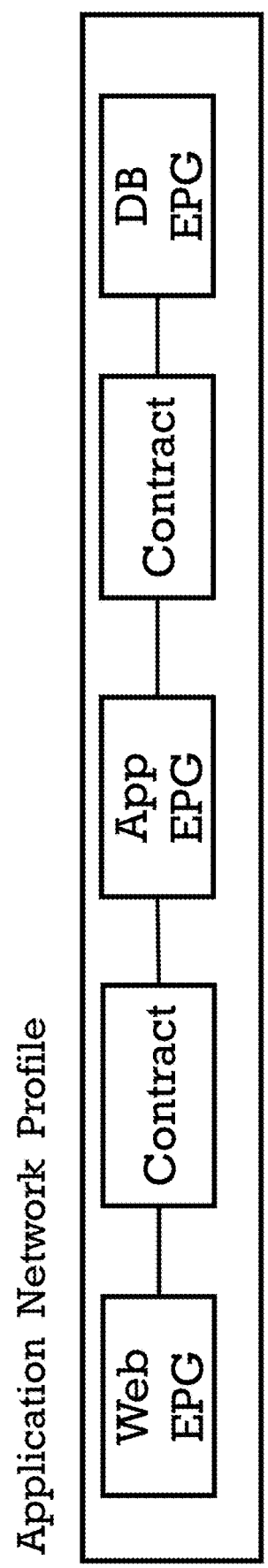
FIG. 26 illustrates an exemplary policy model for use in an SDN environment in accordance with the principles of the present invention.

FIG. 26 shows an exemplary policy model, wherein each EPG may contain many VMs. By default, EPG-to-EPG communication is prohibited, and contracts allow for traffic between EPGs. The present invention is used, for example, to control and limit the number of filters in each contract, thus determining the amount of TCAM space used (since each filter in a contract takes up, for example, 2 slots in the source and destination leaf TCAM). For example, according to various embodiments, rules are implemented with respect to groups, instead of VMs, to reduce TCAM requirements. For example, a rule may specify that any VM in an EPG can communicate on a particular port with any VM in another EPG.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be computer readable medium, such as a machine-readable storage device, a machine-readable storage substrate, a memory device, or a combination of one or more of them.

The terms "data processing apparatus" "data processor", or "processing device" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a LAN and a wide area network ("WAN"), e.g., the Internet.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. For example, the actions recited in the drawings can be performed in a different order and still achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the principles discussed herein. The systems, apparatus and methods depicted in the accompanying drawings do not necessarily require the particular configurations or order of processes shown (or sequential order) to achieve desirable results. The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A computer-implemented method for managing ternary content-addressable memory (TCAM) utilization in a computer system, comprising:
    determining a TCAM resource to be purchased for a consumer entity operating as part of an endpoint group in the computer system using the consumer entity's available budget of virtual currency units;
    setting, by a TCAM manager, a purchase price to be offered to the consumer entity for usage of the TCAM resource, wherein the set purchase price is based at least in part on a determined resulting impact on the TCAM's utilization from assigning the TCAM resource to the consumer entity;
    confirming that the consumer entity's available budget of virtual currency units is sufficient to pay the determined purchase price for the TCAM resource; and
    purchasing, by the consumer entity, usage of the TCAM resource,
    wherein the set purchase price is inversely proportional to the square of $(1-(\text{TCAM usage}/\text{TCAM capacity}))$.

2. The computer-implemented method of claim 1, wherein the set purchase price is also based at least in part on a determined association of the consumer entity with the endpoint group.

3. The computer-implemented method of claim 1, wherein the set purchase price is also based at least in part on the type or identity of the consumer entity.

4. The computer-implemented method of claim 1, wherein the computer system is a virtualization system and the consumer entity is a virtual machine, wherein the virtual machine is a software implementation of a computer that runs at least one guest operating system and executes one or more applications on the guest operating system.

5. The computer-implemented method of claim 1, wherein the consumer entity is a resource provider, physical machine, or storage entity.

6. The computer-implemented method of claim 1, wherein the computer system employs a software-defined networking architecture.

7. The computer-implemented method of claim 1, wherein the TCAM resource includes one or more memory tables or registers.

8. The computer-implemented method of claim 1, wherein the endpoint group includes one or more additional consumer entities.

9. The computer-implemented method of claim 1, wherein the TCAM resource includes one or more communication policies which define how the consumer entity is allowed to communicate with one or more additional consumer entities.

10. A computer-implemented method for managing ternary content-addressable memory (TCAM) utilization in a computer system, comprising:
    determining a TCAM resource to be purchased for a consumer entity operating as part of an endpoint group in the computer system using the consumer entity's available budget of virtual currency units;
    setting, by a TCAM manager, a purchase price to be offered to the consumer entity for usage of the TCAM resource, wherein the set purchase price is based at least in part on a determined resulting impact on the TCAM's utilization from assigning the TCAM resource to the consumer entity;
    confirming that the consumer entity's available budget of virtual currency units is sufficient to pay the determined purchase price for the TCAM resource; and
    purchasing, by the consumer entity, usage of the TCAM resource,
    wherein the set purchase price is inversely proportional to the square of $(1-U)$, wherein U is calculated as $(\text{DLU}+\text{DELTA}-\text{DISCOUNT})/\text{DLC}$, and wherein:
    DLU is the number of TCAM slots used in a destination leaf;
    DELTA is zero if the destination leaf is the same as the current leaf of the consumer entity or if one or more members belonging to the same endpoint group as the consumer entity are being hosted under the destination leaf, otherwise, DELTA is a determined number of additional slots required at the destination leaf if the consumer entity is hosted under it;

DISCOUNT is a determined percentage of consumer entities belonging to the same endpoint group being hosted under the destination leaf; and DLC is a determined TCAM capacity of the destination leaf.

11. A computer system for managing ternary content-addressable memory (TCAM) utilization, comprising:

instructions stored on a non-transitory computer readable medium in the computer system and executable by a data processing apparatus to cause the data processing apparatus to perform operations comprising:

determining a TCAM resource to be purchased for a consumer entity operating as part of an endpoint group in the computer system using the consumer entity's available budget of virtual currency units;

setting, by a TCAM manager, a purchase price to be offered to the consumer entity for usage of the TCAM resource, wherein the set purchase price is based at least in part on a determined resulting impact on the TCAM's utilization from assigning the TCAM resource to the consumer entity;

confirming that the consumer entity's available budget of virtual currency units is sufficient to pay the determined purchase price for the TCAM resource; and purchasing, by the consumer entity, usage of the TCAM resource, wherein the set purchase price is inversely proportional to the square of (1−(TCAM usage/TCAM capacity)).

12. The computer system of claim 11, wherein the set purchase price is also based at least in part on a determined association of the consumer entity with the endpoint group.

13. The computer system of claim 11, wherein the set purchase price is also based at least in part on the type or identity of the consumer entity.

14. The computer system of claim 11, wherein the computer system is a virtualization system and the consumer entity is a virtual machine, wherein the virtual machine is a software implementation of a computer that runs at least one guest operating system and executes one or more applications on the guest operating system.

15. The computer system of claim 11, wherein the consumer entity is a resource provider, physical machine, or storage entity.

16. The computer system of claim 11, wherein the computer system employs a software-defined networking architecture.

17. The computer system of claim 11, wherein the TCAM resource includes one or more memory tables or registers.

18. The computer system of claim 11, wherein the endpoint group includes one or more additional consumer entities.

19. The computer system of claim 11, wherein the TCAM resource includes one or more communication policies which define how the consumer entity is allowed to communicate with one or more additional consumer entities.

20. A computer system for managing ternary content-addressable memory (TCAM) utilization, comprising:

instructions stored on a non-transitory computer readable medium in the computer system and executable by a data processing apparatus to cause the data processing apparatus to perform operations comprising:

determining a TCAM resource to be purchased for a consumer entity operating as part of an endpoint group in the computer system using the consumer entity's available budget of virtual currency units;

setting, by a TCAM manager, a purchase price to be offered to the consumer entity for usage of the TCAM resource, wherein the set purchase price is based at least in part on a determined resulting impact on the TCAM's utilization from assigning the TCAM resource to the consumer entity;

confirming that the consumer entity's available budget of virtual currency units is sufficient to pay the determined purchase price for the TCAM resource; and purchasing, by the consumer entity, usage of the TCAM resource, wherein the set purchase price is inversely proportional to the square of (1−U), wherein U is calculated as (DLU+DELTA−DISCOUNT)/DLC, and wherein:

DLU is the number of TCAM slots used in a destination leaf;

DELTA is zero if the destination leaf is the same as the current leaf of the consumer entity or if one or more members belonging to the same endpoint group as the consumer entity are being hosted under the destination leaf, otherwise, DELTA is a determined number of additional slots required at the destination leaf if the consumer entity is hosted under it;

DISCOUNT is a determined percentage of consumer entities belonging to the same endpoint group being hosted under the destination leaf; and DLC is a determined TCAM capacity of the destination leaf.

* * * * *